(12) United States Patent
Himelstein et al.

(10) Patent No.: US 11,340,794 B2
(45) Date of Patent: May 24, 2022

(54) MULTIPROCESSOR SYSTEM WITH INDEPENDENT DIRECT ACCESS TO BULK SOLID STATE MEMORY RESOURCES

(71) Applicant: EMC IP Holding Company LLC, Hopkinton, MA (US)

(72) Inventors: Mark Himelstein, Emerald Hills, CA (US); James Yarbrough, Fremont, CA (US); Rick Carlson, Pacific Palisades, CA (US); Vishwas Durai, Los Altos, CA (US); Vikram Venkataraghavan, Saratoga, CA (US); Bruce A. Wilford, Los Altos, CA (US); Grace Ho, Sunnyvale, CA (US); Bill Katz, San Rafael, CA (US); Richard Van Gaasbeck, Mountain View, CA (US); Dan Arai, Sunnyvale, CA (US); David R. Emberson, Santa Cruz, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 15 days.

(21) Appl. No.: 16/223,083

(22) Filed: Dec. 17, 2018

(65) Prior Publication Data
US 2019/0121553 A1  Apr. 25, 2019

Related U.S. Application Data

(60) Division of application No. 14/641,201, filed on Mar. 6, 2015, now Pat. No. 10,209,904, and a
(Continued)

(51) Int. Cl.
*G06F 3/06* (2006.01)
*G06F 11/07* (2006.01)
(Continued)

(52) U.S. Cl.
CPC .......... *G06F 3/0619* (2013.01); *G06F 3/0655* (2013.01); *G06F 3/0688* (2013.01);
(Continued)

(58) Field of Classification Search
CPC .......... G06F 12/0246; G06F 15/17331; G06F 2212/2022; G06F 2212/2542; G06F 2212/7207; G06F 2212/7201
See application file for complete search history.

(56) References Cited

U.S. PATENT DOCUMENTS

| 4,843,542 A | 6/1989 | Dashiell et al. |
| 5,701,467 A * | 12/1997 | Freeston ............. G06F 16/2246 707/741 |
| 5,802,554 A * | 9/1998 | Caceres .............. G06F 12/0638 365/185.33 |
| 6,697,076 B1 | 2/2004 | Trivedi et al. |

(Continued)

FOREIGN PATENT DOCUMENTS

| CN | 102810068 A | 12/2012 |
| CN | 1293404 A | 4/2013 |

OTHER PUBLICATIONS

Jung et al., Hierarchical Use of Heterogeneous Flash Memories for High Performance and Durability, 2009, IEEE, pp. 1383-1391 (9 pages total) (Year: 2009).*
(Continued)

*Primary Examiner* — Gary W. Cygiel
(74) *Attorney, Agent, or Firm* — Womble Bond Dickinson (US) LLP

(57) ABSTRACT

A system has a collection of central processing units. Each central processing unit is connected to at least one other central processing unit and has a path into flash memory resources. A central processing unit supports a mapping from a data address space, to a flash memory virtual address
(Continued)

space, to a flash memory virtual page number to a flash memory physical address space.

12 Claims, 43 Drawing Sheets

Related U.S. Application Data continuation-in-part of application No. 14/249,289, filed on Apr. 9, 2014, now Pat. No. 9,519,615.

(60) Provisional application No. 61/949,190, filed on Mar. 6, 2014, provisional application No. 61/810,197, filed on Apr. 9, 2013.

(51) Int. Cl.
*G06F 11/14* (2006.01)
*G06F 13/00* (2006.01)
*G06F 15/167* (2006.01)

(52) U.S. Cl.
CPC ...... *G06F 11/0709* (2013.01); *G06F 11/0727* (2013.01); *G06F 11/1451* (2013.01); *G06F 13/00* (2013.01); *G06F 15/167* (2013.01); *G06F 2201/84* (2013.01); *G06F 2212/7201* (2013.01); *G06F 2212/7205* (2013.01)

(56) References Cited

U.S. PATENT DOCUMENTS

| | | | |
|---|---|---|---|
| 8,341,336 B2* | 12/2012 | Chang | G06F 12/0246 711/103 |
| 8,417,873 B1 | 4/2013 | Karamcheti et al. | |
| 2003/0028746 A1 | 2/2003 | Durrant | |
| 2007/0283123 A1 | 12/2007 | Vick et al. | |
| 2011/0145835 A1* | 6/2011 | Rodrigues | G06F 9/544 719/312 |
| 2011/0296437 A1* | 12/2011 | Raut | G06F 9/526 719/314 |
| 2012/0017037 A1* | 1/2012 | Riddle | G06F 16/25 711/103 |
| 2014/0089630 A1 | 3/2014 | Pignatelli | G06F 12/1009 711/206 |
| 2014/0215129 A1 | 7/2014 | Kuzmin | G06F 12/0246 711/103 |

OTHER PUBLICATIONS

International Search Report and Written Opinion issued to international patent application No. PCT/US15/19304, dated Jun. 24, 2015, 7 pgs.

* cited by examiner $$P_i = \prod_{n=i}^{i+3} D_n \qquad D_i = P_i \otimes \prod_{n=i+1}^{i+3} D_n$$

$P_1 = D_1 \otimes D_2 \otimes D_3 \otimes D_4$ $P_2 = D_2 \otimes D_3 \otimes D_4 \otimes D_5$ $P_3 = D_3 \otimes D_4 \otimes D_5 \otimes D_6$ $P_4 = D_4 \otimes D_5 \otimes D_6 \otimes D_7$ $P_5 = D_5 \otimes D_6 \otimes D_7 \otimes D_8$ $P_6 = D_6 \otimes D_7 \otimes D_8 \otimes D_9$

FIG. 5

| ERASE-2 | WRITE-1 | WRITE-2 | READ |
|---|---|---|---|
| Start ERASE | Start WRITE | Start WRITE | Start READ |
| Wait for READY | Wait for READY | Wait for READY | Wait for READY |
| Start ERASE | | Start WRITE | Finish READ |
| Wait for READY | | Wait for READY | |
| Get STATUS | | Get STATUS | |

| Start ERASE | Get STATUS | Start WRITE | Start READ | Finish READ | RESET | Set FEATURES |
|---|---|---|---|---|---|---|
| CMD-60 | CMD-78 | CMD-80 | CMD-00 | CMD-06 | CMD-FF | CMD-EF |
| ADDR-A1 | ADDR-A1 | ADDR-A1 | ADDR-A1 | ADDR-A1 | | ADDR-01 |
| ADDR-A2 | ADDR-A2 | ADDR-A2 | ADDR-A2 | ADDR-A2 | | Din |
| ADDR-A3 | ADDR-A3 | ADDR-A3 | ADDR-A3 | ADDR-A3 | | Din |
| CMD-D0 | Dout | ADDR-A4 | ADDR-A4 | ADDR-A4 | | Din |
| | | ADDR-A5 | ADDR-A5 | ADDR-A5 | | Din |
| | | Din (4k) | CMD-30 | CMD-E0 | | |
| | | CMD-10 | | Dout (4k) | | |

MULTIPROCESSOR SYSTEM WITH INDEPENDENT DIRECT ACCESS TO BULK SOLID STATE MEMORY RESOURCES

CROSS-REFERENCE TO RELATED APPLICATION

This application is a divisional of U.S. Ser. No. 14/641,201, filed Mar. 6, 2015, the contents of which are incorporated herein by reference. This application also claims priority to U.S. Provisional Patent Application Ser. No. 61/949,190, filed Mar. 6, 2014, the contents of which are incorporated herein by reference. This application is also a continuation-in-part of U.S. Ser. No. 14/249,289, filed Apr. 9, 2014, now U.S. Pat. No. 9,519,615, issued Dec. 13, 2016, which claims priority to U.S. Provisional Patent Application Ser. No. 61/810,197, filed Apr. 9, 2013.

FIELD OF THE INVENTION

This invention relates generally to information processing. More particularly, this invention relates to a multiprocessor system with independent direct access to bulk solid state memory resources.

BACKGROUND OF THE INVENTION

As larger and larger amounts of data become available for analysis, businesses and governments need to be able to exploit that data for faster, more accurate decision making and more efficient operation.

SUMMARY OF THE INVENTION

A system has a collection of central processing units. Each central processing unit is connected to at least one other central processing unit and has a path into flash memory resources. A central processing unit supports a mapping from a data address space, to a flash memory virtual address space, to a flash memory virtual page number to a flash memory physical address space.

BRIEF DESCRIPTION OF THE FIGURES

The invention is more fully appreciated in connection with the following detailed description taken in conjunction with the accompanying drawings, in which:

FIG. 5 illustrates a stream encoding and decoding technique utilized in accordance with an embodiment of the invention.

Like reference numerals refer to corresponding parts throughout the several views of the drawings.

DETAILED DESCRIPTION OF THE INVENTION

A computing appliance is a dedicated hardware device with integrated software designed to provide a specific computing function. A computing appliance does not differ in any fundamental way from a general-purpose computer, but typically is not configured to allow a customer to change the software or to reconfigure the hardware. The disclosed systems are capable of running a very broad range of applications and in this sense may be considered to be general-purpose computing machines. They implement a cost-effective architecture that efficiently creates a very large, shared memory.

The disclosed systems exploit low cost solid-state devices thereby providing "Flash As Memory™." This means that the solid-state devices (e.g., flash memory chips) have addresses in the processor's memory space. Thus, the processor can directly access data in "flash memory" without first having to swap it into its main memory. In certain embodiments, this memory space is on a very large scale, e.g., 10 s of Terabytes to many Petabytes. Consequently, special designs and techniques are used, as described below. These special designs and techniques support parallel operations across the system.

The designs and techniques include a number of interconnected components composed of both hardware and software. Each component has unique characteristics and functions that are required for the operation of the complete system. When interconnected, these components create the desired computational capabilities.

Figure 1:
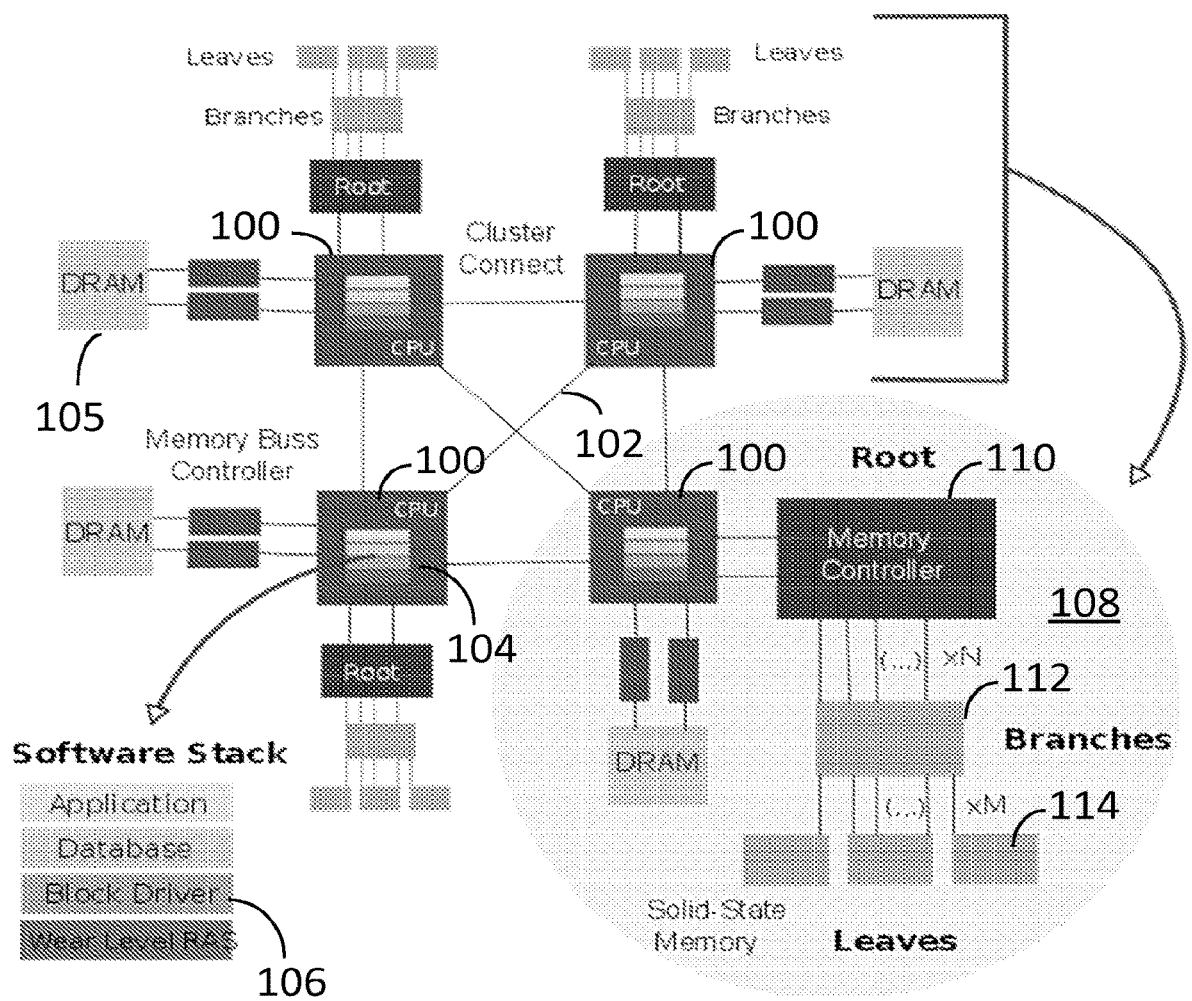
FIG. 1 illustrates a system configured in accordance with an embodiment of the invention.

A block diagram of an embodiment of the invention is presented in FIG. 1. It comprises several CPUs 100 each with many computing cores interconnected by a memory-speed interface 102, sometimes referred to as a cluster connect. Each CPU has a cache 104 and local memory 105, in this case DRAM, or another similar type of memory. Each CPU 100 also possesses local memory roots 108 operative as extended solid-state memory. The computing cores execute a software stack 106 resident either in local memory 105 or on the branches 112 connected through the memory controllers 110. In one embodiment, the software stack includes application programs, a database, block drivers, and wear level Reliability Availability Serviceability (RAS) modules, as discussed below. This block diagram pictures one of many possible configurations of the invention.

The number of simultaneous data accesses that can be serviced by a computer limits the performance of many data driven applications. Increasing the number of computing cores makes this problem worse. The disclosed system provides a large number of memory chips with a multi-rooted interconnection to the CPUs housing the computing cores. It provides efficient parallel application access to the data. Specialized system software manages the efficient scheduling of the computation and data access.

The disclosed system can be built in a variety of configurations that are suited to particular usage patterns. The invention may be optimized for a large number of specific uses such as these large memory consumption applications: Business Intelligence, Business Analytics, Geo-Seismic, Medical Imaging, Social Networking and Patient Management.

In one embodiment, a root memory controller 110 connects to a complex of interconnected CPUs 100, each consisting of multiple cores, and drives a hierarchy of branches 112 and leaves 114. Observe that each branch is attached either to another branch or a number of leaves or a mix of both. A leaf 114 is composed of flash memory or other solid-state or digital memory. In particular, there may be 1024 or more memory chips attached to a single root (e.g., FPGA(s) or ASIC(s)) through branches. Each CPU complex can be connected to eight or more roots. Consequently, if FIG. 1 were accurate and to scale, the number of solid-state memory leaves would overwhelm the figure. In this architecture the CPUs have thousands of memory targets that may be accessed in parallel. The number of CPUs in the CPU complex and the size and number of memory trees can also increase to very large numbers. The balance reflects the need(s) of a particular use (application). The components in this architecture are composed of both hardware and software. They may include the following:
1. Data Management System
   A database or data management system that may be, and often is
   1) Multithreaded;
   2) Utilizes a single shared memory model, or a distributed memory model, or a combination of both, in order to achieve a high degree of parallelism. In some embodiments, this may be a cache coherent memory model in which each CPU thread caches its state in the memory.
2. Memory Management System
   A Memory Management System that can be, and often is
   1) Multithreaded to exploit large multi-cored systems;
   2) Highly Parallel;
   3) Very Large Capacity;
   4) As a metaphor: moving down the memory management system results in growing parallelism. Effectively multiplying the concurrent operations at each level as the memory access moves from the root to the branch to the leaves.
3. Cache Management System
   A Cache Management System that, in some embodiments, maintains data coherency across individual nodes (or cores) in the computer system.
4. Memory System Each memory system consists of roots, branches and leaves, as mentioned above. In one embodiment, there are four roots sometimes referred to herein as Memory Modules (MMs). Conceptually, the roots replace four memory riser cards in the computer's chassis. They connect to the distribution network, providing an interface to a number of branches, each of which connects to a number of leaves.

Figure 2:
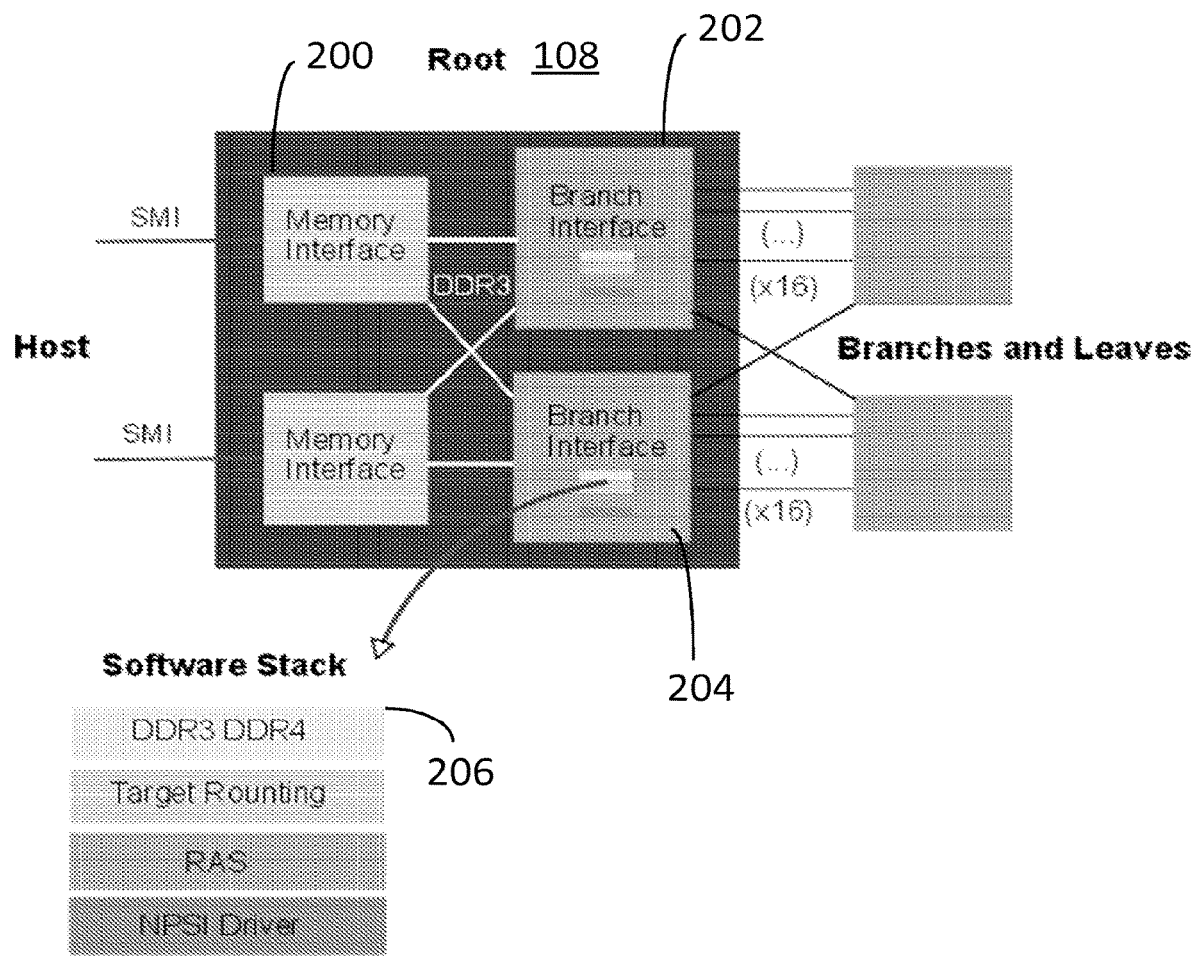
FIG. 2 illustrates a root module configured in accordance with an embodiment of the invention.
Figure 3:
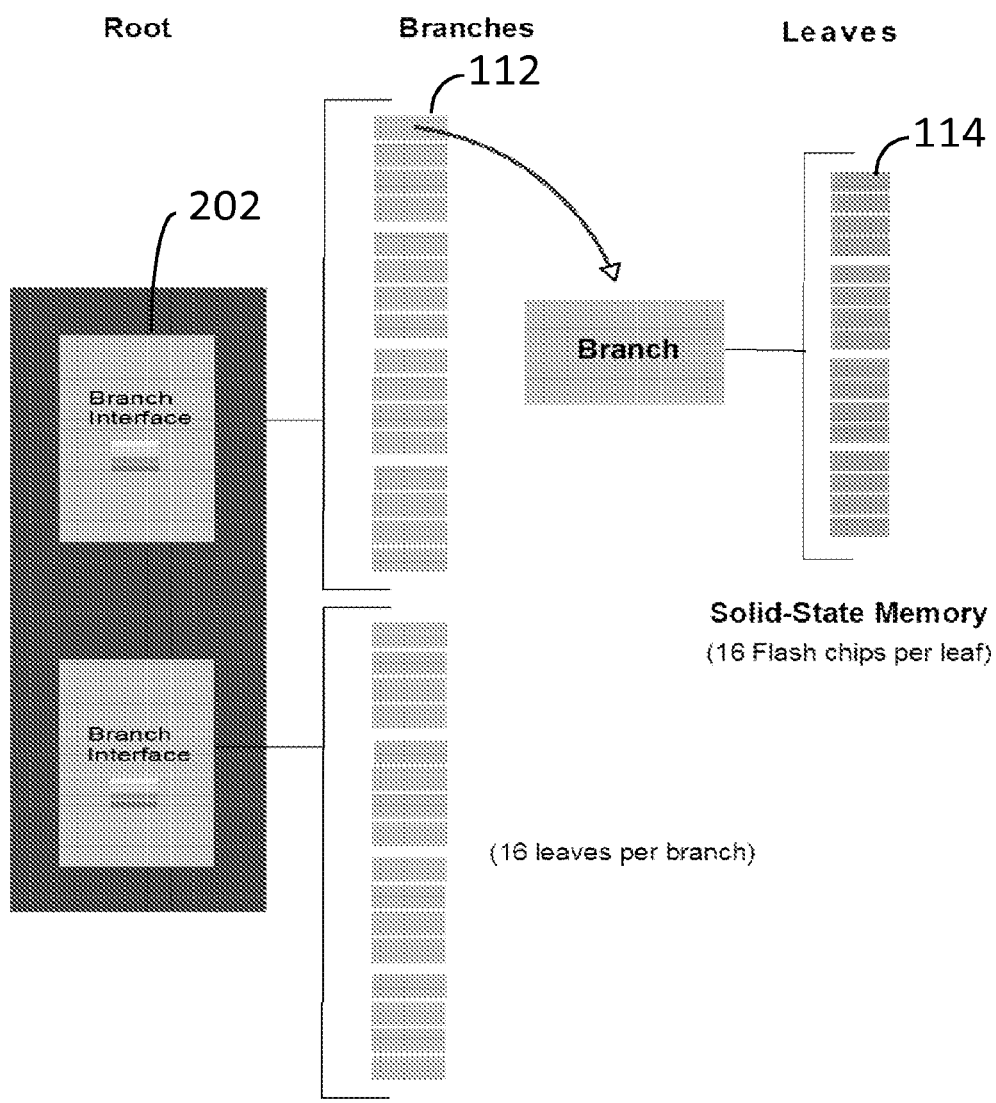
FIG. 3 illustrates a branch and tree architecture utilized in accordance with an embodiment of the invention.

FIG. 2 shows a single Root 108 comprising two memory interfaces 200, two branch interfaces 202, sixteen branches, and sixteen Leaves, containing at least one solid-state device per leaf. FIG. 3 is a more detailed depiction of a branch interface 202 and its connection to a set of branches 112 that have corresponding leaves 114. In one embodiment, each root has a total of 8 TB of Flash for a system total of 32 TB—half of which is available to user applications and half of which is allocated to redundancy and system use. In other embodiments, the allocation of memory resources to applications or redundancy may be different or may be controlled directly or indirectly by the application.

Each branch interface has internal memory 204 to execute a software stack 206. The software may contain a double data rate (DDR) controller, target routing software, a RAS module and a Non-blocking Parallel Solid State Interface (NBSI) driver. The branch interface may have computational resources in the form of FPGAs or ASICS.

The memory interface is connected to an inter-processor data distribution network in which all CPUs have access to all memory. We describe the memory as a multi-rooted tree composed of branches and leaves as described in detail below. We describe the computing complex as a shared-memory multiprocessor, which may be of a uniform or non-uniform type. The root may be one of many instances, which are locally or remotely connected. The interconnection technology may affect some of the functioning of the system, but it does not necessarily change the basic architecture or its operation.

In one embodiment, a Memory Master Controller (MMC) and a Memory Slave Controller (MSC) are implemented with dedicated hardware. A root is an MMC, while a branch is an MSC and a leaf is a solid-state memory device. For example, Altera Stratix V FPGAs may be used for both the MMC and MSC. In this case, each FPGA has 48 serial links operating at 12.8 Gb/s, and three links from each MMC go to each of sixteen MSC devices. Each MSC in turn connects to 16 leaves, each a solid-state memory device, for example a 32 GB Single Level Cell (SLC) NAND Flash device. Many other implementations, including implementations in which the components and their interconnections are changing in real-time, are possible.

Figure 4:
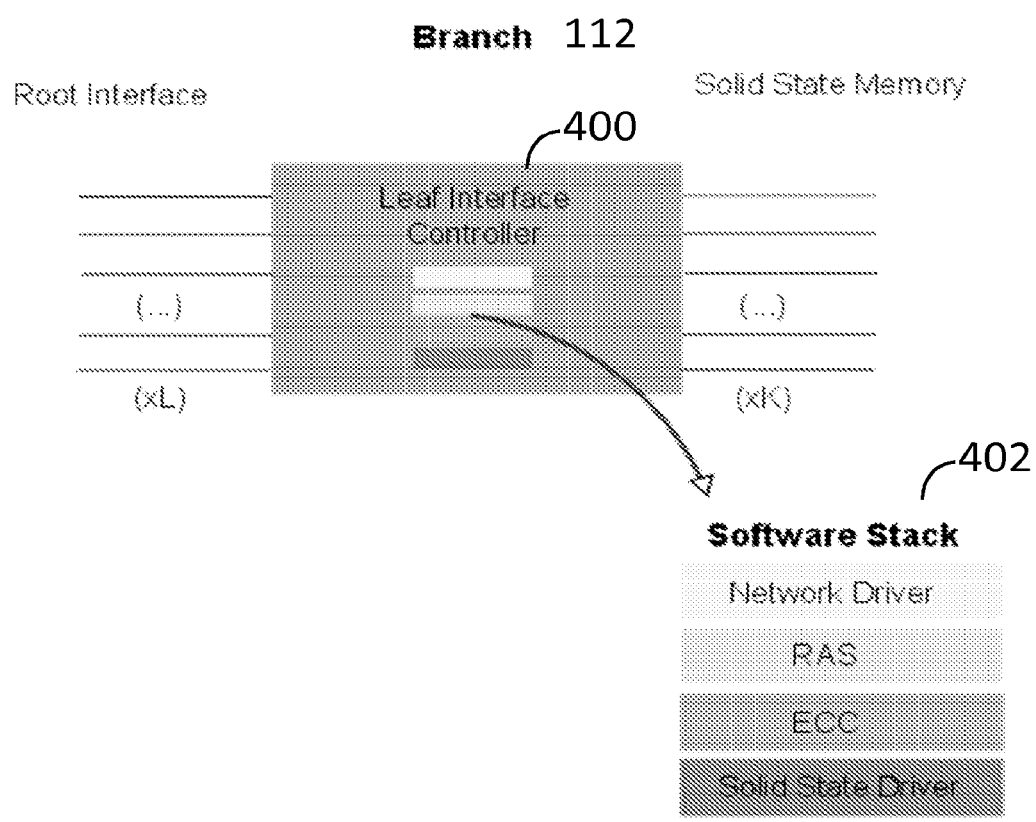
FIG. 4 illustrates a branch architecture utilized in accordance with an embodiment of the invention.

In one embodiment, a memory branch is a component with a number of leaves attached, where each leaf is a flash memory chip, as shown in FIG. 3. FIG. 4 illustrates a branch 112 with a leaf interface controller 400 that executes a software stack 402. The software stack 402 may include network drivers, RAS, error correction codes (ECC), database engines, data compression engines, encryption engines and solid-state drivers. These components provide a means of performing computational tasks on the data stored in the leaves without moving it to another processing unit. Observe that the stack is closer to the media because there are compute resources in the roots and branches.

In an alternative embodiment, a memory branch is a component with a number of branches and leaves attached where each branch executes the same or a different software stack. In heterogeneous systems, each branch may be aware of its neighbors and cooperate in the implementation of the network drivers, RAS, error correction codes, database engines, data compression engines and solid-state drivers.

In a further embodiment, as is the case with leaves, a branch contains a significant computing resource which implements rapid search or compression/decompression as data is read/written to the leaf. Local processors can encrypt, compress, scrub, validate, encode and decode data packets as well as route, validate, encode and decode header and command information present in the communication channels between the CPU, branch and root components.

Branches finally end in leaves. Each Leaf is a device that acts to read and write data pages into a non-volatile store. The leaf may be implemented in many forms. The Memory Management System controls the use of the leave's pages. Leaves may be implemented in various technologies but they have the property that a data page that has been written can also be read. Leaves do not need to be homogeneous or heterogeneous as to either device type or operating parameters.

In a further embodiment, a leaf contains a significant computing resource which implements rapid search or compression/decompression as data is read/written to the leaf. Local processors can encrypt, compress, scrub, validate, encode, and decode data packets as well as route, validate, encode and decode header and command information present in the communication channels between the CPU, branch and root components.

In some embodiments, one or more multi-layer architectures overlay the root-branch-leaf structure and includes varied techniques for encoding and decoding as described below.

In some embodiments, memory leaves have port access to mirrored memory spaces in a redundant system. In one embodiment, approximately half of the memory system stores data and another half of the memory space supports rapid data access. In another, a fraction of the physical memory is reserved in order to provide adequate performance. In a further embodiment, the memory distributes data across individual leaves using specially designed methods that minimize inefficiencies. In another embodiment, the memory components themselves may be composed of individual components that together produce the desired behavior. In a further embodiment, a segmented system has isolated domains that remain operative in the event of the failure of individual domains. In one embodiment, these components are interdependent. In order for the whole system to function efficiently, the interconnected components depend on each other for correct functioning and timely completion of each other's work.

This invention is a computing system composed of several inter-related parts that may have different implementations yielding mechanisms with different uses. The efficient interaction of these components creates system performance at an otherwise unattainable level. In the following exposition we enumerate several of the components and their functioning.

One embodiment of the invention provides performance improvements in wearing and writing to memory. Pooling of resources (computational, memory, connection bandwidth, etc.) creates the opportunity for optimization. When many servers attempt to serve many clients that attempt to access the same data, data consistency becomes an important requirement. The use of multi-level caching further complicates the architectures, which may be used to address these issues.

An embodiment of the invention is a mechanism to improve the performance of a group of devices by distributing work across all of them. Traditional Solid State Disks (SSDs) do "wear leveling" within the device and must do so whenever the device needs to erase a block. This is because they can only distribute writes within their device, even if a higher-level entity tries to distribute writes on other devices. The cost to execute the individual actions on a single device is much higher than the cost of execution when the writes are pooled. The disclosed system optimizes erases and writes across a large number of channels in order to enhance overall performance. It includes a "selection" mechanism and a real-time optimization mechanism that disperse the work wisely without substantially increasing the latency of the operations as viewed by the client.

For example, this technique is used in the architectures of FIG. 1 and/or FIG. 2. An example transaction is the distribution of data pages using a log structure to increase the efficiency of reclaiming erased blocks (e.g., "garbage collection"). Pages of memory are mapped into a core's virtual memory address space. The pages are written in a sequential manner to consecutive solid-state memory addresses. These write operations may be grouped together in order to more efficiently utilize the memory device's bandwidth. For example, four pages may be written simultaneously onto the four planes of a particular flash device. This method fills one block of the flash device before moving on to the next. Consequently, for many applications that perform delete operations in a similar order before again performing write operations; many deleted pages can be reclaimed from the same block simultaneously. In other circumstances, the write operations may be assigned to different blocks in order to maximize the number of pages that may be reclaimed.

Another aspect of the invention is a mechanism to efficiently move blocks between memory components in a memory hierarchy. In the above examples, we have a hierarchy of processors (CPUs, roots, branches) involved in accessing data from solid-state devices. Any time data is moved from one level of the hierarchy to another, there may be a performance penalty. Conversely, if an operation is performed without crossing levels a performance improvement is commonly realized.

One example of an opportunity to realize performance gains occurs during erase operations for solid-state media. In preparation for erasure, one must move all pages containing data that is still in use ("live"). The CPUs do not need to examine this data during this time; therefore we realize a performance gain by not crossing hierarchy levels to the CPU with this data. Some embodiments can move this data from branch to branch and some from root to root. In the case of movement between roots we move a copy to the CPU and back to the original root or another root. These copies require memory space in the CPU, which in turn impacts the memory available for root buffer management, cache utilization on the CPU, and CPU buffers. Data movement from within a root or from root to root can be accomplished using a load/store model in the CPU or using a direct memory access (DMA) model in the roots. The decision to use one path or the other can be made in the operating system layer or potentially in the roots themselves, or even using a distributed mechanism combining the two.

Another embodiment of the invention is directed toward a mechanism to distribute reads to maximize performance. As devices with disparate latency, throughput, and access methods evolve for data, CPUs cannot access data and expect the uniform performance they have come to expect in DRAM. This mechanism parallelizes reads in order to achieve very high throughput from non-DRAM devices. These performance levels are an order of magnitude closer to DRAM speeds than other approaches.

In one embodiment, we examine a system containing solid state Memory Modules with 8 TB of data that have long latencies and complex access mechanisms. In particular the solid state media on a root (Memory Module) allows 2048 simultaneous 4096 byte reads compared to a single 64 byte read using DRAM modules with 256 GB of data. In this embodiment, each 4096 page on the system takes 100 μseconds and each 4096 byte read on DRAM takes 1 μsecond. In this embodiment, there is an additional 5 μseconds per page for the system after the simultaneous read.

While using DRAM is 100 times faster reading a single page, when reading 2048 pages, DRAM is only 5 times faster than the disclosed system. Larger embodiments, composed using more memory chips, narrow this difference considerably.

Our invention includes the software, firmware, and hardware design to enable the parallelism described above. This invention embodies a mechanism where the read requests and/or data are already being distributed so that subsequent reads can take advantage of the parallelism in the memory system. The basic technique is implemented by placing data pages that are likely to be read simultaneously on different (independent) devices (channels). In one embodiment, each page is written onto a device on a different channel (or branch) relative to a previously written page.

Another aspect of the invention is a mechanism for distributing writes to maximize performance, while making efficient use of buffers and channel bandwidth. It was previously noted that read requests and/or data must already be distributed so that subsequent reads can take advantage parallelism. This embodiment of the invention distributes data writes to facilitate parallelism in subsequent reads.

In one embodiment, the Linux Operating System is used. Like most modern Operating Systems, Linux uses a Memory Management System that buffers data in DRAM to/from a data device like a spinning disk or solid state media. Applications may write data by using Linux's DRAM directly, using Linux's DRAM as a staging area, or by providing Linux with a reference to the Application's DRAM. In all these cases, writes are distributed over time and space.

The disclosed system has a huge number of independently operational units. We distribute page writes across those units. This is a temporal distribution because we write pages in different units based on when they are ready to write.

This distribution helps performance in two ways. First, just like reads, the system can do simultaneous writes to independent units (leaves), enabling parallelism. Second, subsequent reads will also be distributed and therefore capable of taking advantage of the parallelism. Because there are so many leaves, it is unlikely that reads conflict with each other, given the temporal distribution and large number of units.

Another aspect of the invention is a mechanism implementing wear groups across channels or logical units. The disclosed technique is method to efficiently reuse "erasure blocks" of memory and to divide the usage evenly across pages. The technique may be performed in the software stack 206, or at a root 108 (e.g., RAS of FIG. 2), or by both cooperating to optimally perform the technique.

The block erasure mechanism works very similarly to memory space reclamation (e.g., garbage collection). However, the mechanism handles three added complications that a normal garbage collection technique does not. First, pages must be erased in large contiguous chunks before they can be written again. Second, pages eventually wear out, so one must implement wear levelling. Third, it is desirable to spread traffic across as many channels as possible in order to get the best read and write performance. By implementing an enhanced generational garbage collector, one can achieve good performance (addressing points 1 and 3), while still providing good wear levelling (addressing point 2).

In a generational garbage collector, all new objects are placed in a young generation pool. After garbage collection is performed on the young generation pool, objects that survive collection are placed in an older generation pool. Objects that survive collection a second time are placed in an even older pool, and so on. A simple implementation of this using flash as the storage medium would lead to extremely bad wear levelling. Blocks used for the young storage generation would be erased far more frequently than blocks for older generations. We avoid this problem by periodically changing which generation the physical flash blocks belong to. By moving pages with high erasure counts into older generations, we reduce the number of erasures those pages will see in the future. The blocks for the different generations are balanced between the different flash channels. This ensures that one can spread read and write traffic across many different channels.

Another embodiment of the invention relates to accumulated redundant data protection stripes. This embodiment of the invention accumulates Data Protection Stripes using simple (e.g., XOR) debit/credit computations onto fault-independent memory devices. The technique includes a method for fast reconstruction of damaged data blocks. This mechanism may be embodied in the CPUs, the roots, or the branches of the system. Depending on the particular embodiment, it will interact with the RAS embodiments in different ways.

Erasure codes applied to devices with large asymmetric read-write times need a way of bounding overhead and providing large decreases in undetected errors. In addition, low computational overhead and bounded space are highly desirable. We present a mechanism for erasure coding data that achieves low, fixed overhead in space and time with adjustable error detection and correction levels.

The following data protection scheme is built on top of the disclosed write mechanism. FIG. 5 illustrates a stream of 17 data blocks. In this example, parity values are computed for four data blocks at a time, but the technique could be used on any number of data blocks. The parity values utilize a sliding window of data blocks. To improve efficiency, a prior computed parity value (e.g., P1) is subject to an exclusive-OR (XOR) operation, with the result combined with a new data block (e.g., D5). This approach can be cascaded for all new arriving data. FIG. 5 provides the mathematical basis establishing the efficacy of the approach. This approach combines low fixed computational overhead with fixed space requirements. In effect, this mechanism utilizes a "moving window" which contains data blocks that are XOR'd together to form a parity block. As the window moves, new blocks are XOR'd to the parity block and old blocks previously XOR'd to the parity block are again XOR'd to the parity block. This effectively adds a new block and removes an old block, thus "moving the window."

Another embodiment of the invention is directed toward reconstructing data from parity when a direct read is waiting for a previously requested erase, or other operation that is slower than a read, to complete and release the channel. This functionality may be implemented in software in the software stack running on the CPU in FIG. 1. In particular, in this embodiment the functionality is implemented at the bottom of the software stack. In general, the functionality is directed towards a method for minimizing the latency of read operations by reconstructing the accessed data from redundant data stored on a different device when the primary device is busy.

Memory pages are assigned different channels (e.g., a link from the CPU, through a root, to a leaf). Each leaf stores many data pages. Only a single data page may be read from or written to a leaf at a time. Pages within leaves are sometimes erased. It takes much longer to perform erasures or other slow operations than it takes to do a read or a write and many reads and writes take place simultaneously across the leaves. Consequently, it is desirable to avoid reading from a leaf where an erase operation is in progress.

Therefore, in addition to data pages, we also store data protection pages. That is, for a given data page A, we store a set of data protection pages for A that are stored on different leaves. In the event that data page A is lost, the contents of data page A can be reconstructed by reading some of the data protection pages for A and some other data pages (not including A). The important thing to note is that the contents of data page A can be reconstructed without having to access the leaf that A resides in.

The usual application for this technique is to reconstruct the contents of A if the page (or even the whole leaf or branch) containing A is lost. However, we can also use this mechanism to improve performance, as follows: If the leaf containing A is busy, and will be busy for a long time, instead of reading A directly, we can reconstruct A from the necessary data protection information. In the case of an erase, very often this will allow satisfying the request for A faster than waiting for the erase to complete. This technique can be combined with the moving window technique to quickly reconstruct the data.

Another approach to implementing this technique is to utilize a RAID 5 like (or other RAID) erasure code. This means computing the exclusive-OR of a number of data pages to produce a parity page or computing a more complex code, for example a low density parity check code or a so called Raptor code, which allows recovery of the needed data.

Another embodiment of the invention is directed toward a mechanism for efficient read buffer utilization in a hierarchical memory. The problem is to improve system performance through more efficient buffer utilization. Rather than allocate buffers when the software issues the read command, allocate the buffer just before the data becomes available (lazy allocation). This allows software reads to statistically-multiplex over a smaller number of buffers. In a system where the number of buffers is limited, this leads to better overall system performance.

When a CPU, reads data from a slower resource into a faster resource, such as reading from a flash memory into high-speed memory, the CPU allocates a buffer in the faster resource and waits for the slower device to fill the specified buffer. The buffer may be treated by the operating system as "busy" from the start of the operation until the data is finally returned. With this idea, the system issues a read, but does not pre-allocate a buffer for the data. The slower system (being read from) will allocate the buffer just before the data is transferred to the CPU and then fill the buffer with data. This allows buffers to be "busy" for a shorter period of time. This mechanism improves the utilization of the buffers in the faster resource, which in turn leads to increased system performance and reduces the number of buffers required for a particular performance level.

Another embodiment of the invention is directed toward a data protection scheme to optimize performance while minimizing leaf resources. Data Protection (DP) parity generation is generally simple and very fast. Large numbers of bit errors take a long time to correct. In practice, most errors encountered have a small number of bits in error.

One embodiment of the invention generates a large number of parity bits and has a two-tier correction algorithm. A small number of bits in error can be corrected in hardware in either the branch or leaf, keeping the hardware implementation small. If a large number of bit errors occur, they can be corrected in software or firmware, by using all (or more) of the larger number of parity bits stored with the data.

This hierarchical mechanism improves space and computational efficiency. This mechanism splits the Data Protection into two parts: one smaller part, with limited correction capabilities and a slower but more capable part with the correction capability in the software (or some other "higher level" of processing). For 99.999% of all required corrections, the correction logic inside the leaf will suffice. However, when the leaf is unable to correct the data, the software will use its additional capability to correct the data. This trades a small, frequently used leaf correction block plus a very infrequently used software correction block against a single, larger leaf block with extensive capabilities that are not very frequently used. Making this tradeoff leads to a much smaller, better-utilized leaf block and improves the space efficiency of the leaf. The mechanism can be cascaded into several levels, each of which improves upon the data correction capability of the previous level. Finally, other system level data protection can be applied to recover lost data from redundant copies on other leaves. Block based codes (e.g., BCH or Reed-Solomon) can perform this function. In addition, specially designed Low Density Parity Check (LDPC) codes may be used. This "soft error" technique allows for re-reading the data from the device and combining several read attempts to produce better error rates and can also be combined with the above technique for separating the error detection and correction from the rare cases requiring more complex logic.

The following discussion is directed toward various specific embodiments of components of the invention. As previously discussed, the system components include a multi-processor/multicore complex connected with a point-to-point distribution system and a multi-rooted, redundant parallel accessible (branched) memory. The system may be configured with commercially available components, such as shown in FIG. 6.

A multi-core, multi-processor, server class, hardware platform is used to implement an embodiment of the invention. In one instance, an IBM 3850/3950×5 system (based on the Intel Boxboro-EX platform) serves as the host. The working model contains 4 DRAM memory boards and 4 memory modules (roots) with 64 terabytes of flash memory. A fraction of the flash memory is available to user applications. The fraction may vary depending on the usage history and current, measured performance levels. This system is representative of many multiple processor systems connected in a Non-Uniform Memory Architecture (NUMA) configuration with high-speed point-to-point, cache-coherent memory interconnects.

The hardware components may include:
  The System Baseboard (Motherboard)
  Scalable Memory Interface (SMI) Boards (Roots)
  Flash Module Baseboards (Branches)
  Memory Module Daughter Cards (Leaves))
  Supporting mechanical, thermal and power systems.

Figure 6:
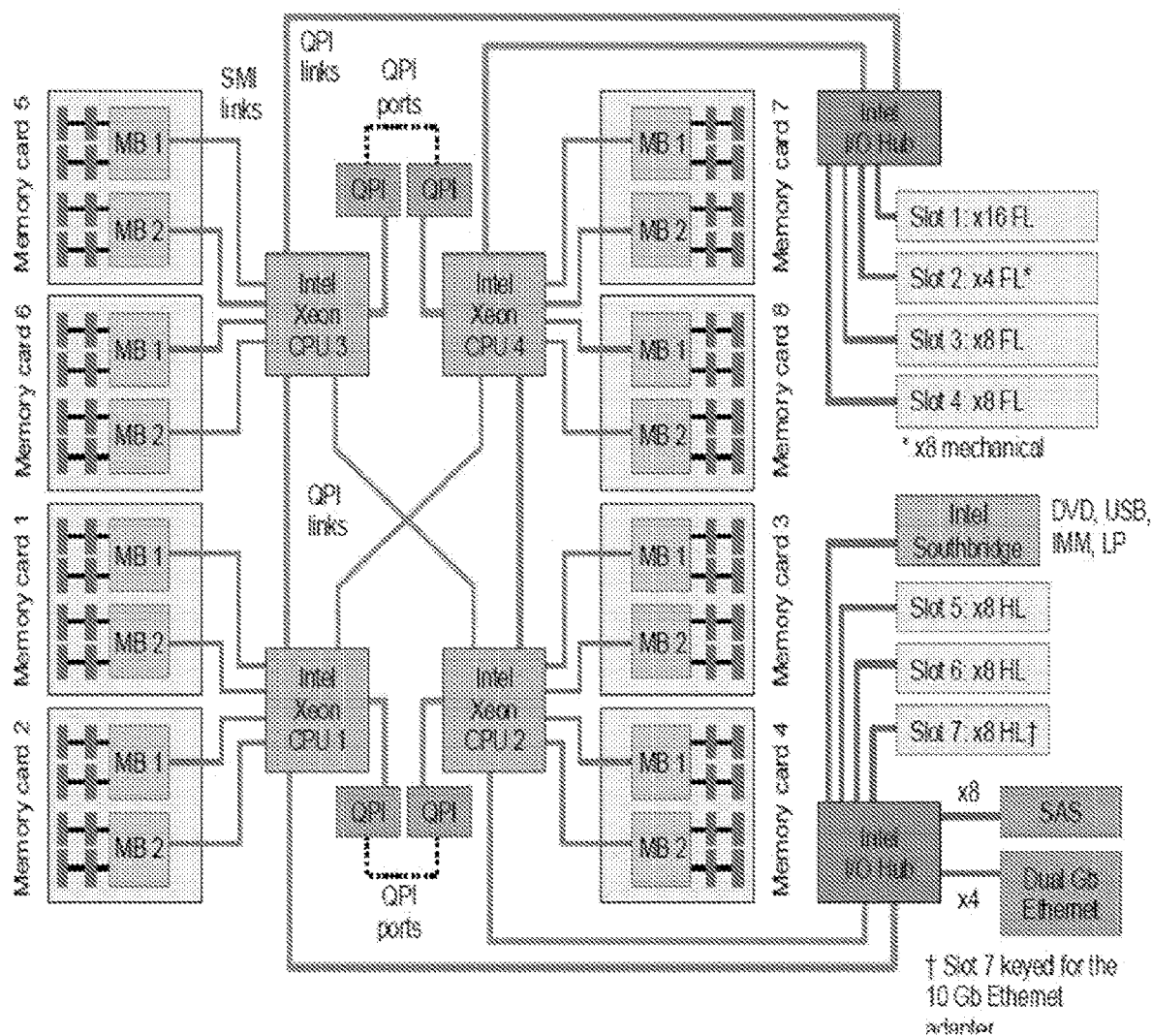
FIG. 6 illustrates off-the-shelf components that may be utilized in accordance with an embodiment of the invention.

FIG. 6 shows a multicore, server class platform that may be used to implement the invention. In particular, the figure is a block diagram of the IBM X5 3850 chassis. Based on the Intel's Boxboro-EX platform, it includes four Xeon 8870 (Westmere) CPUs interconnected via QuickPath Interconnect (QPI) links. Each Xeon chip has two memory controllers. Each memory controller runs two Intel SMI (Scalable Memory Interconnect) links in lock step in order to implement a 128-bit wide data path to memory (144 bits with check bits). Each SMI link communicates with an Intel 7510 Scalable Memory Buffer chip, which, in turn, converts SMI requests to double data rate type three (DDR3) synchronous DRAM transactions. There are two DDR3 links on each 7510. The Xeon processors perform 128-bit operations and do not use the data mask bits on the DDR3 links.

The memory controller and Cross bar is a distributed memory structure designed to transport data pages between the Serial Link interfaces and the Flash Controllers inside the MSCs. The memory controller is a branch in the system. A flash page is a property of the particular chip utilized, but in general it is a 4 KB memory block. An erase block is a multiple of the flash page size (e.g., 256 KB or 512 KB).

Figure 7:
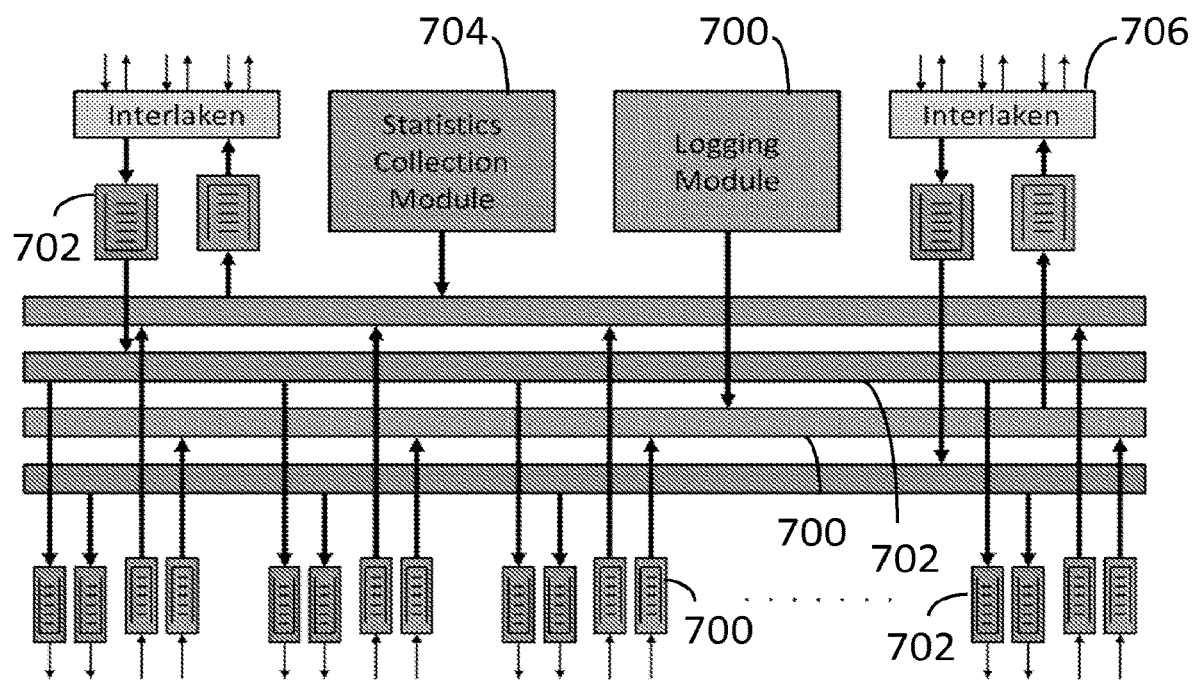
FIG. 7 illustrate a memory controller utilized in accordance with an embodiment of the invention.

The Memory Controller is used to buffer flash pages and control messages between the Interlaken interface and the Flash Controllers. Interlaken is an interconnect protocol for bonding wires (individual data connections). That is, it is a single logical connection with multiple channels. The MSC has bonded data transport channels (e.g. 2 Interlaken interfaces), one per MMC. The software may schedule pages evenly between both MMCs into a branch. In one embodiment, there are 32 branches per MSC. As there are inbound and outbound pages on each MMC, the data path can be split into 4 main parts.
  Traffic from 32 branches multiplexed up to MMC0
  Traffic from 32 branches multiplexed up to MMC1
  Traffic from MMC0 de-multiplexed out to the branches
  Traffic from MMC1 de-multiplexed out to the branches This is shown in FIG. 7. Items 700 represent one data path; items 702 represent another data path and so on. Also shown in the diagram is the Statistics block 704, which sends STATS (statistics) message to MMC0 only.

Figure 8:
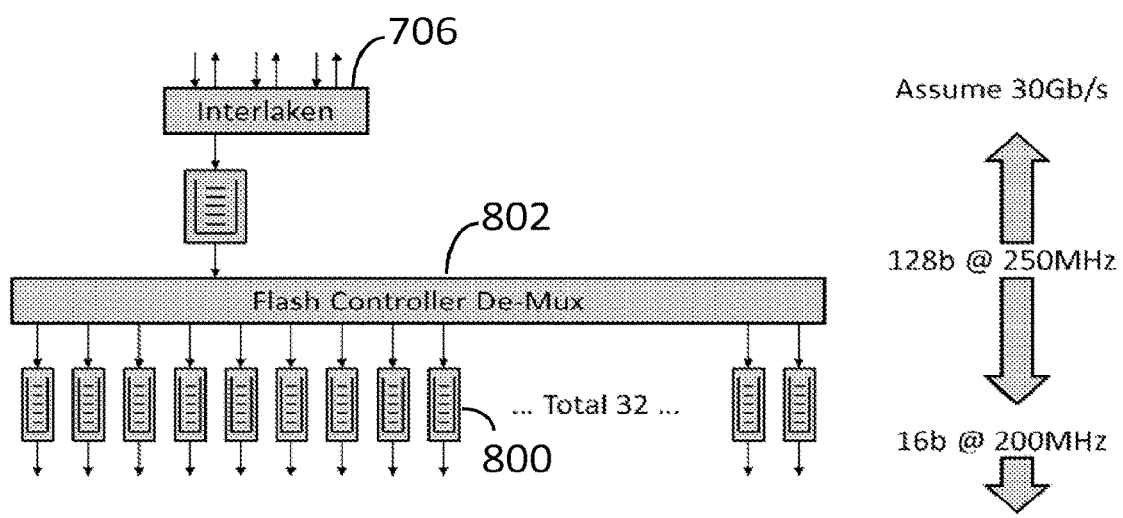
FIG. 8 illustrates a flash interface that may be utilized in accordance with an embodiment of the invention.

This distributed memory design lends itself well to the Altera chip architecture, which spreads its m20 k memories throughout the device. The 128-bit data path from the branch will be carried through the Interlaken FIFOs 706 and into the "top" interface of the branch FIFOs. There is a clock domain change between the Interlaken interface and the branch. This is done at the "bottom" interface of the branch FIFOs. Exemplary interfaces are shown in FIG. 8.

This whole Memory Controller is built as a set of distributed FIFOs 800. This embodiment has simple FIFOs, but priority could be given to messages that consist of just a header. In the "southbound" direction from the Interlaken 706 to the Flash Controllers 802, this allows read requests to "overtake" write pages. In the northbound direction it allows write completions to overtake read pages. Only the FIFOs going into the Flash Controllers will need to be changed to Priority FIFOs.

Priority FIFOs allow headers and pages to be ready for transmission to the Interlaken interface 706 at the same time. If the Interlaken interface 706 is a flow controller for Pages, but not for headers, then the headers may flow around the read pages, allowing writes to complete while nothing else can continue. This situation would make memory coherence difficult or impossible to maintain.

To insure the consistency of the memory contents a priority-based mechanism may be used. The priority FIFO, shown in FIG. 9, consists of two FIFOs, a large one built from memory 900 and a small one built from logic 902. A de-mux block 904 at the input will check message types and forward the message to the appropriate (short or long) FIFO. On the output side of the FIFOs, a scheduler 906 employing a simple priority scheme selects which FIFO sends its message (with attached page) next.

In one embodiment, the data-path interfaces are the usual 4-wire (START, END, VALID, READY) type interface with 128 data-bits. This interface will be used to interface into the Interlaken block as well as both sides of the FIFOs. This can be used to flow control the traffic into the multiplexors as well. This interface may be used for all the blocks in the Memory Controller.

Figure 9:
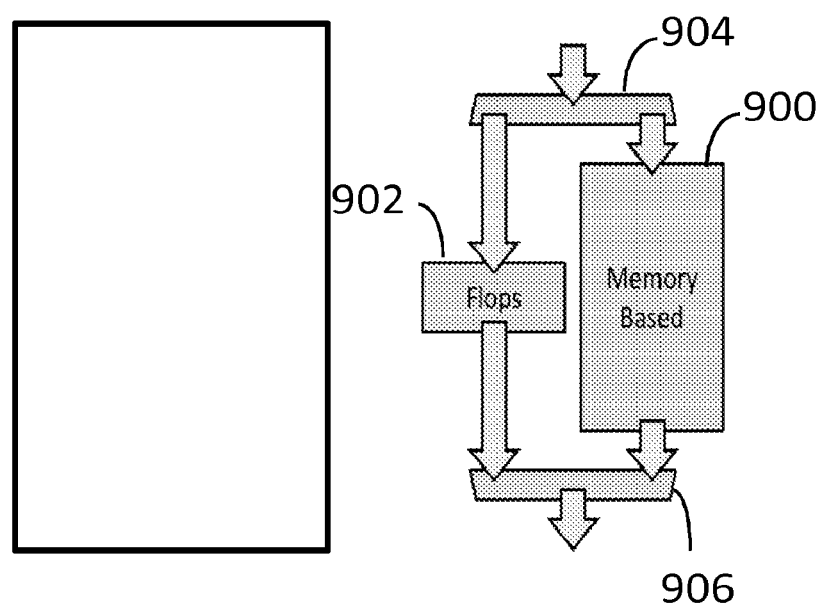
FIG. 9 illustrates a priority FIFO scheme utilized in accordance with an embodiment of the invention.

The two FIFO types of FIG. 9 can use the 4-wire (START, END, VALID, READY) interface although two Ready signals could be used to select which queue to hold from a root, such as shown in FIG. 2.

Figure 10:
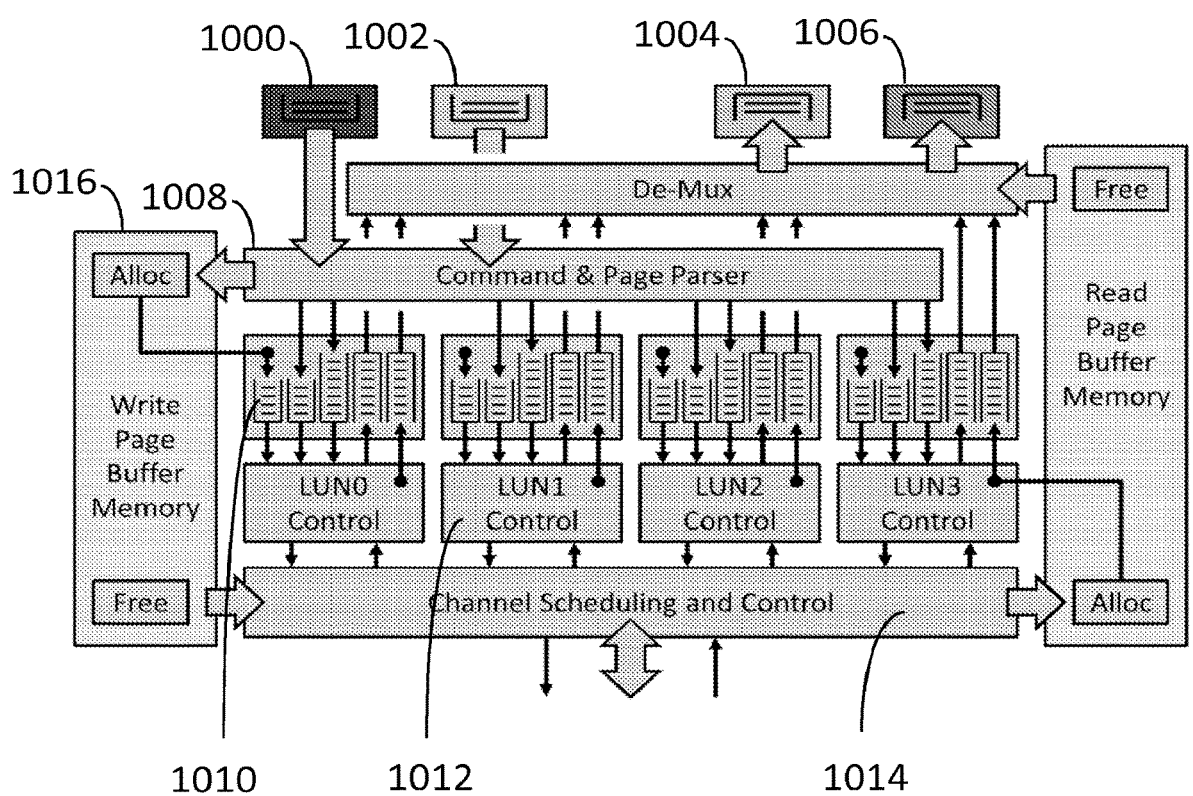
FIG. 10 illustrates a memory architecture that may be utilized in accordance with an embodiment of the invention.

A Flash Controller connects to the bottom of the memory controller and controls one flash channel and controls the operations of the flash device. FIG. 10 illustrates an exemplary memory and flash controller architecture. In one embodiment, each MSC has 32 Flash Controllers. Each Flash Controller communicates with one 8-bit flash channel. Each flash device has two channels, with 4 Logical Units (LUNs) per channel. So each flash controller controls the 4 LUNs on the channel it communicates with.

The Leaf Memory Controller connects to the Memory Controller FIFOs 1000, 1002, 1004 and 1006. In this working model the leaves are constructed from "Flash" memory chips. Write pages are stored in the Write Page Buffer Memory when they get to the Flash Controller and are read by the Channel Scheduling and Control block when the data is needed to send to the flash channel. Read pages coming from the flash are stored in the Read Page Buffer Memory and are then sent up towards MMC0 or MMC1 as appropriate.

In one embodiment, the Flash Controller is split into 5 main sections: Command and Page Parser 1008, LUN Controller FIFO 1010, LUN Controller 1012, Channel Scheduling and Control 1014 and Data Protection. Commands to the Flash Controller may be parsed in a number of places in this design. These may include: The Credit Based Flow Control, the Command Parser, the LUN Controller, the channel scheduler and the De-Mux block at the top of the Flash Controller. The Credit Based Flow Control block may receive CREDIT commands from the MMC. These commands are used as a no operation (NOP) command just to carry buffer fullness information from the MMC to the MSC. The Credit Controller removes these commands from the data stream. That block is shown in the main MSC block diagram on the MSC Design page. All other blocks that parse commands are shown in the Flash Controller block diagram shown in FIG. 10.

Figure 11:
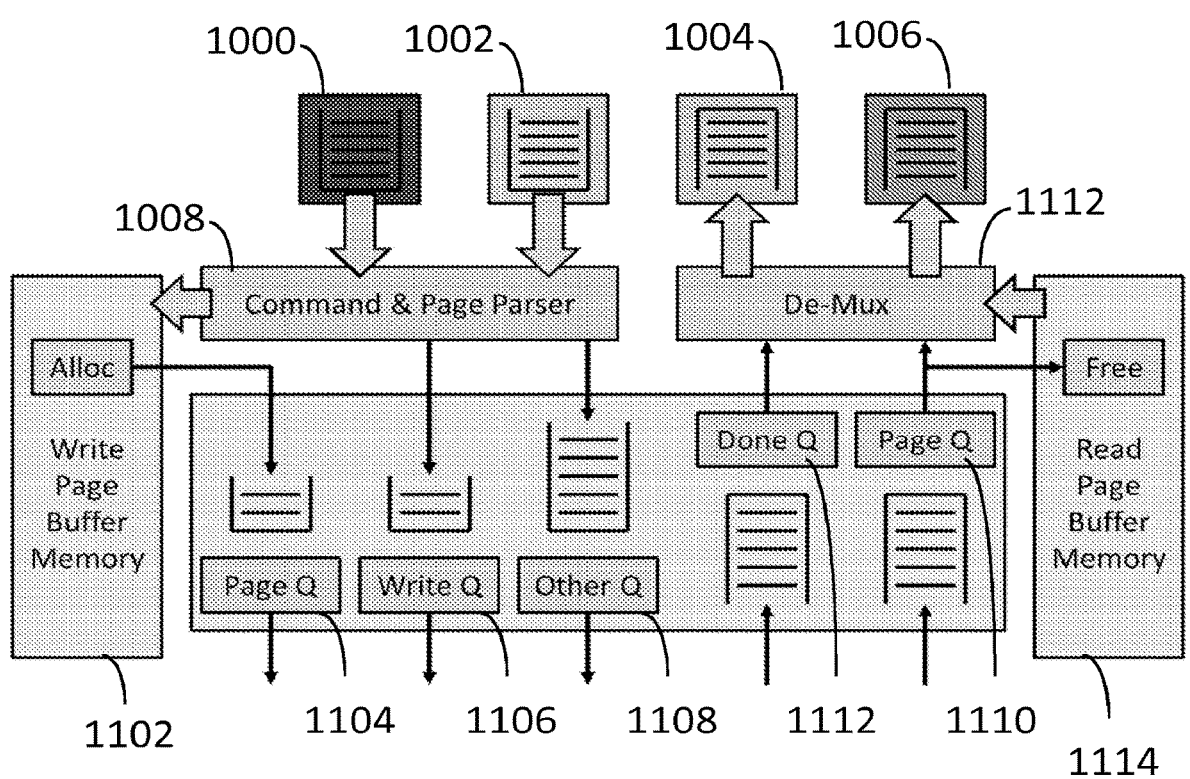
FIG. 11 illustrates a logical unit FIFO controller utilized in accordance with an embodiment of the invention.

As shown with reference to FIG. 11, the Command & Page Parser 1008 looks specifically for Page and Write commands. A Page command causes a number of things to happen. First, a buffer is allocated from the write Page Buffer Memory 1102 and the address of that buffer is placed into the page queue 1104 for the addressed LUN. Then the remainder of that page is transferred from the input FIFO (e.g., 1000) into the memory buffer that was allocated. The PAGE command is then removed from the data stream by the Command Parser block 1008.

The command parser block 1008 checks write commands with a state machine, if two pages arrive followed by a write 1-page command, there is an error. In that case a FREE_BUFFER command is inserted into the command queue and the LUN controller frees the buffer rather than leave it allocated and unused. Once a correct write command is detected it is placed into the write queue 1106. All other commands go into the "other" queue 1108. FREE_BUFFER commands go into the write queue 1106.

The LUN controller has to know which commands are destined for the flash and which it can deal with. The LUN controller can deal directly with write_error, ping and free_buffer. All other commands have some flash interaction and will be processed by the channel scheduler. The LUN controller performs buffer allocation from the read buffer memory and the buffer freeing in the write buffer memory.

The channel scheduler parses the opcode for read, write and execute commands. These are the main commands. RESET_LUN and RESET_MSC are also understood as they do a reset LUN operation on the flash device. The channel scheduler issues suitable read and write commands to the flash and moves the data between buffers. Completed commands are passed into the done queue 1110 by the LUN controller along with buffer addresses for the read commands.

The De-Mux 1112 passes the completed commands into the appropriate MMC FIFO. It has to understand the opcode command as well. A read complete has parallel page address information in the LUN FIFO. The De-Mux 1112 generates the PAGE commands of the correct form for transportation of flash pages to the appropriate MMC.

Commands are parsed into two groups and placed onto two queues, a write queue 1106 and a queue for all other commands 1108. All data pages are placed into the Write Page Buffer 1102 and the address of the buffer is passed into the page queue 1104. Having the writes separated from the other commands allows reads to be prioritized above write commands.

In the return direction, i.e. from the flash Device to the MMC, all commands for which there is a response are placed in the done queue 1112 in order of execution. Any page data, i.e. read pages, have the data placed in the Read Page Buffer 1114 and the address of that buffer is passed in the page queue 1104.

Figure 12:
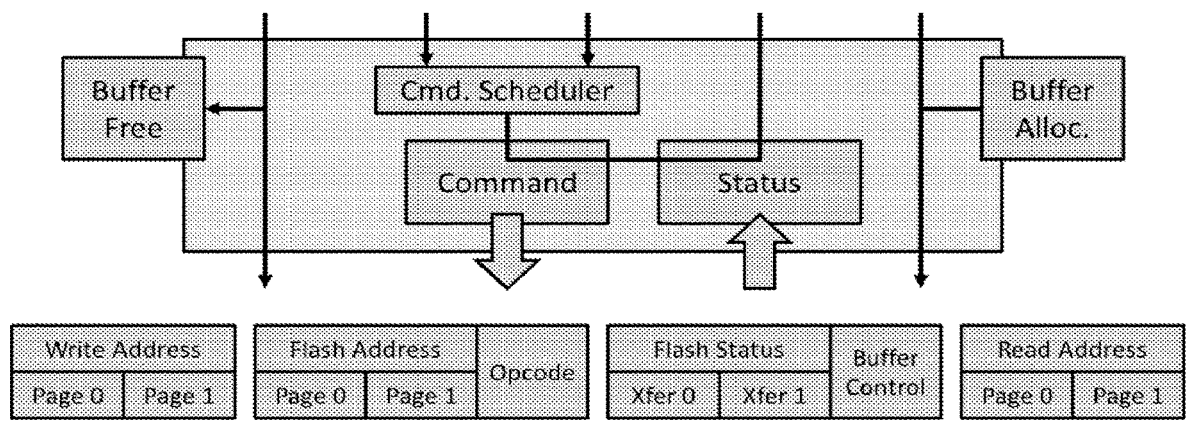
FIG. 12 illustrates a logical unit controller configured in accordance with an embodiment of the invention.

An embodiment of the LUN Controller is shown in FIG. 12. The LUN controller connects directly to the LUN FIFO. The LUN Controller has two major groups of commands: commands that go to the Flash Device and commands that don't go to the Flash Device. For example, PING is an example of a command that does not go to the flash device. A ping command is fully executed in the LUN controller. A PING command comes in through the command scheduler and is sent out directly to the done queue 1112 in the LUN FIFO. WRITE_ERROR and FREE_BUFFER are also fully handled in the LUN controller.

All other commands have some interaction with the flash device.

A RESET_MSC command resets all the buffers in both the read and write buffer memories. It also aborts any commands in progress and issues a RESET_LUN command to the flash device. A RESET_MSC command should only be scheduled when no other commands are in progress.

In general the LUN controller will "present" a command to the Channel scheduling controller. This means that a valid command, which consists of an opcode, 0, 1 or 2 flash addresses and also a read and write buffer address. In the case of a write, the memory location specified in the write addresses is used to write to the flash at the flash address. In the case of a read the flash address is used to read a page and it is written to the buffer specified by the read addresses.

The LUN controller will hold the read, write and flash addresses and the opcode (shown at the bottom of the diagram above) until the channel scheduler has passed the command over the flash channel and has a result. At the end of the command the status from the flash device is passed into the LUN controller and the LUN controller writes the status bits into a return message and terminates the command. Once the command is complete, the channel scheduler indicates how many buffers should be freed (in the write case) or how many buffers should now be allocated (in the read case). After that the command scheduler selects which command queue should be read and the next command is presented to the channel scheduler for execution in the flash device.

Figure 13:
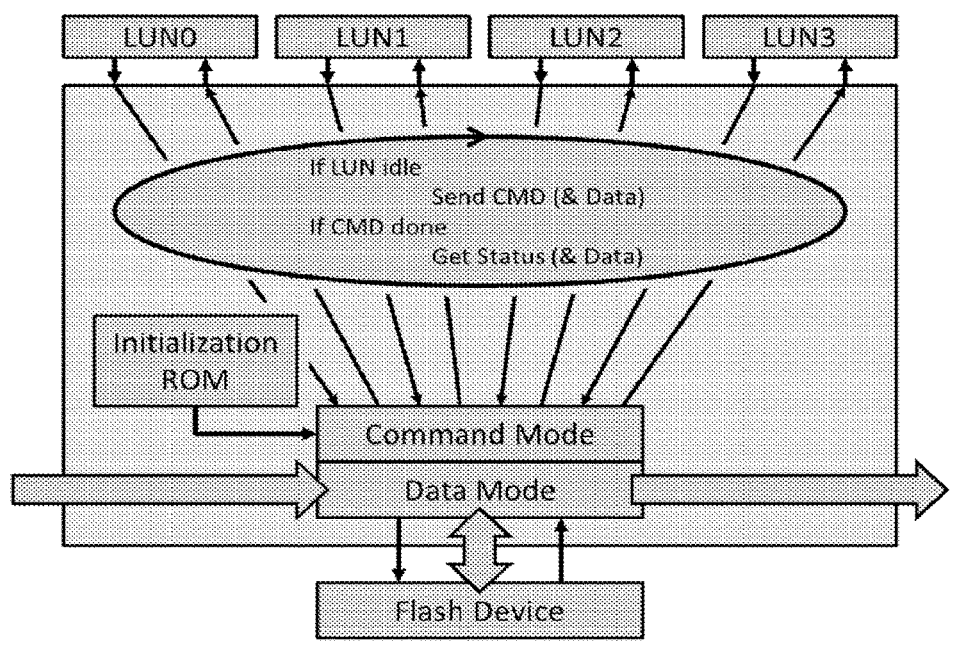
FIG. 13 illustrates a flash memory interface utilized in accordance with an embodiment of the invention.

FIG. 13 illustrates a channel scheduler and control block utilized in accordance with an embodiment of the invention. The channel scheduler is configured for flash device initialization and multiplexing command requests and data transfers from the LUN controllers. In one embodiment, all commands and data are transferred over an 8-bit flash channel to the flash device. The initialization includes an initial RESET_LUN instruction to the flash device and then commands to start the synchronous transfer mode (the flash comes up in asynchronous mode). In case one needs to set driver strengths and other initialization parameters, an initialization ROM is used to direct commands over the interface in command mode. Once all four LUNs are initialized, the main command-polling loop is started. In general a READ_STATUS_ENHANCED command is used to see if a LUN is idle and to see if a prior command has been completed. This command also has the side effect that when addressed to a specific LUN, all other LUNs are unable to drive data to or read data from the 8-bit data bus.

If a LUN in the flash device is idle and a command is available, the command is sent to the LUN. In the case of a write, the data is also transferred to the LUN over the channel. Once a command is in progress, the internal flash BUSY status is polled with the READ_STATUS_ENHANCED command. Once a command is complete, the status returned from the command is returned to the LUN controller. In the case of a read command, the data is read from the flash device over the channel and is sent to the read page buffer memory. In the case of an erase, no page data needs to be transferred over the flash channel.

Figure 14:
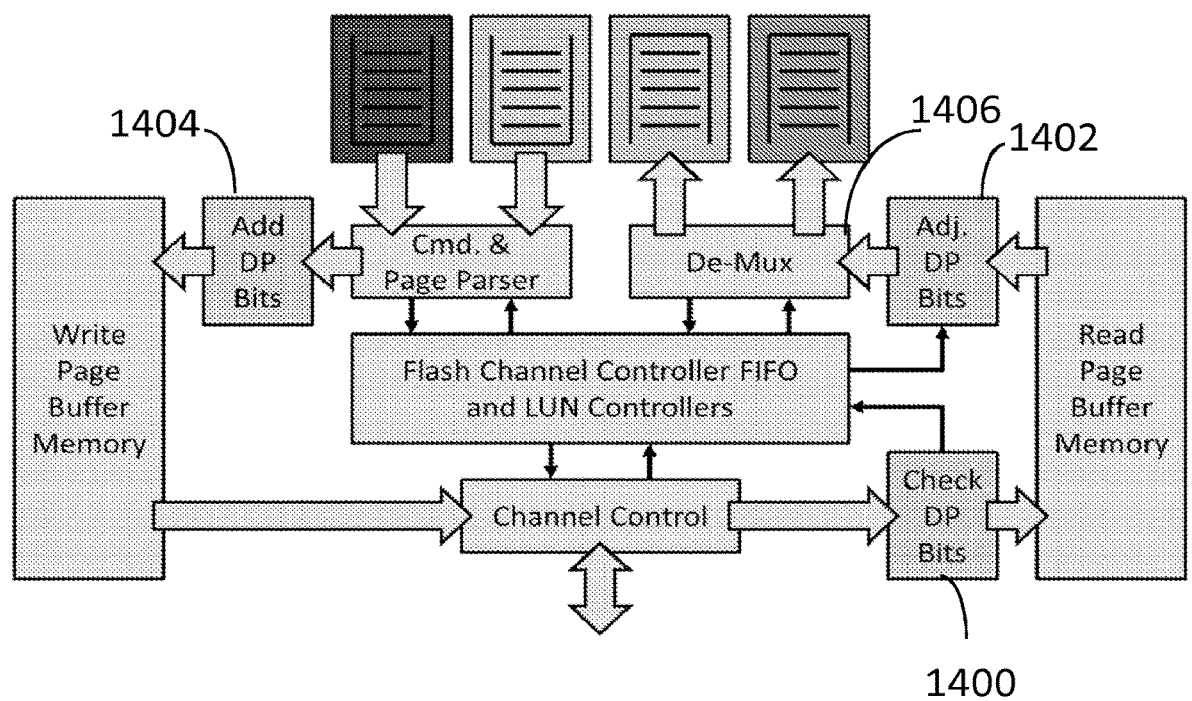
FIG. 14 illustrates a data protection system utilized in accordance with an embodiment of the invention.

Data Protection may be performed in three steps: add protection parity bits to the original data, process the data bits and parity bits to see if there are any errors (a syndrome is generated to indicate which bits are in error) and correct the errors that were found (if any) and recover the original data bits. Often the last two are combined around a FIFO. In general, the data is broken into blocks. One issue is that correction of data requires the data block and the information on which bits to correct and often the block has "gone by" when the "bits to adjust" information is available. These blocks are shown in FIG. 14. In particular, the figure illustrates a block to check bits 1400, a block to adjust bits 1402 and a block to add bits 1404.

The Add DP Bits Block 1404 accepts a 4 kB page as it is written by the Page Parser and inserts an extra 104B every 512B of data. As we write pages every 512B becomes 616B including parity bytes. When the Add DP Bits block 1404 needs to write to memory, it can pause the flow of the page and cause the input FIFO to back up a little, so the insertion of the parity bits is quite straightforward. The flash pages in the write page buffer are now protected and can be written out to flash.

Some time later when we read the pages from flash, protected pages are read from the flash and pass through the Check DP Bits block. This block passes the bytes directly into the read page buffer but uses the data bytes and the parity bytes to generate a syndrome indicting what the errors are in each block. The syndrome information is passed through a previously unspecified queue in the LUN controller along with the buffer address.

When the flash page data is read from the read page buffer, the correction specified in the syndrome can be applied to the 616-byte blocks and they can be written into the De-Mux block 1406 as 512B corrected blocks. If the syndrome is significantly larger than expected, a FIFO may be used.

In one embodiment, the inputs to the flash controller include the 4-wire handshake along with 16-bits of data. The 4-wires are start_bit, end_bit, valid and ready flowing in the other direction. The bottom of the flash controller hooks up to an actual flash device and therefore port assignments are specified by the datasheet for the device.

The System Baseboard (SBB) attaches via eight connectors on the bottom side to four Root Interface Boards (RIBs) in the computer chassis. Four Memory Module Baseboard (MMBB) cards plug into connectors on the topside of the SBB. Other than power distribution, the SBB is simply an interconnect mechanism for the purpose of simplifying the connection to the computer chassis.

The Carrier Card serves as the baseboard for sixteen branches. There is one carrier card per root and up to eight per system. This board provides power distribution to the carrier cards through suitable connectors. Redundant hot-pluggable power supplies also dock to this board.

The branch card is designed to be a field replaceable unit (FRU). It consists of a single leaf controller and sixteen solid-state devices. A 6U enclosure may be mounted in a 19" rack above the computer. Power supplies and fans sufficient to cool the unit are included, as is EMI shielding.

Off-the-shelf 12V power supplies able to run on either 220 VAC or 110 VAC power the unit. The 12V supply rails are distributed as appropriate and regulated down to the necessary lower voltages. Local Voltage Regulators (VRs) and Low-Dropout Regulators (LDOs) provide the regulation.

The use of 12V to power the unit will make eventual support for battery backup early write termination (EWT) simpler. An Uninterruptible Power Supply (UPS) operates at the level of the AC input.

Figure 15:
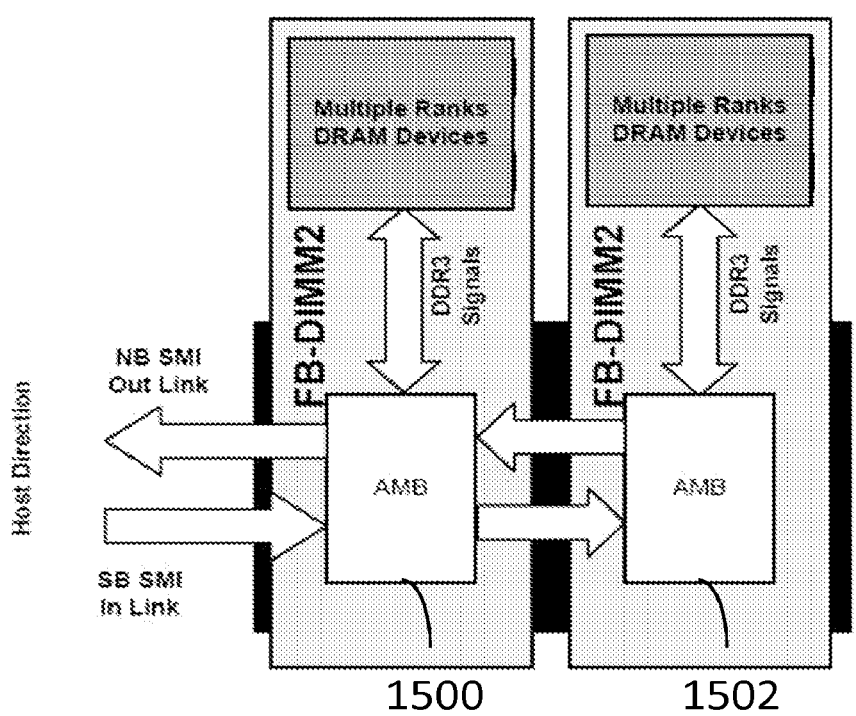
FIG. 15 illustrates a memory buffer utilized in accordance with an embodiment of the invention.

The memory buffer (e.g., an Intel 7510 Scalable Memory Buffer) is conceptually based on the JEDEC Fully Buffered Dual Inline Memory Module (FBDIMM) Advanced Memory Buffer (AMB) as described in JESD82-20A. FIG. 15 shows the logical view of the memory buffer as two independent AMBs 1500, 1502 each operating a pair of DDR3 RDIMMs. Unlike the JEDEC AMB, the Intel 7510 does not support daisy chaining. Thus, one 7510 chip is required for each of the two SMI buses on the SMIB card.

Figure 16:
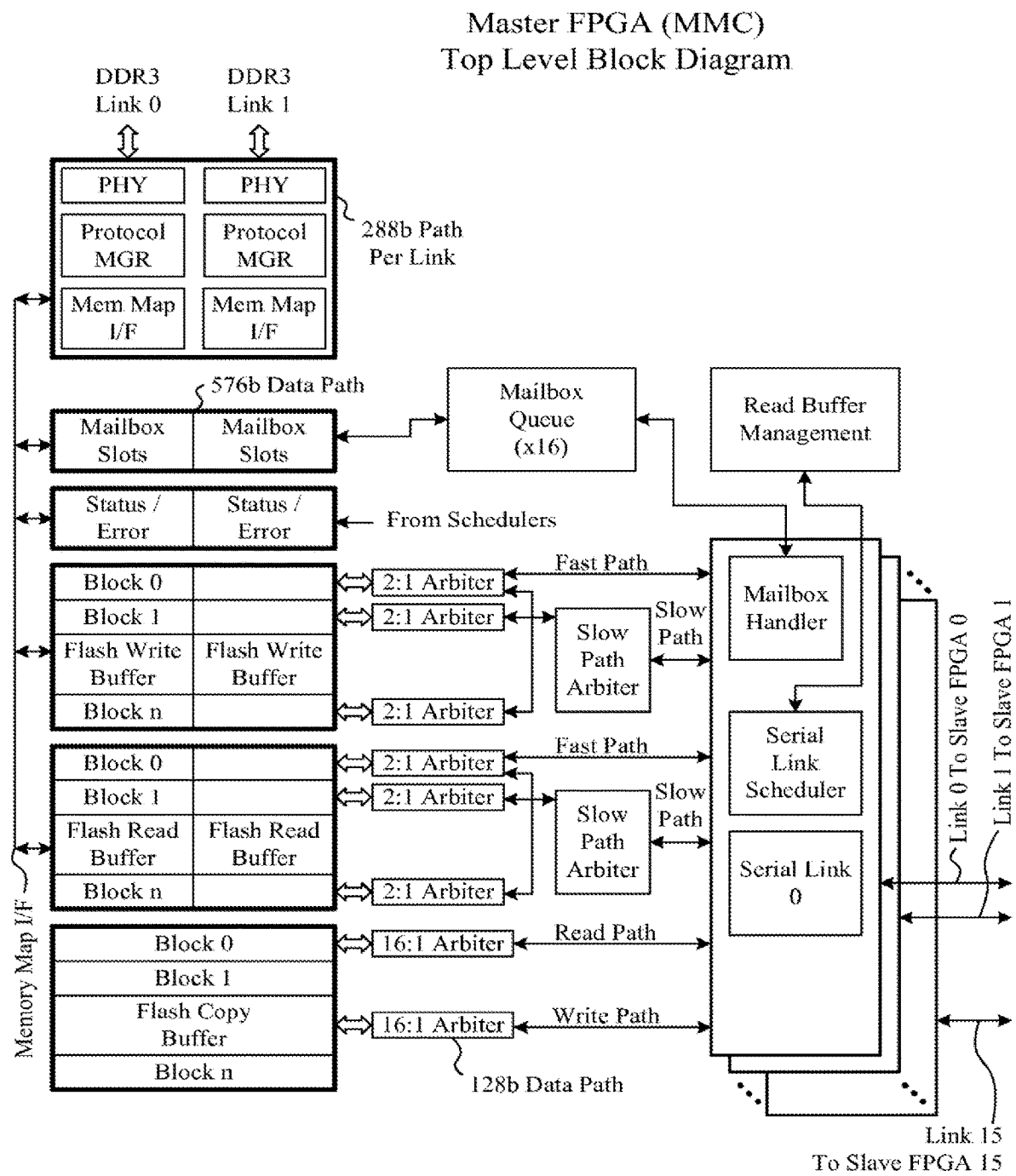
FIG. 16 illustrates a root complex utilized in accordance with an embodiment of the invention.

The root complex, combined with the branches and leaves, creates a distribution network for pages of data that will be written into the pages of the solid-state memory (e.g. flash memory) in the leaves. FIG. 16 is a representation of the root complex showing . . . .

The software created for the working model comprises a Linux block device driver and a memory module simulator. A simulation and unit test framework is available for running the Linux block device driver and the memory module simulator.

The software components typically include a Business Intelligence application, a fraud detection application, a programmed trading application, or other application requiring large datasets and therefore large memory. In addition, the application often requires random access to data and high read/write ratios. These applications are of a type that the owner/user can directly translate time to results into profits. Other applications that require fast, often real time, response such as social networking, massive player on line gaming, and real time data mining have similar requirements for large memory to hold the data being processed.

Ideally, applications require little or no modification to run in the system. Nevertheless, application advantage can always be obtained by tuning/altering the application to take advantage of the hardware and software components of the system.

In one or more embodiments, the database is a relational or object database with datasets approaching 100 TB or more. These datasets cannot be cost effectively processed using DRAM based memory systems and they cannot be processed in a reasonable time using disk-based systems. Databases designed for execution in multicore/multiprocessor environments maintain algorithms and interfaces that support these environments. The invention may take significant advantage of these interfaces. Some databases may be modified in order to provide parallel execution that distributes data accesses across many memory blocks.

Flash storage hardware necessitates decoupling the logical data addresses requested by the operating system from the physical addresses of the flash storage hardware. At a minimum, the data address space presented to the operating system is decoupled from the physical address space of the flash device. This remapping must be performed at the granularity of a single storage data page, which for this system is a 4096 byte page. It is also useful to be able to remap flash at the physical level, in order to handle bad block replacement and perform block reordering for wear leveling. Such remapping can be handled in hardware, but it is also possible to perform this remapping in software by performing an additional level of address translation on flash blocks. Such block reordering is performed at the erase block level.

We refer to the address space seen by the operating system as the Data Address Space (DAS). An address in this space is called a Data Address (DA). The page number portion of a Data Address is a Data Page Number (DPN).

We refer to the virtual address space of the flash storage as the Flash Virtual Address Space (FVAS). An address in this space is called a Flash Virtual Address (FVA). The page number portion of a Flash Virtual Address is a Flash Virtual Page Number (FVPN).

Figure 17:
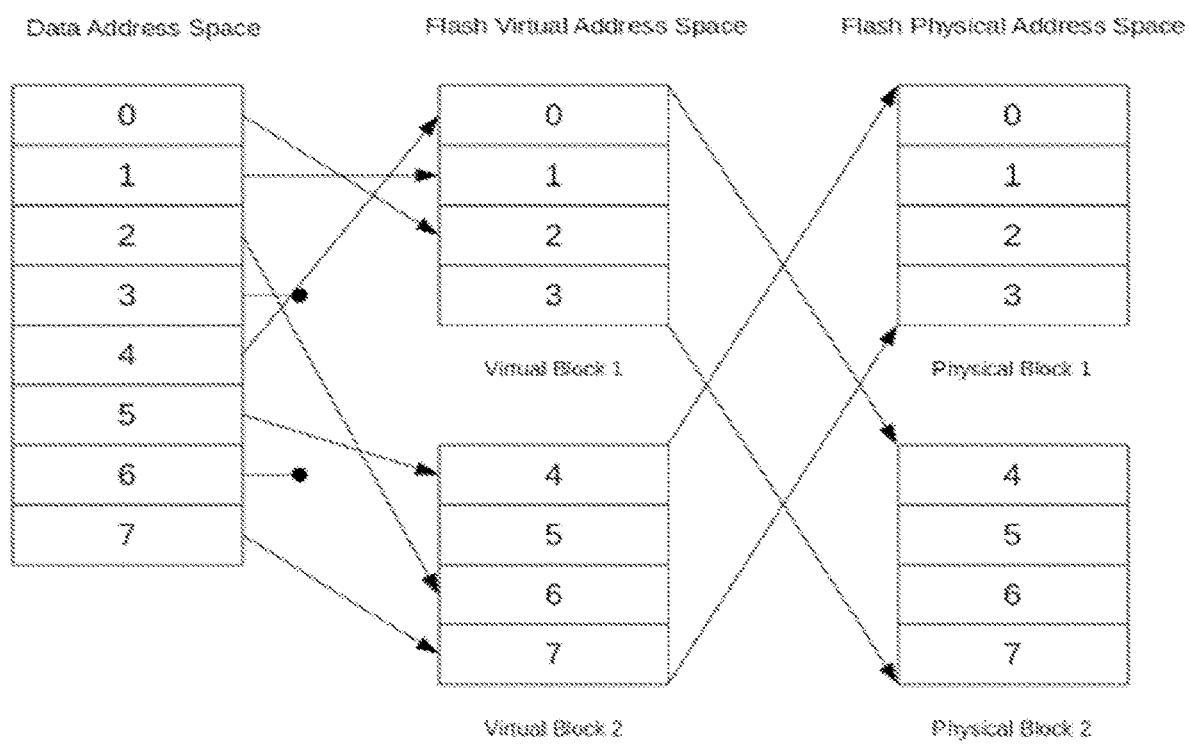
FIG. 17 illustrates an address mapping scheme utilized in accordance with an embodiment of the invention.

Finally, we refer to the physical address space of the flash storage as the Flash Physical Address Space (FPAS). An address in this space is called a Flash Physical Address (FPA). The page number portion of a Flash Address is a Flash Physical Page Number (FPPN). Note that in x86 there are already well-known terms Virtual Address (VA), Virtual Page Number (VPN), Linear Address (LA), Linear Page Number (LPN), Physical Address (PA), and Physical Page Number (PPN). We don't want to use the terms logical address or physical address in order to avoid confusion with the x86 terms with the same acronym. Thus we explicitly disambiguate by referring to Flash Virtual or Flash Physical addresses, instead of just Virtual or Physical Addresses. Mappings between the Data Address Space, Flash Virtual Address Space, and Flash Physical Address are shown in FIG. 17.

The firmware responsible for providing the data in parallel operates on data blocks that may vary in size. Smaller blocks are provided more quickly than larger blocks. The firmware may be implemented in ASICs or other hardware.

Figure 18:
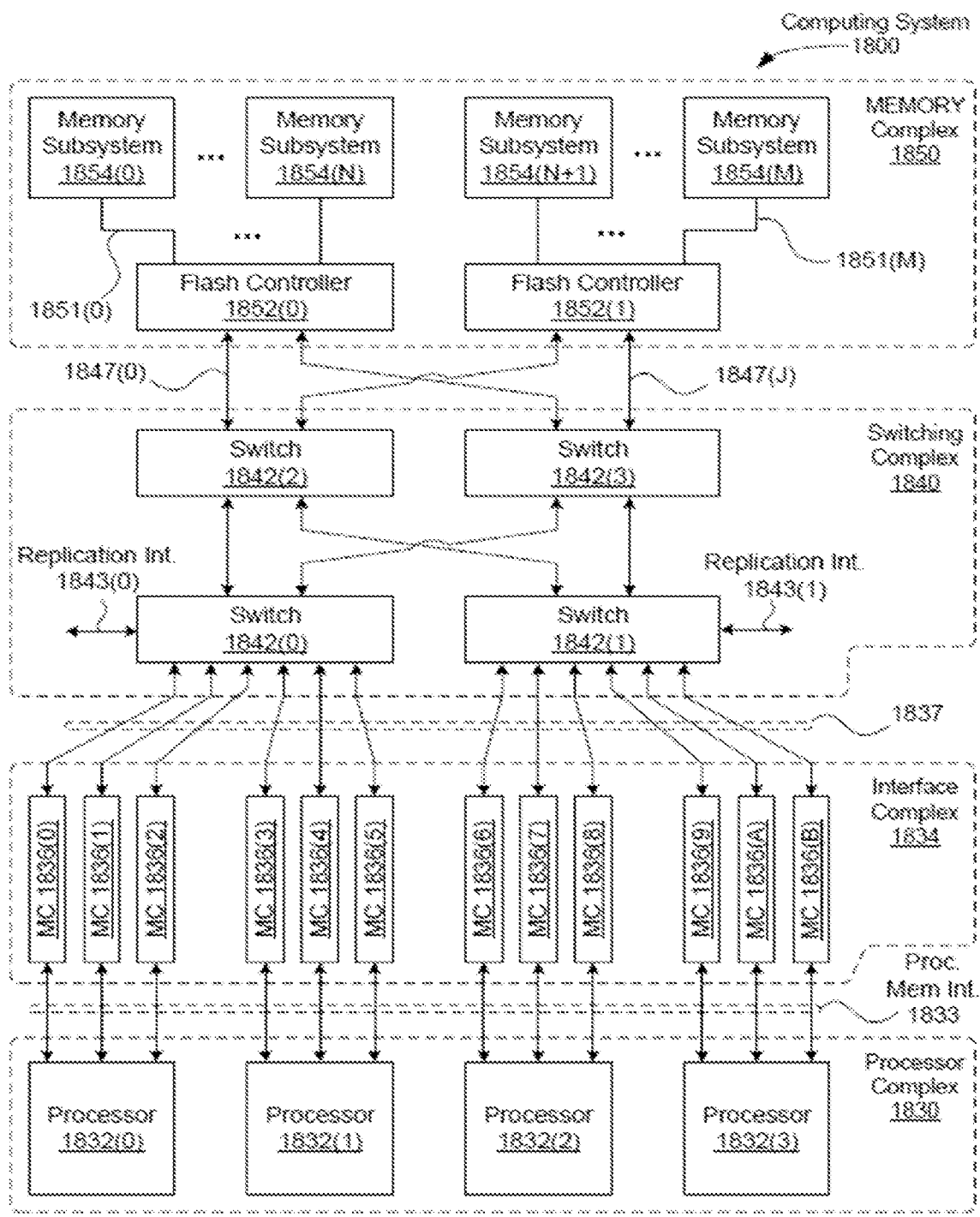
FIG. 18 illustrates a computing system configured in accordance with an embodiment of the invention.

FIG. 18 illustrates a computing system 1800, according to one or more embodiments of the present invention. As shown, computing system 1800 comprises a processor complex 1830, an interface complex 1834, a switching complex 1840, and a memory complex 1850. Processor complex 1830 may include one or more processors 1832. Each processor 1832 may include one or more general purpose central processing unit (CPU) cores, one or more multi-threaded graphics processing unit (GPU) cores, or any technically feasible combination thereof. In one embodiment, the processor complex 1830 includes four processors 1832(0) through 1832(3), wherein each processor 1832 includes at least fifteen CPU cores. Each of the at least fifteen CPU cores may include a local cache (e.g., L0 cache), or a cache hierarchy comprising a local cache. In another embodiment, at least one processor 1832 includes one or more GPU cores. Processors 1832 are coupled to interface complex 1834 through a processor memory interface 1833. In one embodiment, at least one processor 1832 corresponds to at least one CPU 100 of FIG. 1.

As shown, each processor 1832 may be coupled to a plurality of memory controllers (MCs) 1836 within the interface complex 1834. In one embodiment, a memory controller 1836 corresponds to a memory controller 110 of FIG. 1. In one embodiment, each processor 1832 is coupled to three or more memory controllers 1836. Each memory controller 1836 is coupled to the switching complex 1840 through a switch interface 1837, comprising independent links. As shown, each memory controller 1836 is coupled to an independent port on an associated switch 1842 within the switching complex 1840. In one embodiment, switches 1842 are coupled together to form a non-blocking switch cluster, such as a crossbar switch, configured to forward access requests from memory controllers 1836 to memory complex 1850 and to forward data resulting from the access requests back to corresponding memory controllers 1836. Each switch 1842 may be coupled to one or more flash controllers 1852 within the memory complex 1850 through corresponding flash controller interface links 1847. In one embodiment, switches 1842(2) and 1842(3) are each coupled to both flash controllers 1852(0) and 1852(1). In such an embodiment, switches 1842(0) and 1842(1) may include replication interfaces 1843, configured to replicate memory requests to an additional memory complex (not shown), an additional switching complex (not shown), or a combination thereof. The replicated memory requests may mirror memory access requests (e.g., read, write requests) transmitted to memory complex 1850 by switches 1842(2) and 1842(3).

Memory complex 1850 includes flash controllers 1852 and memory subsystems 1854. Each flash controller 1852 may be coupled through a memory interface 1851 to a corresponding memory subsystem 1854. In one embodiment, each flash controller 1852 is coupled to a plurality of memory subsystems 1854. Each memory subsystem 1854 may comprise one or more integrated circuit memory devices. In one embodiment, each memory subsystem 1854 comprises one or more flash memory devices. In another embodiment, one or more memory subsystems 1854 comprise DRAM memory devices. In certain embodiments, each memory subsystem 1854 corresponds to a leaf 114 of FIG. 1.

During normal operation, memory access requests are generated by the processors 1832. The memory access requests are transmitted through memory controllers 1836, and forwarded by switches 1842 to appropriate flash controllers 1852. Each flash controller 1852 directs a given memory access request to an appropriate memory subsystem 1854, where data associated with the memory access request resides. A memory access request acknowledgement is returned from the flash controller 1852. A given acknowledgement may include a block of data requested by a memory read request, or a write acknowledgement in response to a memory write request. Caching may be implemented within the memory controllers 1836, switches 1842, flash controllers 1852, or any combination thereof. In certain embodiments, write caching may provide a lower latency acknowledgement to a write request generated by a processor 1832. For example, in one embodiment, memory controllers 1836 implement write caching, whereby a write completion acknowledgement is transmitted back to a processor 1832 from a memory controller 1836 prior to associated data being written to a corresponding target memory subsystem 1854.

In one embodiment, each memory controller 1836 is configured to provide a request queue to accommodate a plurality of pending memory requests generated by multiple processor cores and/or multiple process threads associated with each processor 1832. Queue priority may be given to read requests over write requests bound for the memory complex 1850, whereas write acknowledgements may be given priority over read acknowledgements for acknowledgements bound for the processor complex 1830. Request queue handling is described in greater detail in at least FIGS. 7-10. Accommodating multiple pending memory access requests (e.g., concurrent, outstanding read requests and write requests) creates multiple design consequences and requirements for memory controllers 1836.

In one embodiment, a memory address generated by a process executing on processor 1832 is remapped from a data address space (DAS) to a flash virtual address (FVA) space, and is further mapped to a flash virtual page number (FVPN), and finally is mapped to a flash physical address space (FPAS). Such mapping is described previously in FIG. 17. A portion of the remapping may be performed by processor 1832, memory controller 1836, switch 1842, flash controller 1852, or any combination thereof.

Embodiments of computing system 1800 need to operate in configurations that are significantly larger in scale (e.g., orders of magnitude larger) than conventional computer systems, while preserving common access for each processor 1832 to large-scale data, which may reside in memory complex 1850. As a consequence of large processing scale, unconventionally large memory scale for application data, and a requirement to provide shared access to potentially all application data residing within memory complex 1850 to all processes executing within processors 1832, certain additional design features may be advantageously implemented within computing system 1800. Such design features are not conventionally required in typical computing systems. Specific design features associated with efficient performance at large scales include: (1) scalable paging operations, (2) scalable allocation and utilization of memory capacity, (3) scalable memory page and block operations to accommodate large, low latency read and write operations, (4) data protection for large data sets, and (5) performance optimizations for solid-state memory related to operational constraints associated with conventional solid-state memory devices (e.g., flash memory).

More specifically, large-scale computing over multiple processors with multiple execution threads will generally generate a large number of concurrent, independent memory access requests. Such memory access requests may be directed to a shared data image of application data in memory complex 1850, resulting in extremely intensive access utilization relative to conventional computing systems.

Furthermore, because a given application data footprint may be orders of magnitude larger (e.g., hundreds of terabytes through hundreds of petabytes) than a conventional application data footprint comprising less than a terabyte, computing system 1800 advantageously implements data protection for the application data. Data protection in such a setting may be extremely helpful because the physical memory soft error rate for hundreds of terabytes of data in prevailing solid-state memory technology could yield many errors during the execution time of target applications. Certain memory device technologies may even cause multiple, concurrent errors at a relatively frequent rate, leading to a need for two or more layers of data protection. In certain settings, entire blocks of data may be corrupted or "erased," requiring the implementation of an erasure code or technical equivalent to provide data protection and recovery. For example, if a solid-state flash memory device comprising memory subsystem 1854 fails or if a block of data therein is corrupted, a block of data is lost (e.g., erased). An erasure code may be implemented to recover blocks of data, such as the block of data lost in the above example. Failure events leading to significant loss of data are sufficiently rare that conventional systems designers are not motivated to develop features to address such failure events. However, with active, solid-state memory hosting application data sized in the hundreds of terabytes to many petabytes, data protections becomes highly advantageous if not essential for the proper operation of computing system 1800.

In certain embodiments, computing system 1800 may implement scalable paging operations to accommodate very high throughput, low-latency memory operations associated with processors 1832 accessing memory complex 1850. Specifically, computing system 1800 may implement a mechanism for providing compact virtual page tables implemented to perform different address space mappings (e.g., the DAS to FVA, to FVPN to FPAS mapping discussed above). Because the target block range within memory complex 1850 is so large, conventional virtual page mapping techniques would result in large, inefficient mapping tables. A virtual page mapping technique is disclosed herein that reduces overall table size for greater memory access and execution efficiency. This technique is described in FIGS. 21A-21D.

Furthermore, computing system 1800 may implement lockless queues for transmitting commands and command completion acknowledgments between two processors without either processor needing to block execution progress provided there is space in the queue. In one embodiment, a lockless queue is implemented as a circular buffer, as described in conjunction with FIG. 22. Additional techniques for lockless buffer operation are described in conjunction with FIGS. 24 and 25.

In certain embodiments, computing system 1800 may implement scalable allocation and utilization of memory capacity to accommodate an extremely large application data footprint. Specifically, computing system 1800 may implement a mechanism for moving live (allocated to active application processing) blocks within the memory complex 1850 without processor intervention. Such a move operation, referred to herein as a migration pivot, is described in conjunction with FIGS. 26 and 28. In one embodiment, the migration pivot is implemented to accommodate data protection. Furthermore, computing system 1800 may implement distributed read copy operations in preparation for an erase operation to enable high-performance read operations. This technique is discussed in conjunction with FIGS. 29 and 30. This operation may allow a memory complex 1850 comprising flash memory devices to efficiently service read/write requests from the processor complex 1830, while also reclaiming and preparing pages to be newly written. Computing system 1800 may also implement a trim range function to operate in conjunction with one or more file systems residing within memory complex 1850.

Figure 31:
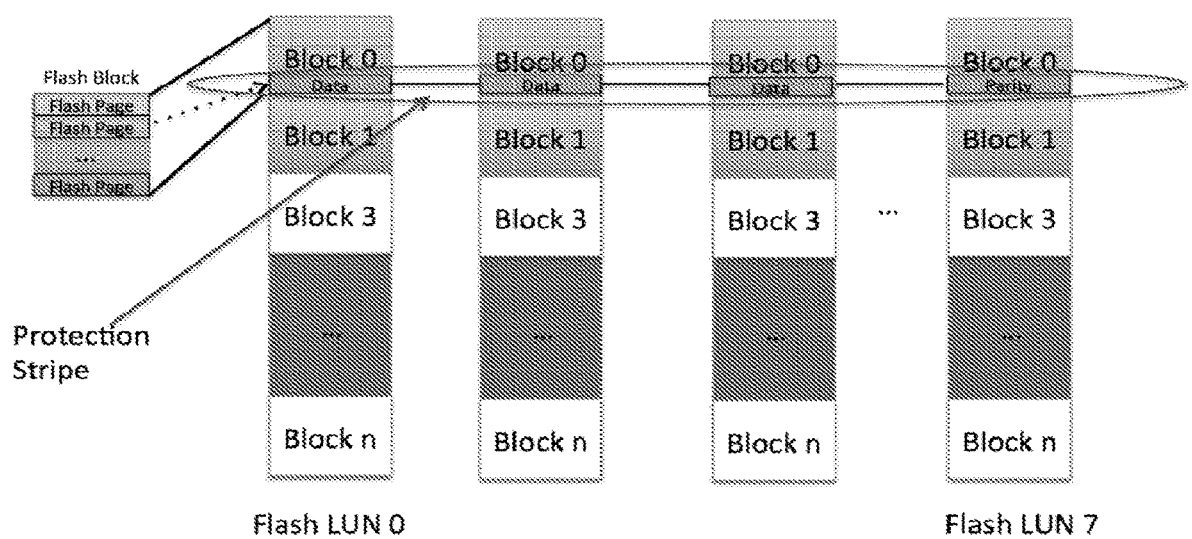
FIG. 31 illustrates a protection stripe implemented across a set of LUNs in accordance with an embodiment of the invention.
Figure 32:
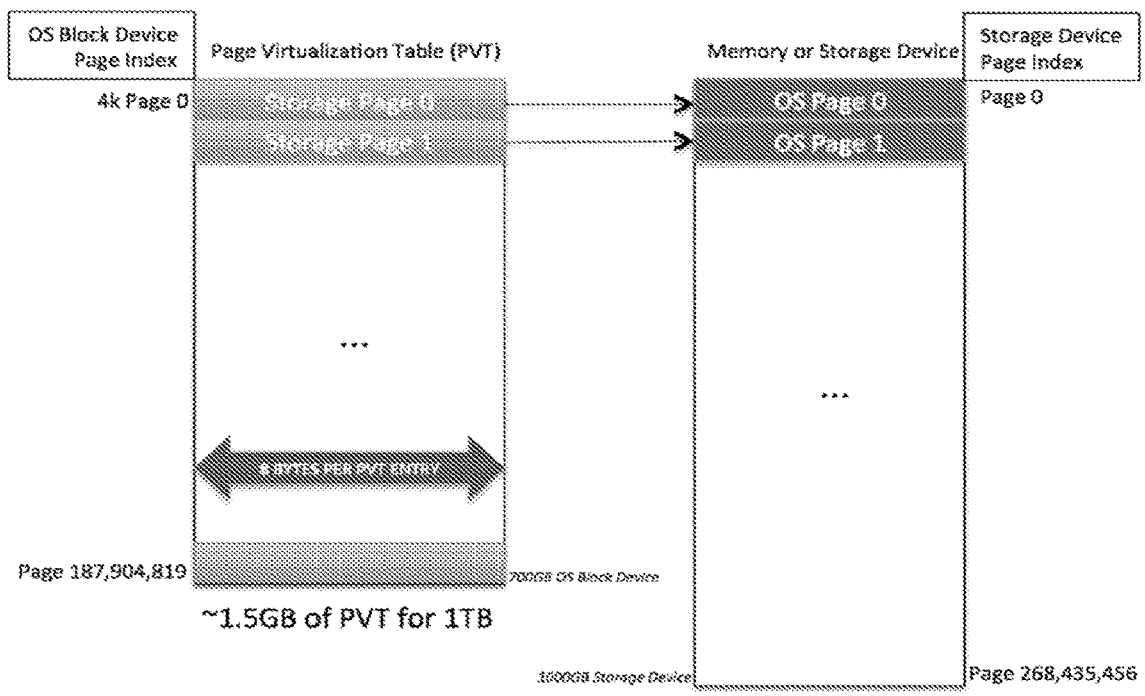
FIG. 32 illustrates initial page virtualization table and memory relationships utilized in accordance with an embodiment of the invention.
Figure 33:
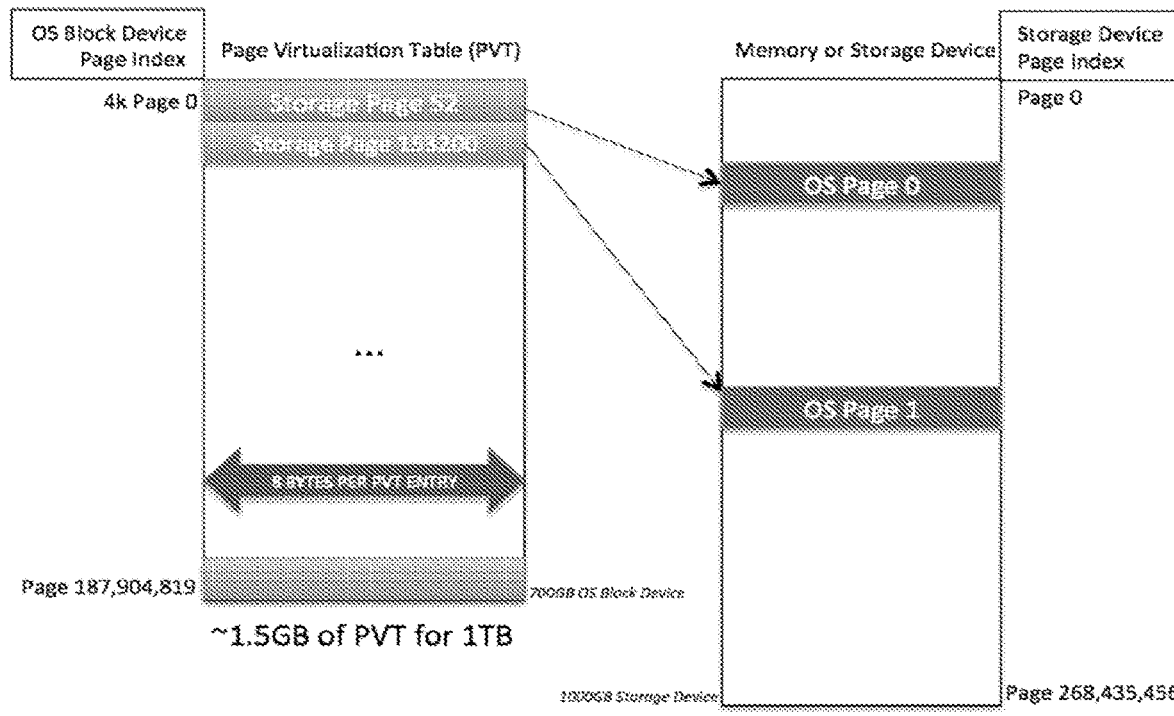
FIG. 33 illustrates subsequent page virtualization table and memory relationships in accordance with an embodiment of the invention.
Figure 34:
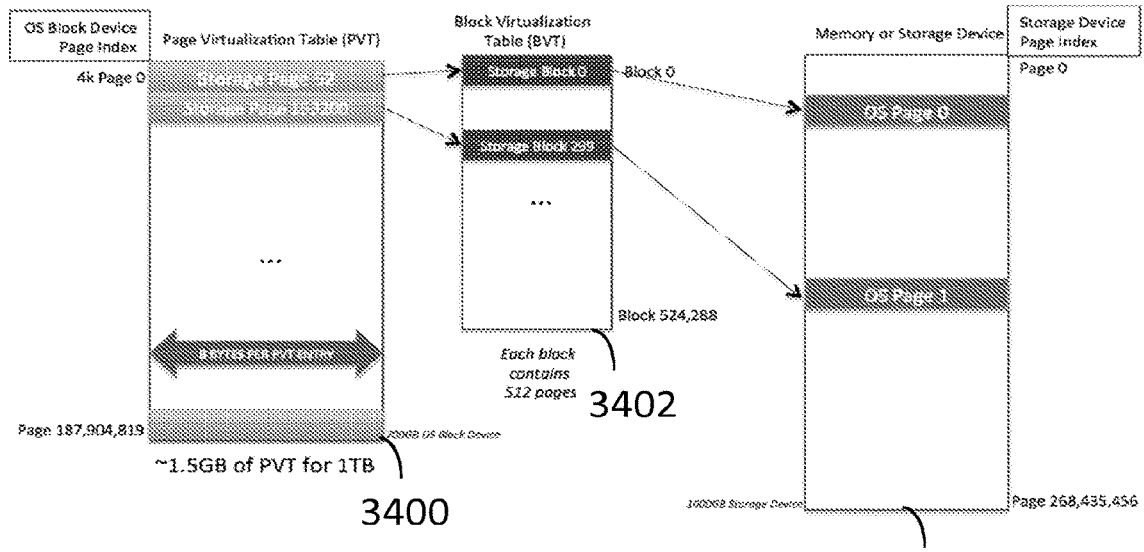
FIG. 34 illustrates page virtualization, block virtualization and memory relationships in accordance with an embodiment of the invention.
Figure 35:
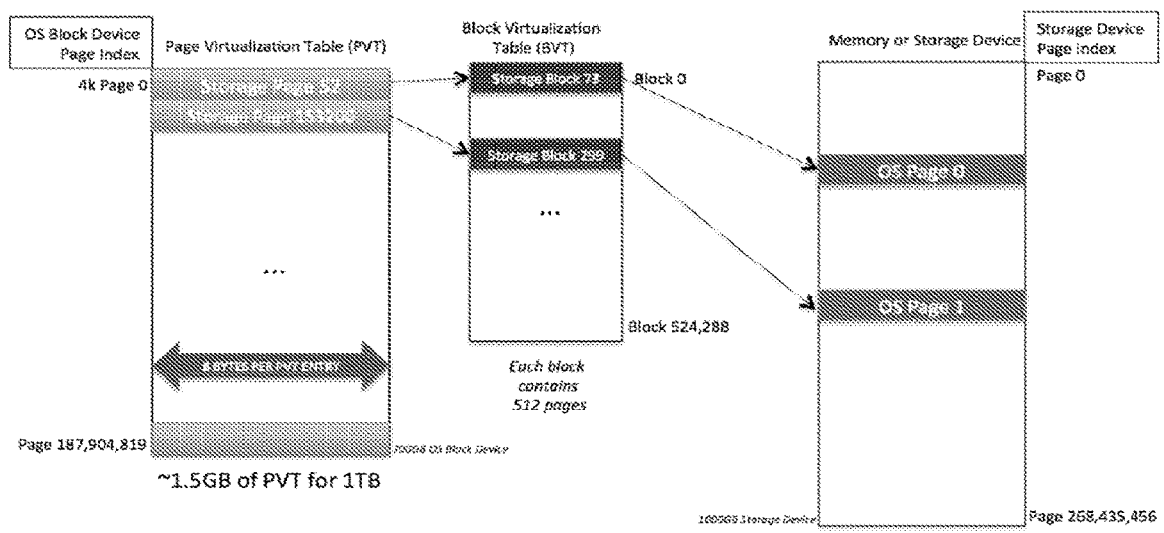
FIG. 35 illustrates page virtualization, block virtualization and memory relationships in accordance with an embodiment of the invention.

In one embodiment, memory complex 1850 is configured to store data blocks associated with application data, as well as associated virtual mapping tables/virtualization tables, bad block information, trim information, and other data technically relevant to operation and reconstruction of data within memory complex 1850. By storing virtualization maps, bad block maps, and the like, within the same protected data set as target data, a full recovery of data and virtual mappings associated with memory complex 1850 may be advantageously performed using only data available on memory complex 1850. As one example of this technique, FIG. 31 illustrates disposing metadata within a protection stripe. By contrast, many conventional memory systems store virtualization tables independently of target data, creating inefficiencies during recovery. FIGS. 32-34 illustrate specific examples of storing virtualization information within blocks residing within memory complex 1850. FIG. 35 illustrates storing bad block information within blocks residing within memory complex 1850. In each case, erasure code protection should be implemented across the blocks.

In certain embodiments, computing system 1800 may implement scalable memory page and block operations to accommodate large, low latency read and write access to memory complex 1850. These operations are implemented to achieve high utilization of total cross-sectional bandwidth over every available memory subsystem 1854 within memory complex 1850, thereby providing extremely high memory bandwidth to processor complex 1830. In one embodiment, a massively parallel memory architecture enables scalable memory page and block operations. One embodiment of the massively parallel memory architecture is illustrated in FIG. 18, with conceptual details further illustrated in FIGS. 36-38. In certain embodiments, a DRAM cache provides read-ahead caching and reconstruction-related computation resources, which may, for example, be implemented within each of the memory controllers 1836. DRAM caching for read-ahead is further illustrated in FIG. 39. One embodiment provides for fast acknowledgment of write operations through write buffering in a DRAM buffer followed by an acknowledgement prior to write data being written to a designated target. The DRAM buffer may be implemented within the memory controllers 1836. This technique is illustrated in FIG. 40. Alternatively, the DRAM buffer may be implemented within system memory (not shown) associated with, or coupled directly to, processors 1832.

Figure 41:
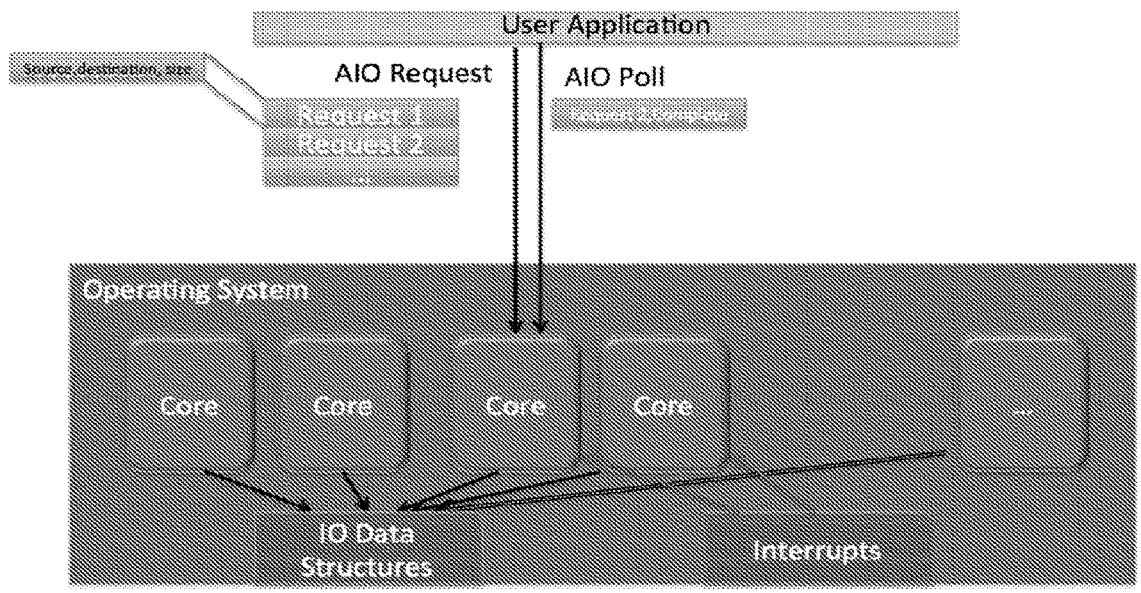
FIG. 41 illustrates asynchronous I/O processing in accordance with an embodiment of the invention.
Figure 42:
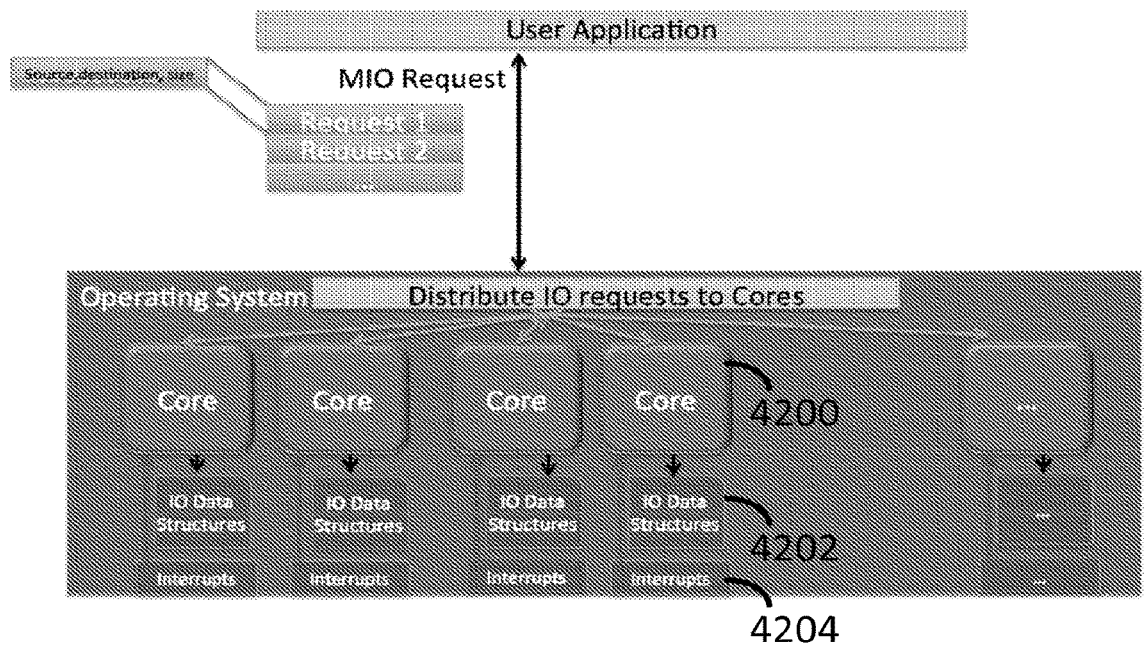
FIG. 42 illustrates synchronous I/O processing in accordance with an embodiment of the invention.

In conventional systems, memory access performance is typically constrained by system efficiencies when handling larger (e.g., 8 MB) block access requests. Operating systems may provide for asynchronous operations, but overhead associated with managing large block access requests may eliminate any efficiencies gained by performing asynchronous input/output operations. In one embodiment, a technique for multiple, concurrent input/output operations improves performance associated with performing large input/output operations, such as large block reads/write operations by distributing associated workload over multiple cores comprising one or more processors 1832. FIGS. 41 and 42 illustrate this technique in greater detail.

Read performance may be improved by a technique referred to herein as "read-around," whereby a block of data associated with a busy memory resource comprising a memory subsystem 1854 is reconstructed rather than read. A memory resource may be busy because a block comprising the memory resource is being written. The memory resource may comprise a sub-circuit referred to herein as a LUN. In certain scenarios, writing a block of data takes considerably longer (e.g., 20× longer) than reconstructing the block of data. Therefore, the read-around technique may provide a performance advantage compared to waiting and performing a direct read of the target data. This read-around technique is further illustrated in FIG. 43. In certain embodiments, write operations are scheduled to advantageously facilitate read-around opportunities to improve average read performance. In one embodiment, memory bandwidth is offered to different memory controllers 1836 according to available bandwidth for each. Available bandwidth may represent a fixed system characteristic or a prevailing workload. FIG. 44 illustrates this concept in further detail.

Figure 49:
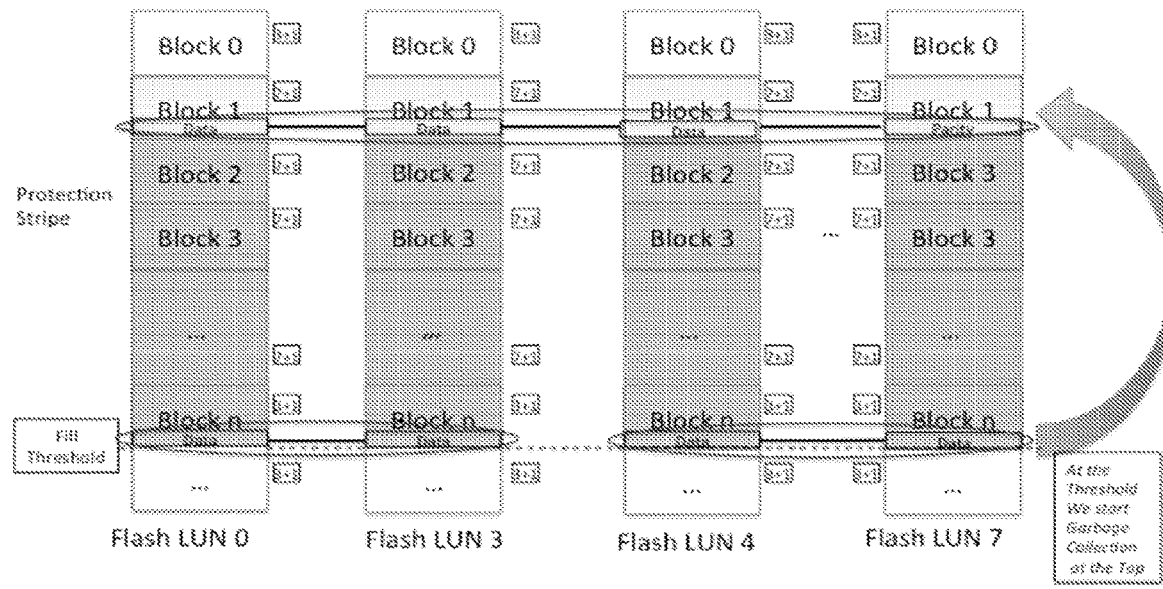
FIG. 49 illustrates adaptive data protection utilized in accordance with an embodiment of the invention.
Figure 50:
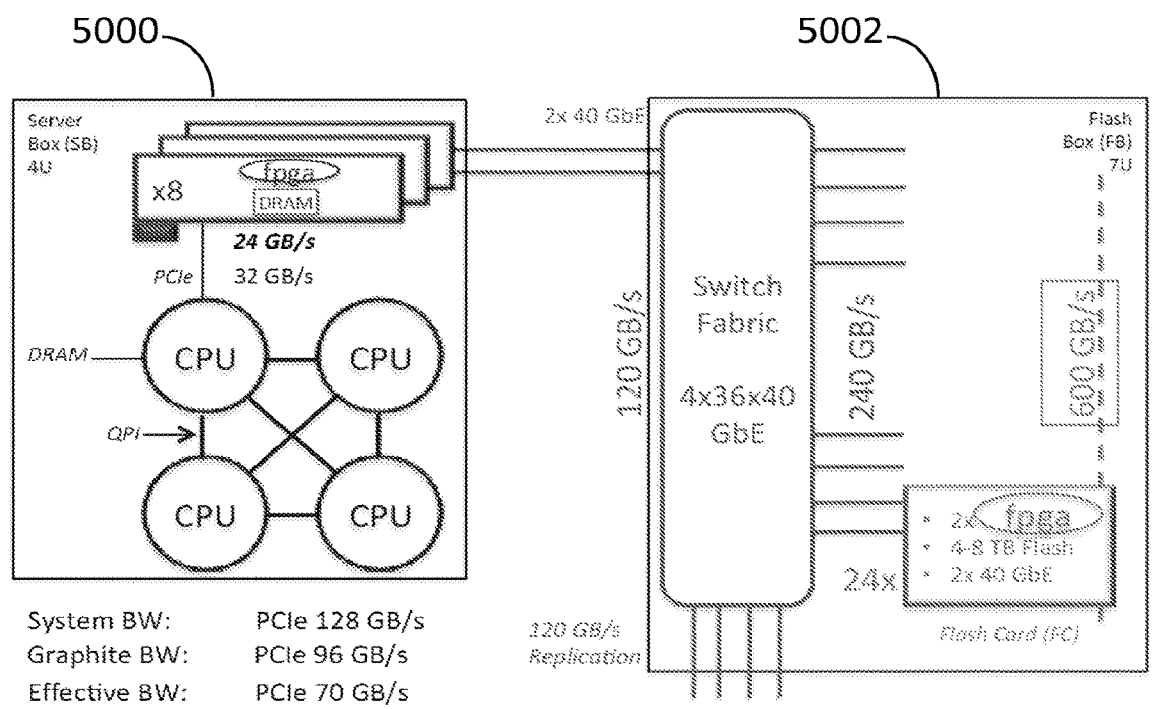
FIG. 50 illustrates a garbage collection architecture utilized in accordance with an embodiment of the invention.
Figure 51:
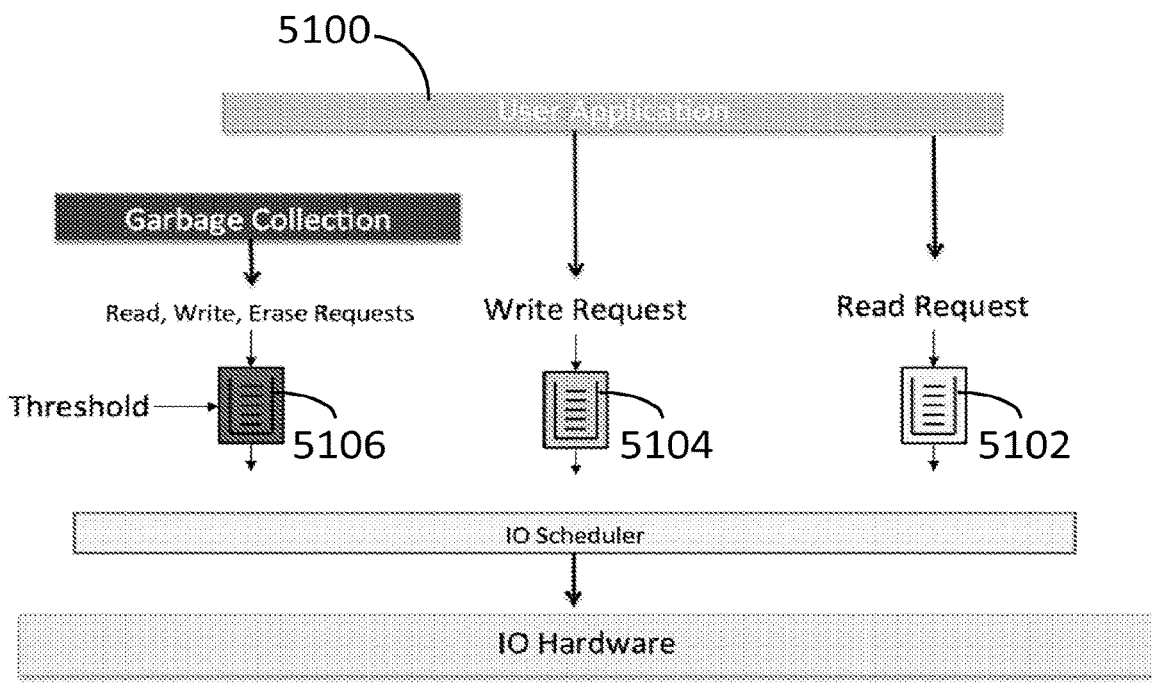
FIG. 51 illustrates a queue based garbage collection technique utilized in accordance with an embodiment of the invention.

In certain embodiments, computing system 1800 may implement data protection for large data sets. In one such embodiment, illustrated in FIGS. 45 and 46, computing system 1800 may implement data protection in conjunction with sequence numbers to enable re-creation of a page virtualization table (PVT) in the event of a system crash. In one embodiment, illustrated in FIGS. 47-49, computing system 1800 may implement adaptive data protection for different failure characteristics according to a system lifetime. For example, a system may initially operate with a less conservative protection scheme and transition to a more conservative protection scheme at some point in operational time. In certain settings, garbage collection interacts with a data protection scheme. This interaction is further complicated by practical requirements associated with needing to erase flash memory prior to writing the flash memory. In one embodiment, computing system 1800 implements a round-robin allocation system for writing blocks during garbage collection, and a reclamation mechanism that may be triggered according to a free-space threshold. In one embodiment, continuous data protection and continuous garbage collection are provided by adaptively balancing application access requests and garbage collection activities. This embodiment is illustrated in FIGS. 50-51. The above techniques advantageously enable computing system 1800 to efficiently operate at high performance levels while providing a high degree of data protection. As discussed previously, data protection becomes highly advantageous given the scale of application memory footprints supported by the computing system 1800.

Figure 57:
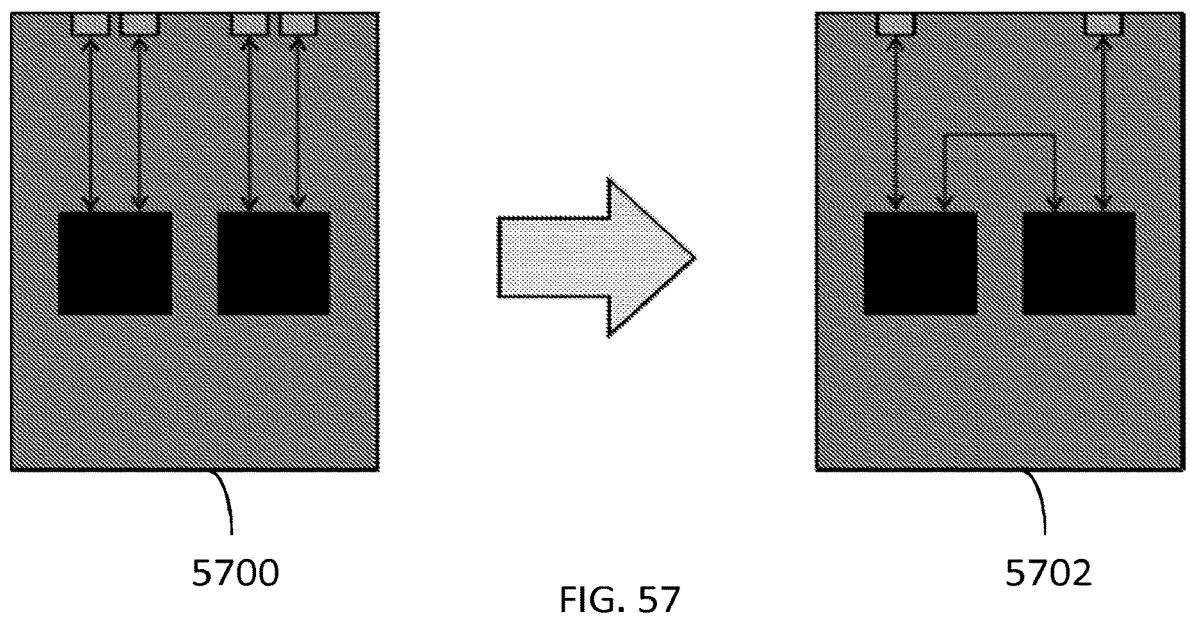
FIG. 57 illustrates a redundant path architecture utilized in accordance with an embodiment of the invention.

In certain embodiments, computing system 1800 may implement performance optimizations for solid-state memory related to operational constraints associated with conventional solid-state memory devices (e.g., flash memory). One constraint relates to read and/or write "disturbance" associated with accessing adjacent blocks of data within a flash device. A randomization technique, described in FIG. 52 serves to reduce the impact of such disturbance effects; this technique therefore reduces net error rates and associated performance reduction mechanisms. In one embodiment, an efficient command processing circuit module implements an access abstraction that includes a set of state machines for implementing detailed access control signaling to flash devices comprising memory subsystems 1854. The command processing circuit module is conceptually illustrated in FIGS. 53-56. Certain embodiments of computing system 1800 require a high degree of fault tolerance for highly-available computing and therefore implement component-level redundancy. One example of such redundancy is illustrated in FIG. 57.

The above techniques and embodiments may be implemented independently in various systems architectures, however they may be advantageously implemented together within computing system 1800 to provide a high-performance, high availability computation platform for executing applications requiring unconventionally large application memory footprints.

Figure 19:
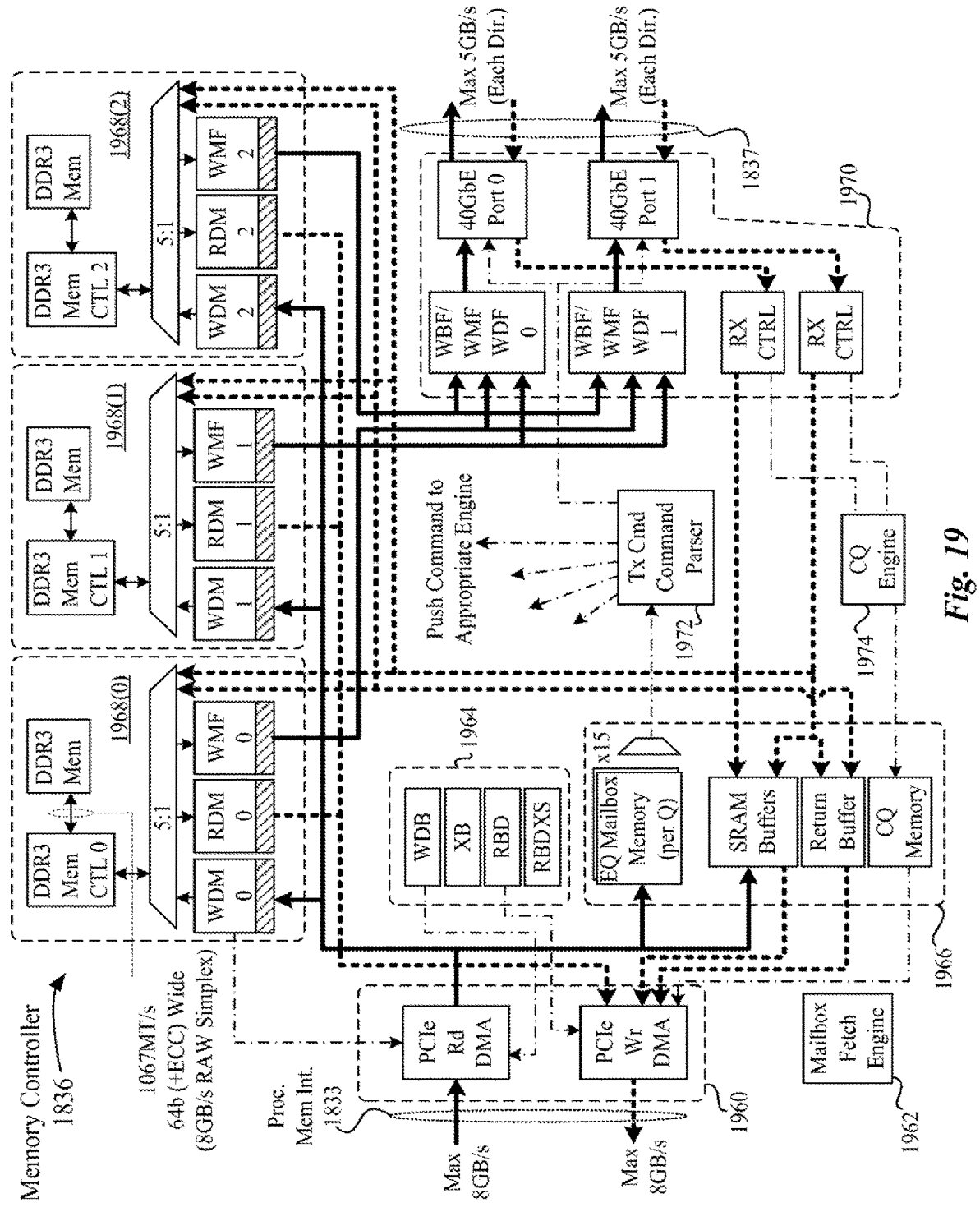
FIG. 19 illustrates a memory controller configured in accordance with an embodiment of the invention.

FIG. 19 illustrates a memory controller 1836, according to one or more embodiments of the present invention. As shown, the memory controller 1836 comprises a processor interface module 1960, a mailbox fetch engine 1962, a set of command engines 1964, a set of interface buffers 1966, a plurality of DRAM engines 1968, a switch interface module 1970, a command parser 1972, and a command queue (CQ) engine 1974.

In one embodiment, processor interface module 1960 is coupled to a processor 1832 through processor memory interface 1833. In one embodiment, processor memory interface 1833 implements a PCI Express (TM) interface. The processor memory interface 1833 may be configured to receive commands related to memory access requests, including read requests and write requests. Each memory access request may comprise a request for an arbitrary size of data to be read from memory complex 1850 or written to memory complex 1850. In certain embodiments, processor interface module 1960 is configured to implement the lockless communication and command queue techniques discussed in connection with FIG. 22.

A mailbox fetch engine 1962 retrieves commands (e.g., access requests) through processor interface module 1960 and posts the requests to an appropriate execution queue mailbox memory within the interface buffers 1966. A command parser 1972 decodes the commands and directs an appropriate execution engine, such as a command engine within the set of command engines 1964. For example, a command to read a block of data may be fetched by mailbox fetch engine 1962, posted for execution to the execution queue mailbox memory within interface buffers 1966, parsed by command parser 1972, and transmitted for execution to an RBD command engine residing within the set of command engines 1964.

In one embodiment, DRAM engines 1968 include at least a read memory data buffer (RMD), a write data memory buffer (WDM), and a write memory flash buffer (WMF), a multiplexer, and a DRAM-specific interface, such as a DDR3 memory controller. Furthermore, each DRAM engine 1968 should include at least one DRAM memory device.

A command comprising a write memory access request should include at least a target address, a request range (e.g., size), and a block of write data to be written into the target address according to the request range. In certain embodiments, the block of write data is received by the processor interface module 1960 and written directly to one or more DRAM engines 1968. Alternatively, write data may be first written to an SRAM buffer comprising interface buffers 1966. Once the block of write data is written within either an SRAM buffer or one at least one DRAM engine 1968, an acknowledgement may be transmitted back to a corresponding requestor (e.g., a processor 1932). The block of write data is written through a WDM buffer to one or more DRAM memory devices, and subsequently retrieved from the same DRAM memory devices through a WMF buffer to be transmitted through the switch interface module 1970 to the memory complex 1850. In memory complex 1850, the block of write data is written to memory devices comprising memory subsystems 1854.

A command comprising a read memory access request should include at least a target address and a request size. In certain embodiments, a requested block of data is received from memory complex 1850 through switch interface module 1970 and is written to SRAM buffers comprising the interface buffers 1966. Alternatively, the requested block of data may be written to one or more DRAM engines 1968. Command queue engine 1974 completes each command and causes an acknowledgement to be transmitted back to a command originator (e.g., a processor 1832) through the processor interface module 1960.

As shown, memory controller 1836 includes three DRAM engines 1968 implemented using DDR3 DRAM devices, and two links comprising switch interface 1837 implemented using bidirectional 40GE links each. In other embodiments, a different number of DRAM engines 1968 may be implemented, a different type of memory device may be used other than a DDR3 DRAM device, or any combination thereof may be implemented. Furthermore, a different number of links may be implemented for switch interface 1837, a different physical interface technology other than 40GE may be used, or any combination thereof may be implemented.

Figure 20:
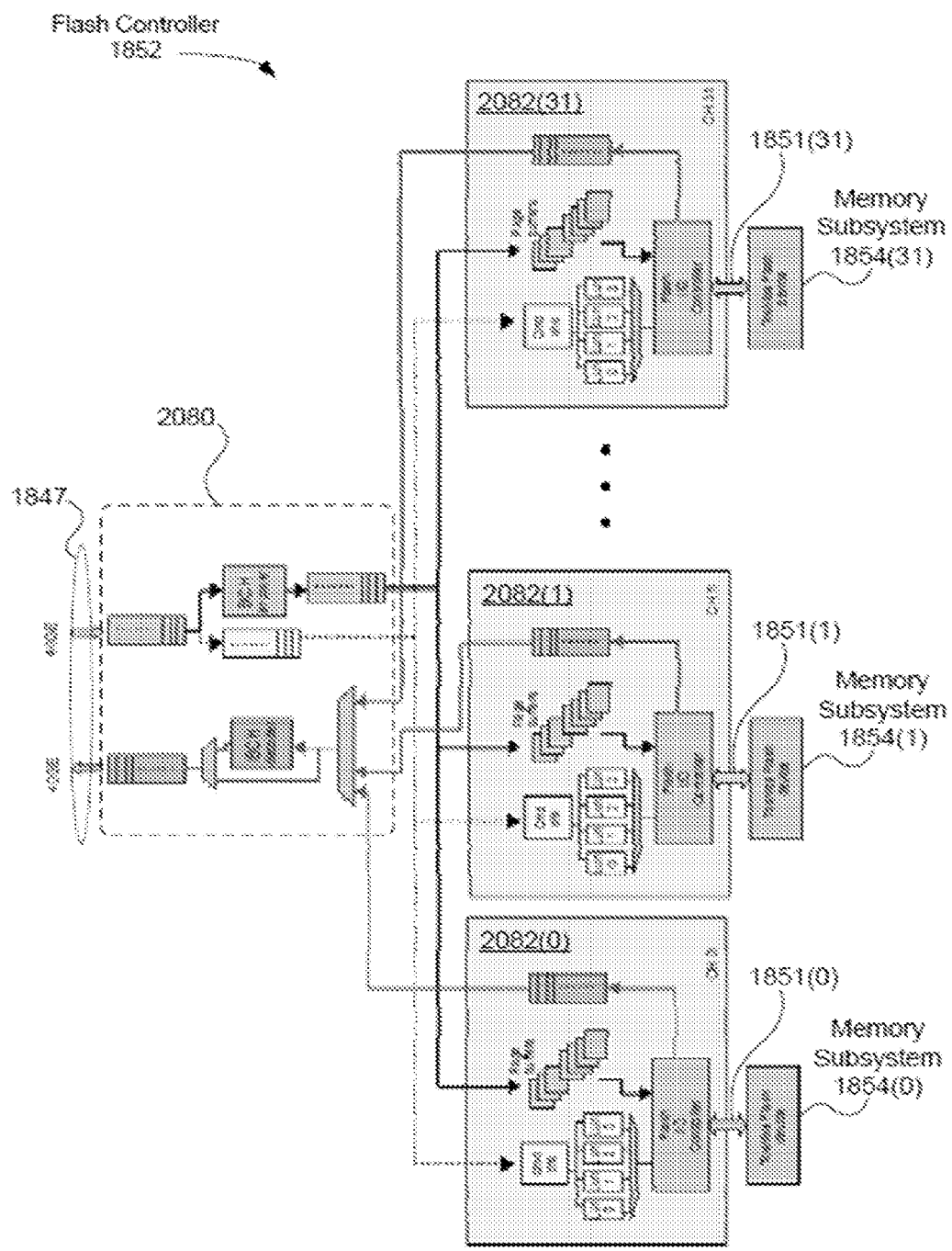
FIG. 20 illustrates a flash controller configured in accordance with an embodiment of the invention.

FIG. 20 illustrates a flash controller 1852, according to one or more embodiments of the present invention. As shown, flash controller 1852 comprises an interface module 2080 coupled to a flash controller interface link 1847. In one embodiment, flash controller interface link 1847 comprises one bidirectional 40GE link coupled to a corresponding port associated with a switch 1842. In other embodiments, flash controller 1852 comprises two or more flash controller interface links 1847. Flash controller 1852 further comprises a plurality of flash channel subsystems 2082, each coupled to a memory subsystem, such as memory subsystem 1854. A flash I/O controller comprising each flash channel subsystem 2082 is coupled to a corresponding memory subsystem 1854 through a memory interface 1851. In one embodiment, each flash channel subsystems 2082 is configured to independently perform read, write, and clear operations on associated memory subsystems 1854. Exemplary embodiments are discussed herein with reference to flash memory devices; however, any technically feasible type of memory device may implement one or more memory subsystems 1854. While flash memory is characterized as being non-volatile, volatile memory may be used to implement memory subsystems 1854 in certain embodiments.

Embodiments of the present invention implement multiple tiers of independently operating elements in a memory hierarchy configured to provide extremely large yet reliable and resilient memory that may be shared over many processors, each executing many threads. Each tier may schedule, queue, forward, complete, and cache commands and associated data so to that a large number of pending requests may coexist and progress concurrently within the overall system, thereby enabling a high utilization of total cross-sectional bandwidth over every available memory subsystem 1854 within memory complex 1850.

In the disclosed system, data moves independent of file systems. An embodiment of the invention uses a Page Virtualization Table (PVT) to allow the movement of pages without file system meta-data changing. In a large-media system, this table is often huge (e.g., 6 TB for a 64-bit page virtualization table for 3PB of media).

In order to reduce the table size, table entries are shared. In one embodiment, a base quantity (e.g., 64-bits) is stored for the first entry and offset quantities (e.g., 16 bit offsets) are stored for shared entries. In this example, if one shares entries for 16 pages, the table can be a third of the size. It is desirable to insure that the pages are close enough to use offsets. Contention for the data structures should be avoided. Finally, the data should be temporally distributed so that it can be read in parallel.

The foregoing can be achieved by having one core of a central processing unit have exclusive access to a set of page table entries. The set of page table entries is non-contiguous so that subsequent reads will still be distributed across cores.

Figure 21A:
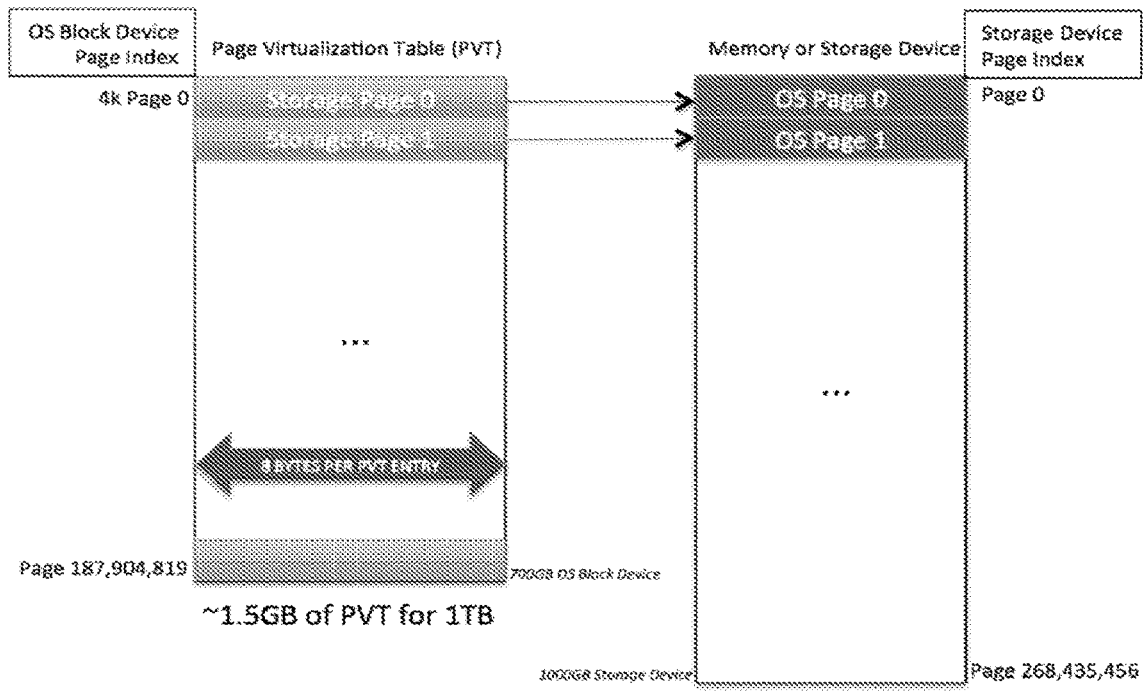
FIG. 21A illustrates a page virtualization table after a first write.

FIG. 21A illustrates a PVT for a device with 1 Terabyte of physical storage or memory where at any one time 70% of the device (or 700 GB of data) is mapped. The remaining 30% may be used for reliability and/or performance purposes. The software utilizing this device understands that it has 700 GB of data.

Figure 21B:
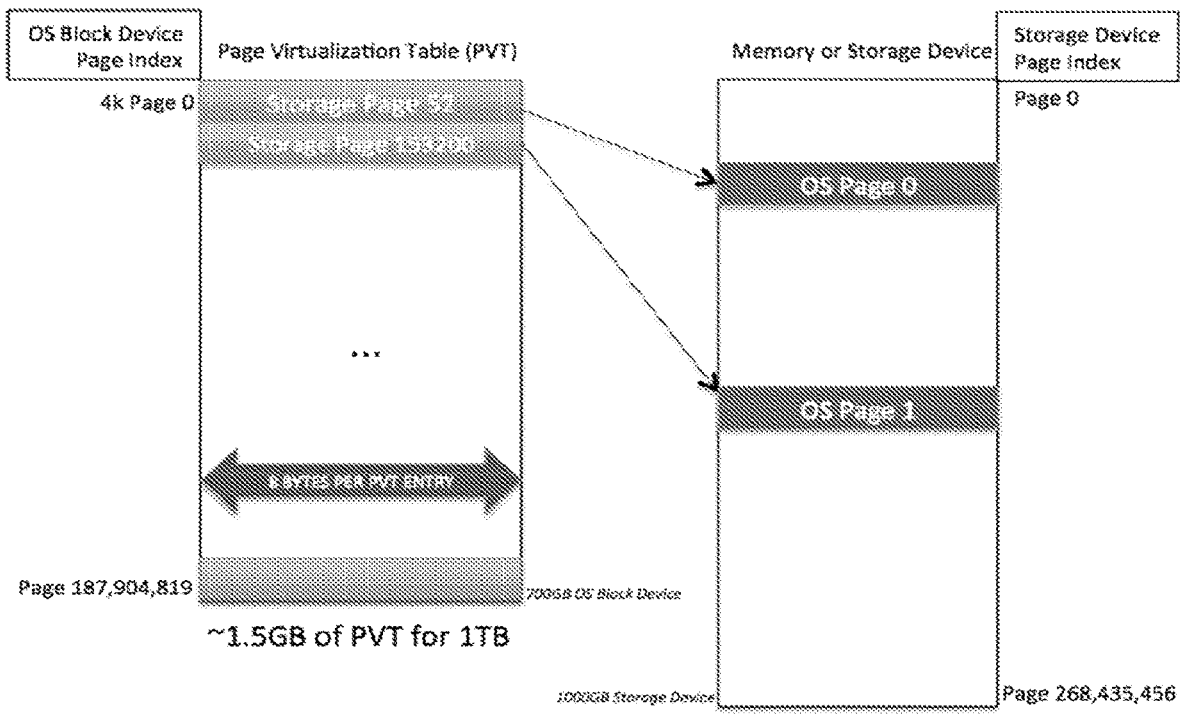
FIG. 21B illustrates a page virtualization table after a second write.

For the first write, data pages end up on pages with the same or similar indices. But as time goes on, the page on the device may move to a different location on that device due to rewriting the data or device management considerations (e.g., garbage collection and erasures on flash). FIG. 21B illustrates what the PVT looks like after subsequent writes.

In this embodiment the PVT is rather large. In particular, it is 0.15% of the size of the device and it is stored in a more costly memory like DRAM. For 100 TB this size is ~150 GB and for 1PB the PVT size is 1.5 TB. This is a costly burden for the system. Thus, multiple entries are compressed together to share PVT entries. In one embodiment, a base quantity (e.g., a full device index) is stored for the first page and then offset quantities are stored for the pages in the shared PVT entry. This compresses addresses from 8 bytes to 2 bytes each. This example shares an entry between 16 pages but can be extended to do more.

Figure 21C:
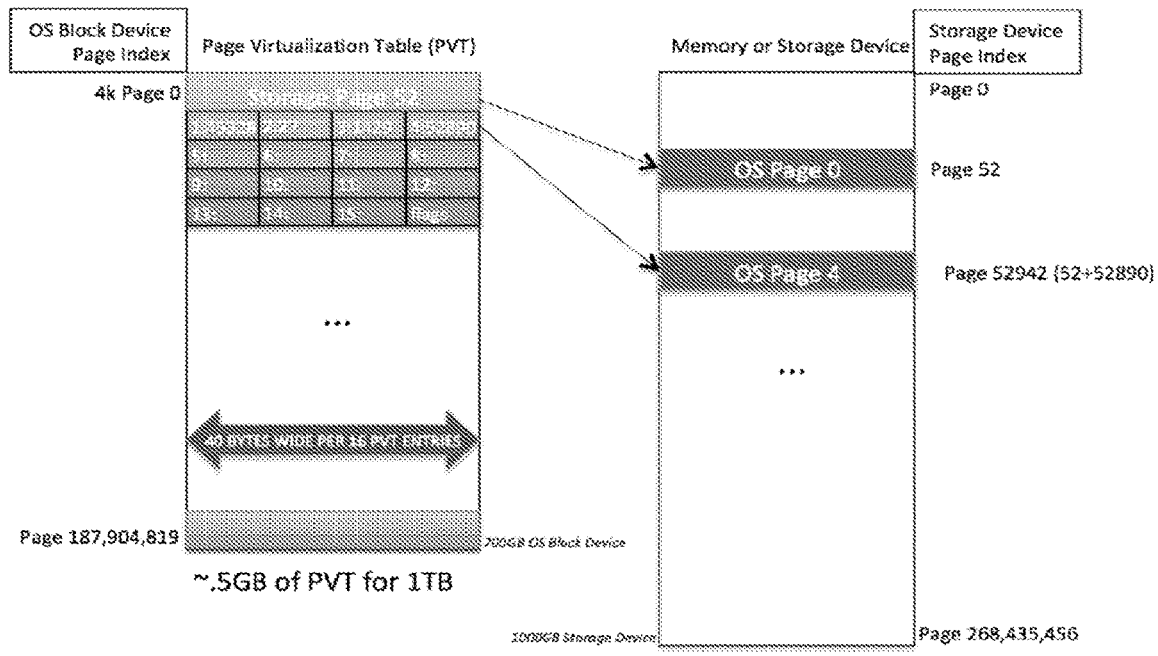
FIG. 21C illustrates a page virtualization table with compressed and shared entries.

FIG. 21C depicts shared entries. The PVT table has a base quantity (4K page 0 specifying page 52) and offset quantities (1:34328, 2:27, 3:1429, 4:52890, etc.). The picture illustrates the base quantity pointing to page 52 in memory and page 4 at position 52942, which is the page 52 offset, plus the offset of 52890 for page 4.

This mechanism restricts the location of pages in the shared PVT entries to being at most 64K away from the base index so that the offset is 16 Bits. This restriction, in turn, puts restrictions on the ability to distribute pages that the OS sees as contiguous. That distribution of pages facilitates optimizations associated with other disclosed techniques.

Figure 21D:
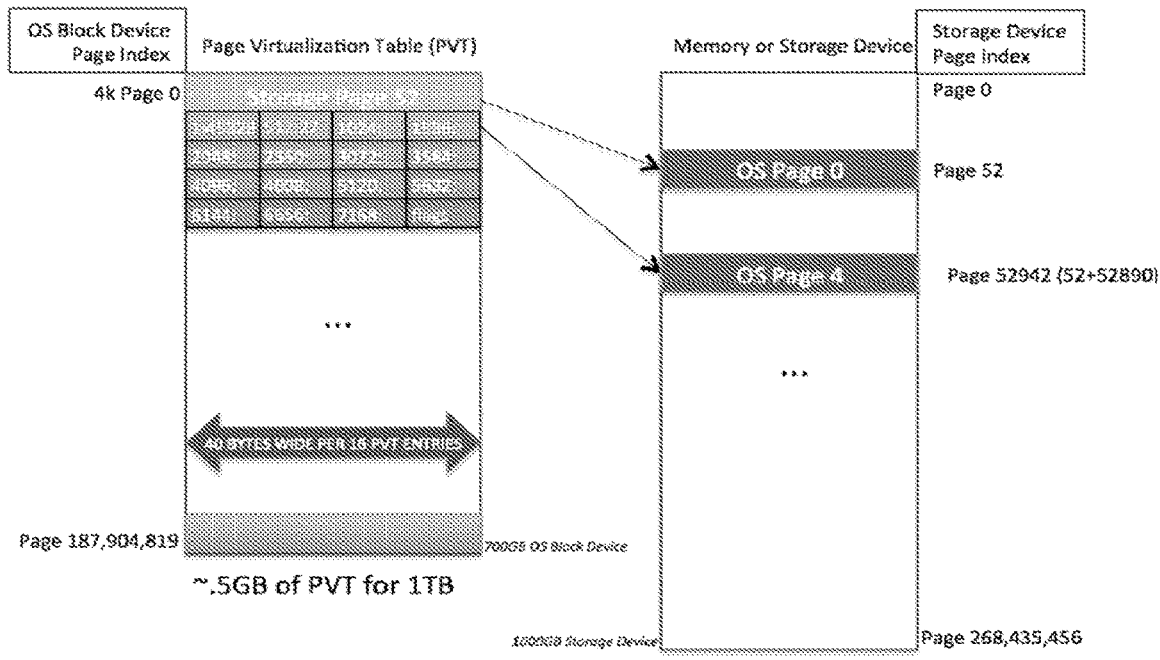
FIG. 21D illustrates a page virtualization table with compressed and shared entries with stride values.

One can store pages that are a fixed offset away from each other in each PVT entry. Consequently, the OS can compute which entry represents a particular page in the OS' indexing scheme using a simple, fixed algorithm. The modified table is shown in FIG. 21D. In particular, FIG. 21D substitutes the page references in the PVT shown in FIG. 21C for offset values.

Figure 22:
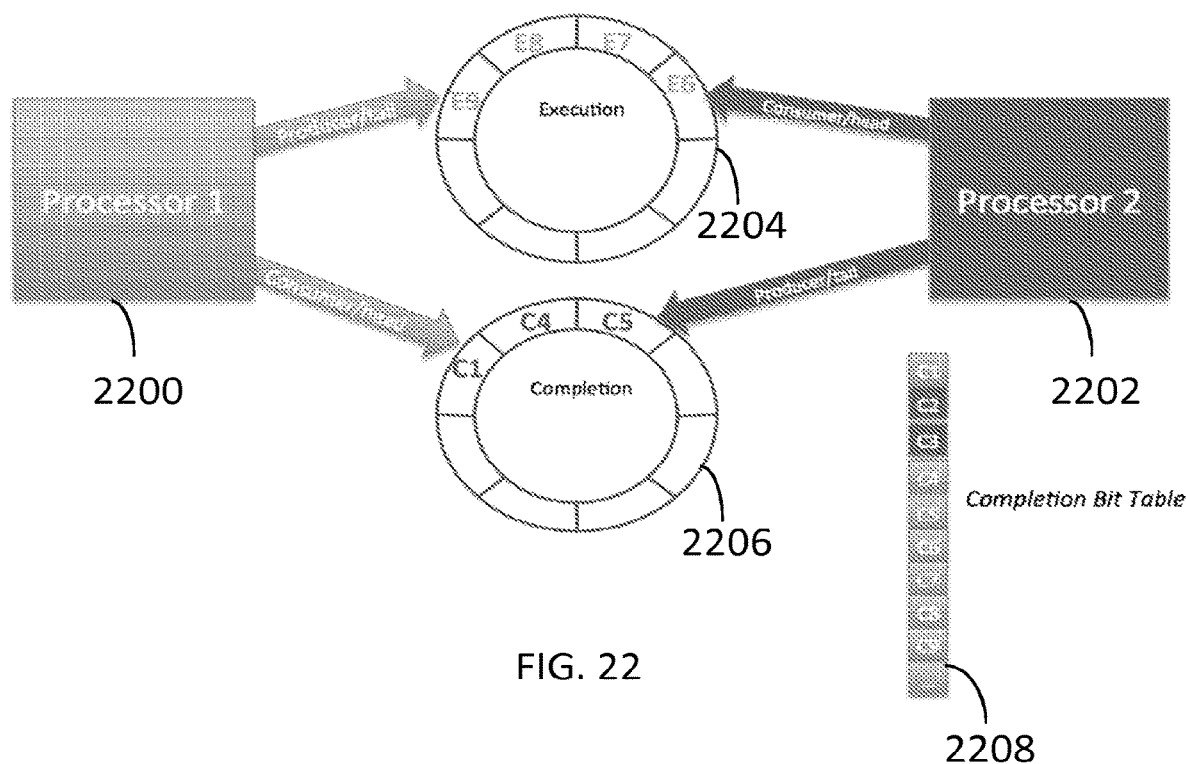
FIG. 22 illustrates a lockless queue system utilized in accordance with an embodiment of the invention.

An embodiment of the invention provides a lockless mechanism for communicating between processors. FIG. 22 illustrates a system with two processors 2200 and 2202 programmed so that one is transmitting commands and the other is receiving and completing them. The system also has an execution queue 2204, a completion queue 2206 and memory buffer completion bits 2208. Both the execution queue 2204 and completion queue 2206 are circular. The processor sending commands owns the tail of the execution queue 2204 and the processor receiving the commands owns the head. In the case of the completion queue 2206 the ownership is reversed. The memory bits are used for completions that do not require state.

Processor 1 2200 puts new commands on the execution queue 2204 and Processor 2 2204 removes and executes the commands. Since there is only one producer and one consumer, locks are unnecessary. Conversely, in a multi-core system locks can be avoided if each pair of processors allocates dedicated queues with single producers and single consumers. Note that the processors still need to read the tail or head from the other processor.

There are two cases that involve one processor waiting for the other: (1) Processor 1 will wait until there is room on the queue or (2) Processor 2 will find no entries and have to try gain in the future. A processor can be signaled to continue by utilizing a polling system or an interrupt system. In either case, on completion, Processor 2 either puts an entry on the queue or sets a bit in a bitmask 2208 to note that something is done. Processor1 1 will both check the queue and the bitmask. The bitmask is an optimization that potentially requires less state than an entry on the queue and allows Processor 1 to check multiple completion bits simultaneously by testing a whole word of completion bits at the same time.

Figure 23:
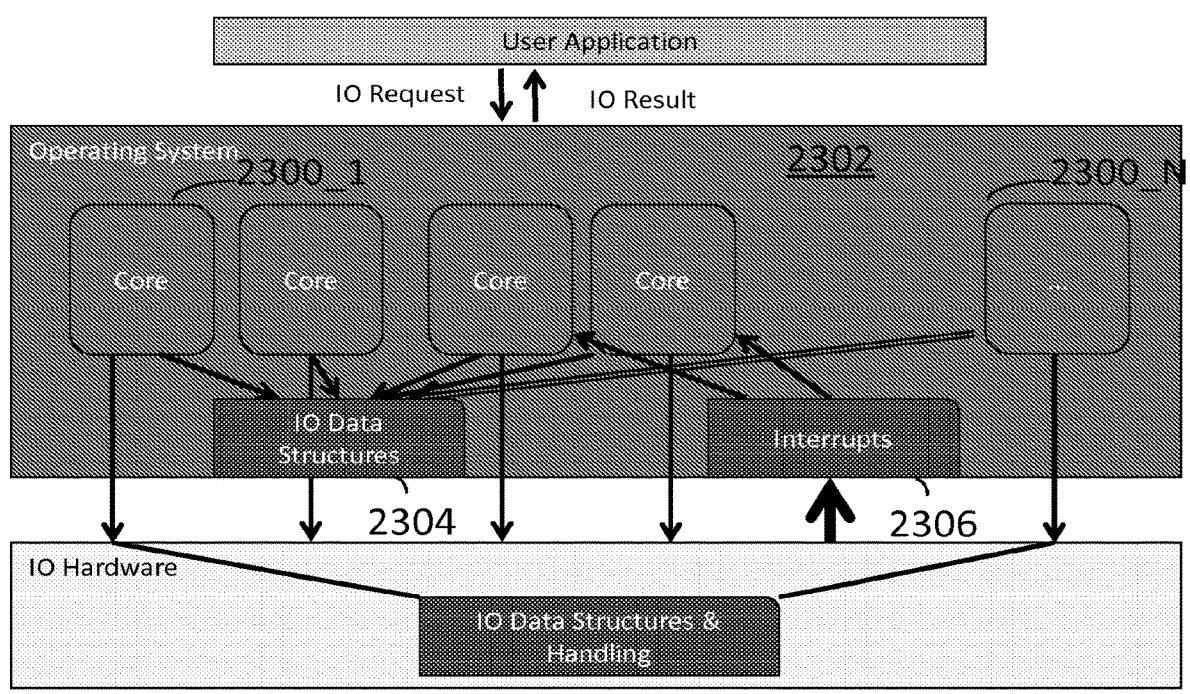
FIG. 23 illustrates a prior art approach for interactions between an operating system and supporting hardware.

FIG. 23 illustrates a prior art system with multiple processor cores 2300_1 through 2300_N supporting an operating system 2302. Each core 2300 has to access the IO Data Structure 2304, which resides within the operating system (OS) 2302. This single IO data structure 2304 can slow down the system. The synchronization mechanism results in a serialization of operations that extends into the hardware. The hardware often has a single pipe into it, which can also slow down operations.

Finally, when a result is returned, it is often done by the hardware interrupting the OS, as shown with block 2306. The software can choose to have the interrupt go to one or more cores 2300. Often a subset of cores is selected to minimize the broad impact of IO operations on the system.

This may cause a core to access data structures required for synchronization, eventually returning to the core that the original request came in on to return a result to the application.

Figure 24:
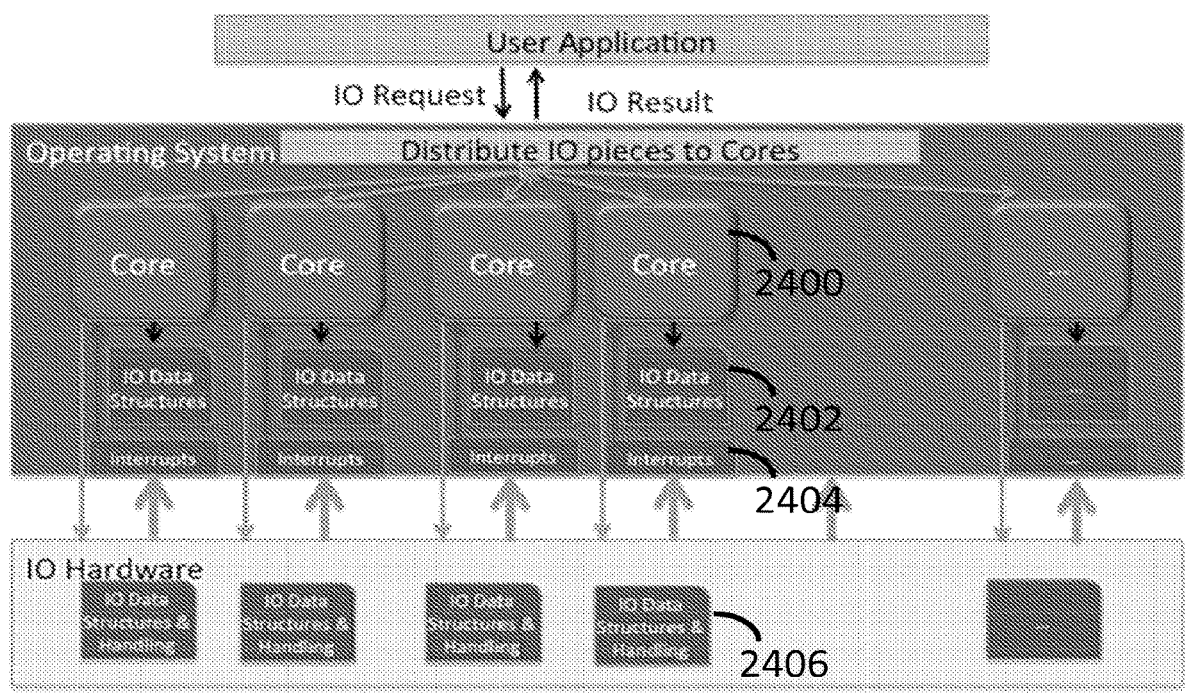
FIG. 24 illustrates a parallel processing configuration between operating system core components, dedicated input/output data structures and dedicated hardware resources in accordance with an embodiment of the invention.

An embodiment of the invention utilizes an IO subsystem capable of being programmed and partitioned in pieces. The only place where synchronization occurs is coming from/to the user application, as shown in FIG. 24. As shown in the figure, individual processor cores 2400 have individual I/O data structures 2402, individual interrupt paths 2404 and dedicated hardware resources 2406. Thus, each core has dedicated data structures both in the operating system and in the hardware. In addition, the activity that distributes IO pieces to each core has a multi-producer single-producer data structure (i.e., multiple IOs can occur at the same time, thus the multi-producer, but only the core consumes IOs). This structure reduces synchronization impact.

This invention includes variations that may share some data structures at various points in the stack, but maintains unique data structures per core for the rest. It also includes systems that poll and do not use interrupts. In the case where polling is used, each core has its own (unique) data structure.

Thus, the mechanism partitions data structures across the CPU cores executing program code and IO processors, which operate across a hardware interface to a shared parallel storage device so that each core supports a single portion of the storage device by duplicating the required data structures and dedicating device interface. This removes the need for synchronization of the individual CPU cores, which is usually implemented with operating system software locks. This extends into the hardware that would normally provide a single interface to software thereby reducing efficiency and parallelism.

Figure 25:
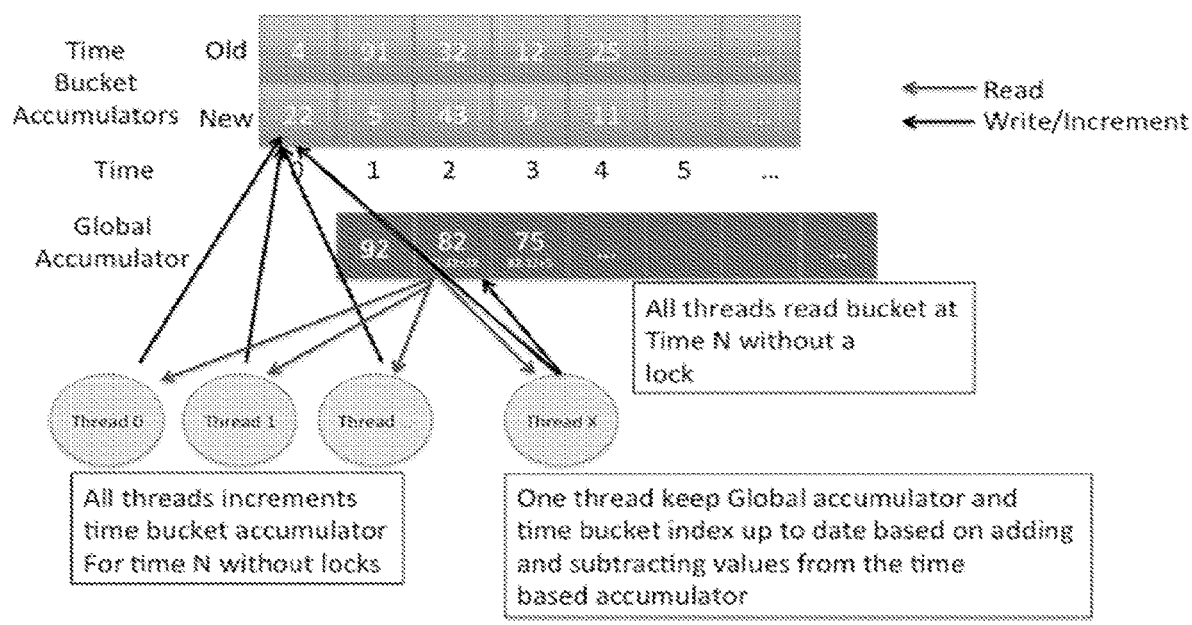
FIG. 25 illustrates event counting in accordance with an embodiment of the invention.

In a multicore, multithreaded system, it is convenient to count events with a small error margin. Such counts can be utilized for policy-making and dynamic policy management. FIG. 25 illustrates a system to support event counting. A circular queue of accumulators has buckets, where each bucket represents a time period. During a time period, producers increment the associated accumulator (conflicts may be ignored, thus the count is approximate). During time period+2, the consumer adds the accumulator at the original time-period to the consumer's global accumulator (time period+2 is chosen to avoid conflicts). At a new time period, the new time-period's accumulator is subtracted from the global accumulator and the new time period is set to 0. The consumer maintains a current time-period pointer and updates it atomically.

In this embodiment, the producer is also a consumer. One example of the usage of this accumulator is approximating the number of reads over the last 10 MS in an IO system where threads (or processes or cores) are doing reads independently. This mechanism allows the threads to contribute to the global accumulator without using a lock. The time bucket accumulator is approximate, but since a single thread uses it to update the global accumulator, the global accumulator is consistent and lock free.

An embodiment of the invention includes a mechanism that allows for the movement of live pages in preparation for a flash block erase near the device without requiring a copy to temporarily store that data and then a recopy to another place in flash over a slower bus. In systems that require erasing storage before writing it a second time, the pages that still have data in use or live must be moved to newly erased pages so the system can re-use the page. Second writes of the same logical page always occur to a newly erased page, leaving data that will never be used again (a dead page). Unless the system does "garbage collection", the device will fill up with dead pages and be unable to accept any new data.

As storage systems involving FLASH (flash memory) or other media requiring garbage collection become more complicated, more sophisticated mechanisms are required for garbage collection. In one embodiment, data is moved from a number of FLASH pages identified with Logical Unit Numbers (LUNs). A LUN is a separately programmable portion of FLASH storage. The movement is done in a manner that allows one to read the live pages that are being garbage collected in parallel. In this embodiment, it is also desirable for the live pages to be coalesced to write the largest amount of data to flash that can be written at one time. In modern systems this can be 64 KB or greater, whereas the aforementioned reads are of 4 KB. So we read 16 of 4 KB pages in parallel from different LUNs and write 64 KB in parallel to a newly erased LUN. In this embodiment, on top of the complexity of the parallelism, we have a data protection system that accumulates 64 k of parity while the data from the reclaimed (garbage collected) pages is stored on the newly erased pages.

Figure 26:
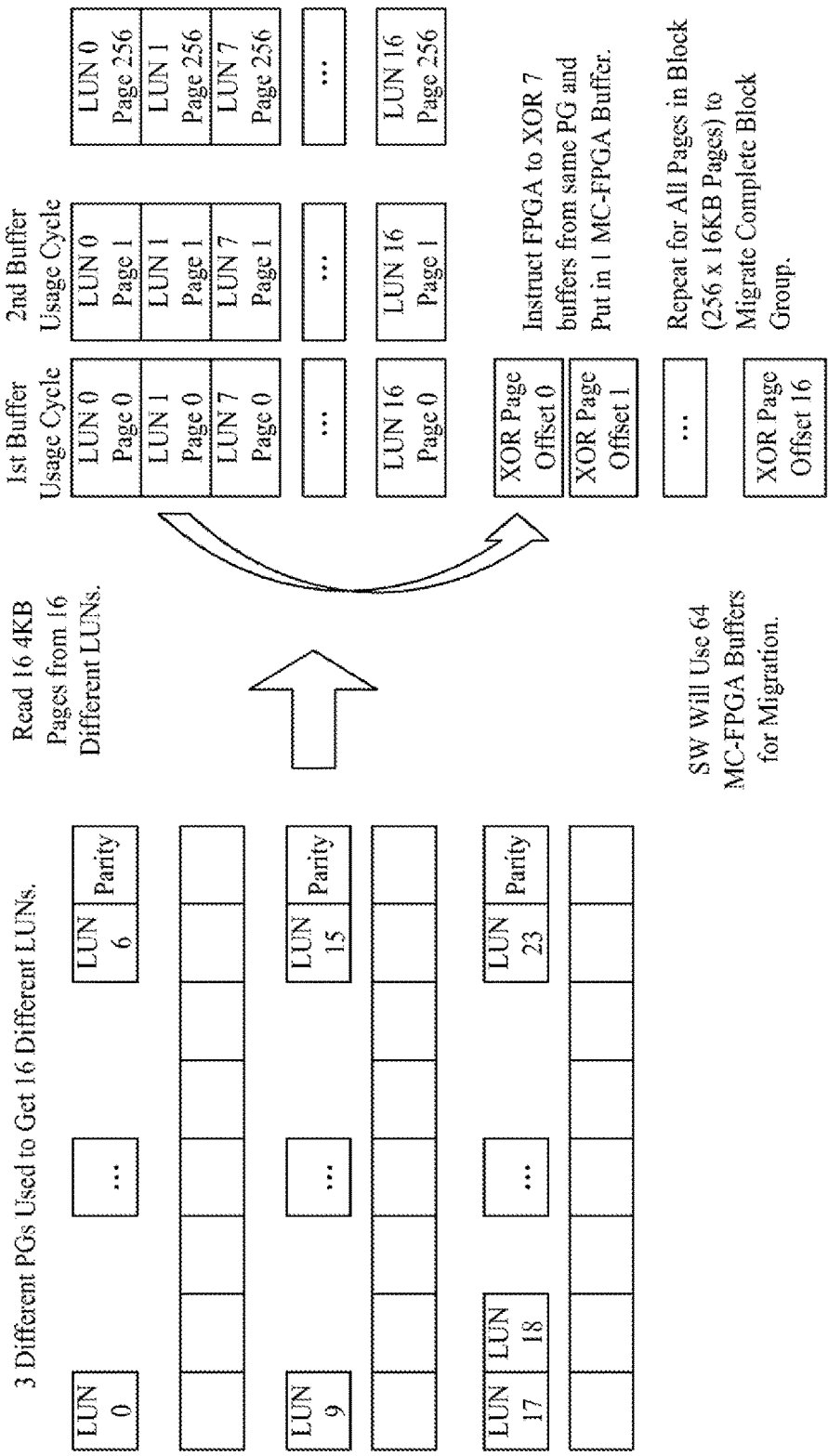
FIG. 26 illustrates a migrate pivot performed in accordance with an embodiment of the invention.

FIG. 26 illustrates three different pages used to obtain sixteen different LUNs and associated parity values. A field programmable gate array may use an execution kernel to perform a logical XOR on LUN values from the same page. The operation is repeated for all pages in a block so that a complete block group is migrated. In this example, 256 16 KB pages are migrated.

Several embodiments of the invention differ with respect to the placement of the buffers coalesced and the calculated parity. In traditional systems, this operation is often performed on the main CPU, which is also used for running applications. That method has two problems. First, it requires moving the data over many buses. Second, it requires CPU time that could be used for other purposes, such as, user applications.

Figure 27:
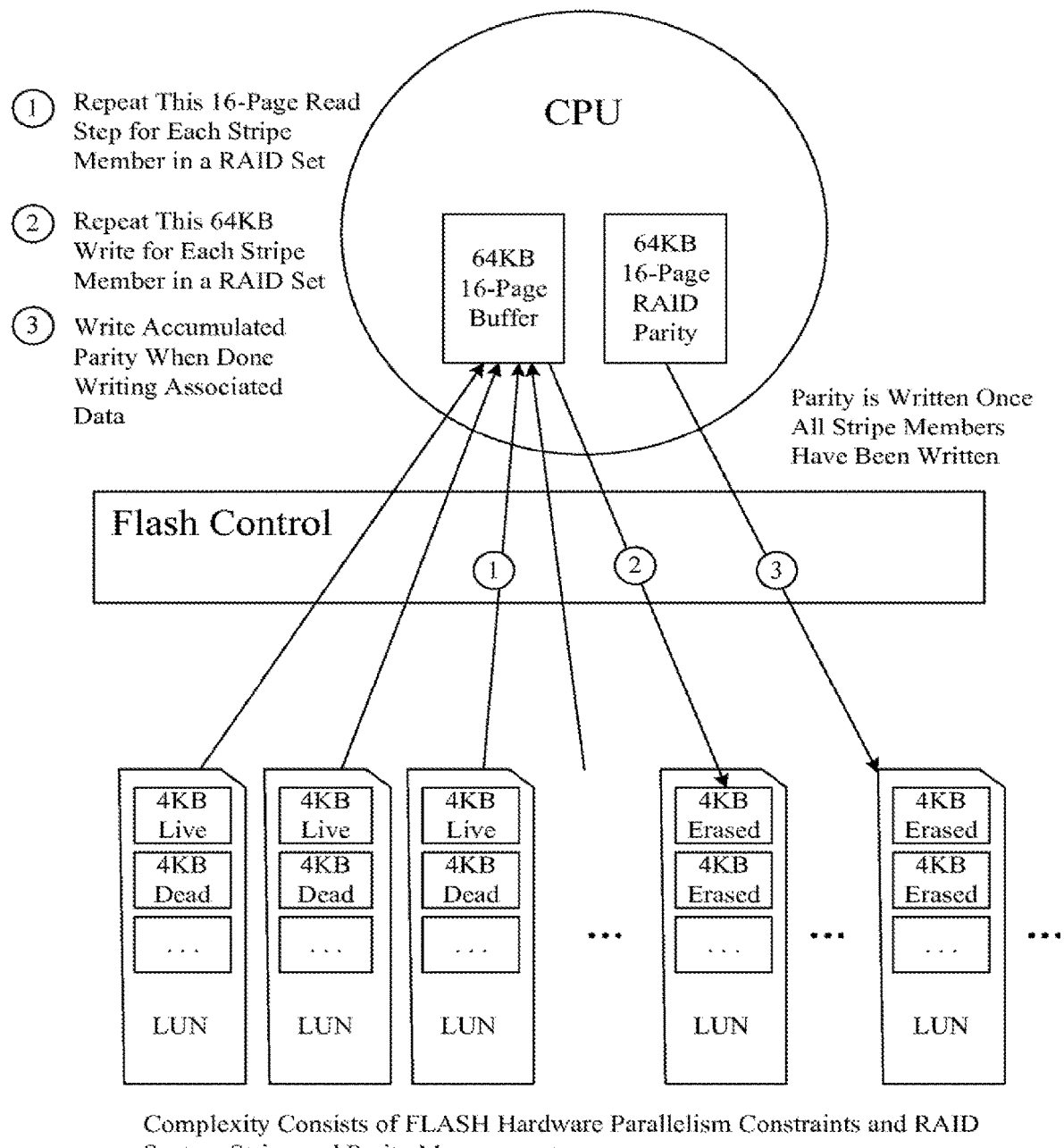
FIG. 27 illustrates prior art garbage collection operations relying upon a central processing unit.
Figure 28:
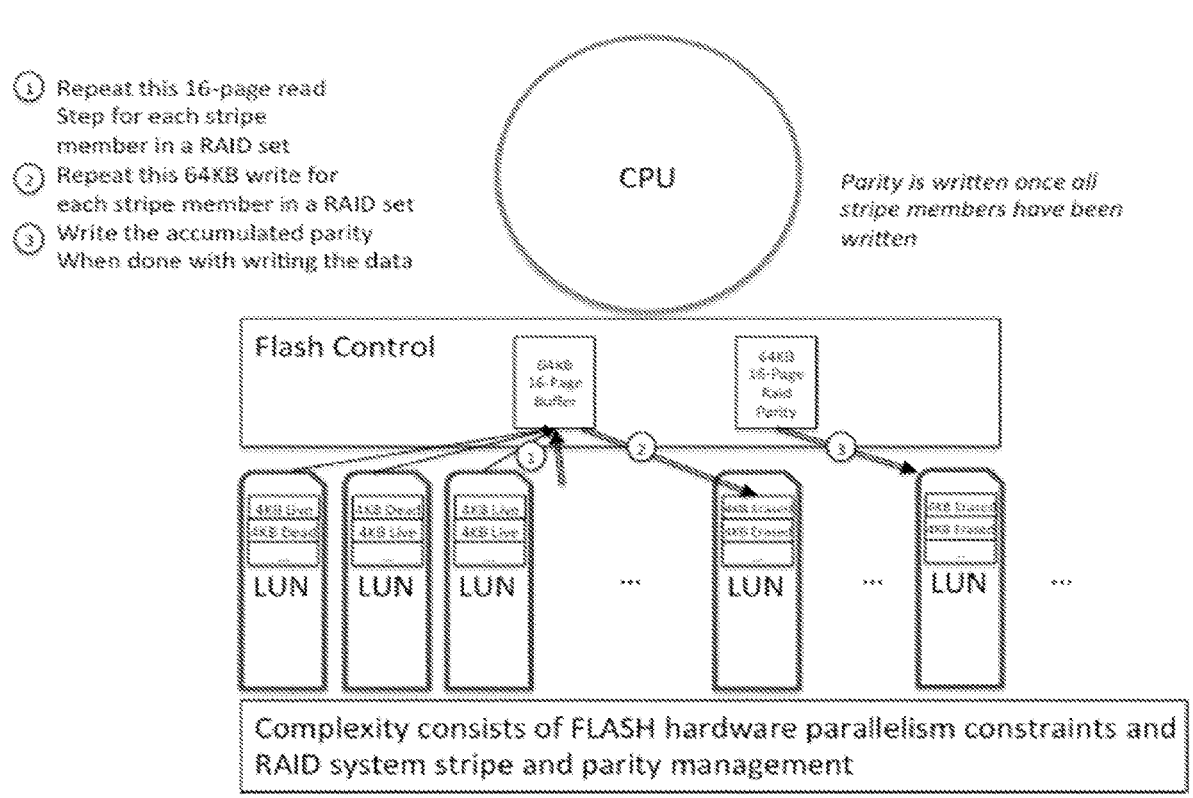
FIG. 28 illustrates garbage collection operations performed by a flash controller in accordance with an embodiment of the invention.

FIG. 27 depicts the data flow in a prior art system performing garbage collection. The figure illustrates that the CPU coordinates operations. An embodiment of the invention offloads CPU work to another resource, such as the memory controller or flash controller. FIG. 28 illustrates a flash control based system that eliminates utilization of the central processing unit. That is, the flash controller, such as flash controller 1852, is used to provide hardware parallelism for RAID system stripe and parity management. Parity may be written after all stripe members have been written.

In systems that require erasing storage before writing it a second time, the system needs to "garbage collect" the pages that still have data that are in use and move the data to newly erased pages. The system can then erase and reuse the garbage-collected pages. Second writes of the same logical page always occur to a newly erased paged leaving the original data to never be used again (a dead page). Unless the system reclaims pages that have been previously used for data storage but are now free, the device will fill up with dead pages and be unable to accept any new data. This overall process of page reclamation is often referred to as garbage collection.

Figure 29:
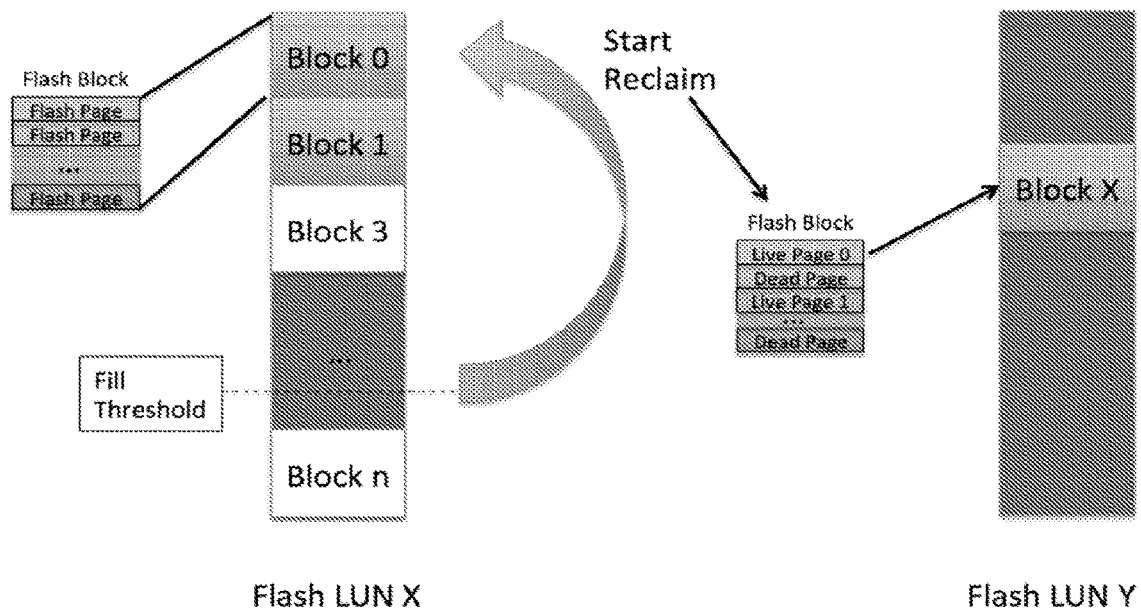
FIG. 29 illustrates garbage collection operations performed in accordance with an embodiment of the invention.

FIG. 29 depicts one embodiment of garbage collection. When the live pages are garbage collected (or reclaimed) a system might consider reclaiming the pages seen above Block 0 of FIG. 29 one after another, but if an application needs the system to read data from Block 1, it cannot, because (except in rare cases) only one page (or group of pages) can be read at one time, thus blocking any reads elsewhere. This inability to simultaneously read pages from multiple blocks is common to devices like FLASH and is referred to as an access conflict.

Figure 30:
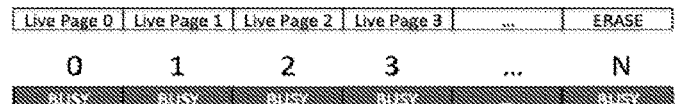
FIG. 30 illustrates a deferred read garbage collection technique utilized in accordance with an embodiment of the invention.
Figure 30:
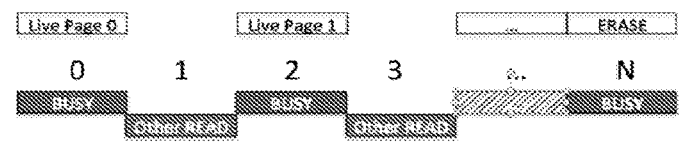

FIG. 30 exhibits the conflict and solution. This mechanism reorders the operations in time. The reordering is accomplished by deferring reads for garbage collection by some amount of time (listed as 1 in this embodiment) so that other demands on the FLASH LUN can be met, thereby avoiding periodic starvation.

Trim is a function that is supported by most operating systems. It refers to the act of a file system or application telling a device like FLASH that it is done using a page of data. For example, this may arise when the page had been deleted (a "dead" page). Devices like FLASH must keep track of dead pages so that when the system does garbage collection, it does not migrate dead pages. It is easy for the system to keep track of dead pages that have been overwritten because the system sees the write, but deleted pages need the Trim function to notify the device because the knowledge of something being deleted does not, in itself, result in an operation the device sees.

Trim information is typically kept in some runtime data structure that is maintained either by the CPU or device. It is also typically logged or written somewhere on permanent storage in the system. Therefore, if the system crashes or upon reboot, the system can have continuity in its Trim tracking in preparation for future erases.

An embodiment of the invention invention modifies the logging of the Trim to include ranges in order to reduce the logging required. In a large system, if you delete a Terabyte file, individual logs for each page in the file could amount to 260 million entries each taking a byte or more to store. Trim range can reduce that to a low number of entries—possibly in the single digits.

In systems that include storage like FLASH which require Block erasure between writes, it is important to be able to store metadata that can be used to reconstruct runtime data structures. Many systems log this data in various places. They work to co-locate the data in logs. This has a number of issues. First, elongated times between data and metadata writes reduce the accuracy of the logs on reconstruction. Another issue is management of log space, which requires another device or its own garbage collection algorithm.

An embodiment of the invention entails storing the metadata along with the data. The invention relies on having a massively parallel system so that the metadata can be read in parallel upon reconstruction. It also takes advantage of writing the metadata along with a large amount of data to both take advantage of devices that can write upwards of 64 KB at a time on a single device and 100s of millions of bytes across the system as well as sharing metadata across data pages (for example sequence numbers). Further, the metadata can be easily shared across pages in a stripe or across stripes in a system supporting data protection.

FIG. 31 illustrates an erasure code similar to a RAID5 of 7+1. A protection stripe shown in the figure can represent multiple data pages (e.g., 112) and multiple parity pages (e.g., 16). One or more of those pages are used to represent the metadata for the other data pages. The metadata could include page virtualization table entries mapping block device pages to flash pages. The metadata may be sequence numbers to distinguish which metadata was written last. Since Flash requires that an overwrite operation target a recently erased page and not write over the original page, there may be multiple versions of the same page. The metadata may be bad block information used to detail newly found bad blocks. The metadata may be Cyclic Redundancy Check (CRC) information to provide end-to-end data protection. The metadata may also be trim information to represent which flash pages have been erased. In various embodiments, the amount and kind of metadata could be different; the exact storage location could change, etc.

When a page is rewritten in media like FLASH the same location cannot be written twice without first performing a very expensive erase operation. During a rewrite, a data page's location is virtualized so that operating systems can view the device as a sequential set of pages, even though those pages may not be in sequential order or in corresponding positions in the FLASH device. A first write may take the form shown in FIG. 32. Since this is the first write, the virtualized data pages may be on actual (physical) pages with the same or similar indices. As time goes on, some pages are moved to different locations on that device, due to rewriting or updating the data or other device management considerations (e.g., garbage collection and erasures on flash). FIG. 33 shows the PVT after a representative set of subsequent writes.

As discussed above, Flash Blocks contain pages. In most Flash devices entire blocks must be erased. Pages cannot be individually erased. Blocks and their constituent pages cannot be written until the block is erased. Over time, blocks must be erased to make them writeable again. Consequently, once the first page is written, it is unlikely that it will be written to the first page in FLASH, even though the operating system or user application may continue to identify it as the first page. The PVT enables this process.

The process becomes more complicated if a block turns bad and becomes unusable or a sophisticated wear leveling algorithm is employed. Over time, the wear leveling moves blocks in order to create even-wear during some periods and uneven-wear during other periods (e.g., at the end of flash life so we do not wear out all flash at one time).

An embodiment of the invention uses a two level virtualization scheme. One level is used for the page and one level is used for the block, as seen in FIG. 34. That is, FIG. 34 shows a PVT 3400, a Block Virtualization Table (BVT) 3402 and memory 3404. After mapping a virtual page address to a physical page address in FLASH via the PVT, the part(s) of the address that identify the block are mapped to that address using the Block Virtualization Table (BVT). Using this technique, one can determine which block is used without the rest of the system having to understand the process, as can be seen in FIG. 35.

In this case block 0 was bad and the data in it was moved to block 73. In some embodiments, the selection of replacement blocks is optimized in order to enable functions like RAID by picking replacement blocks that are in the same decay set.

Most IO devices include a small number of sub-devices. There are problems with this model. First, often these devices are grouped together via striping. Each device is programmable in parallel but often they have a single controller doling out IO operations sequentially or in small numbers. In addition, these systems have too few devices to be effective.

Figure 36:
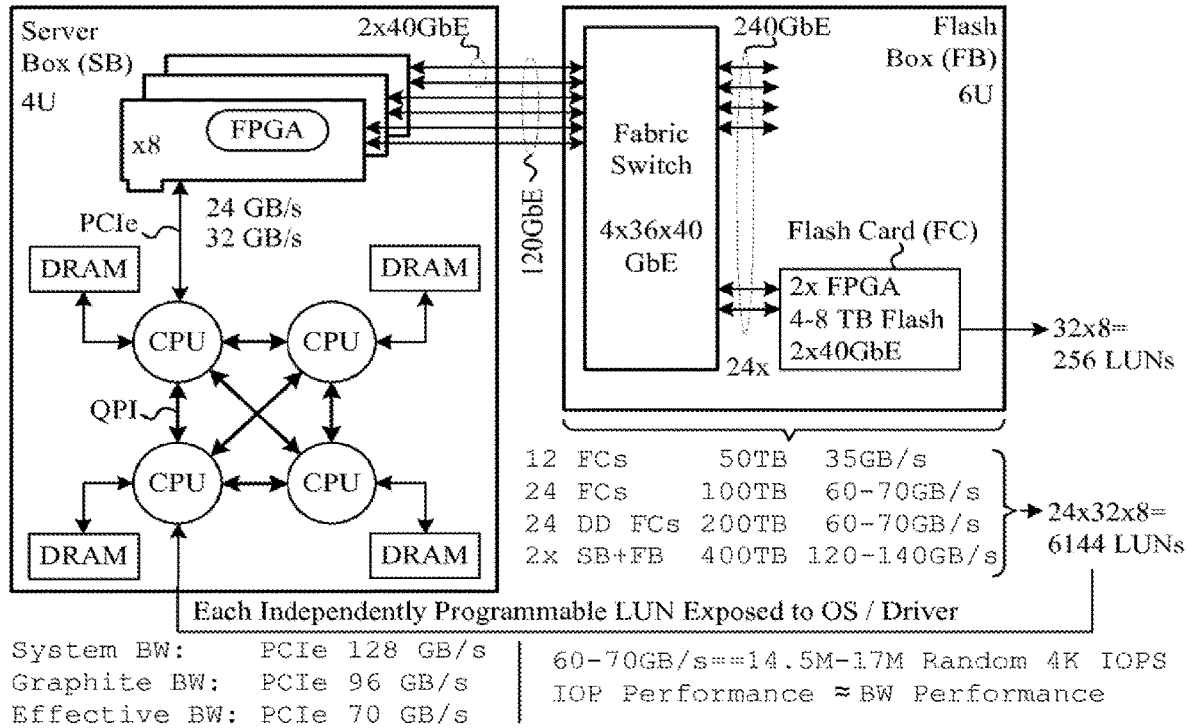
FIG. 36 illustrates parallel access to LUNS in accordance with an embodiment of the invention.

An embodiment of the invention incorporates a large number of independently programmable devices into a system to enhance the infrastructure to enable them to be programmed in parallel. FIG. 36 shows a device with separately programmable devices called LUNs. All of the LUNs are made available to software. There are replicated resources in the flash controller to enable parallel data access.

Figure 37:
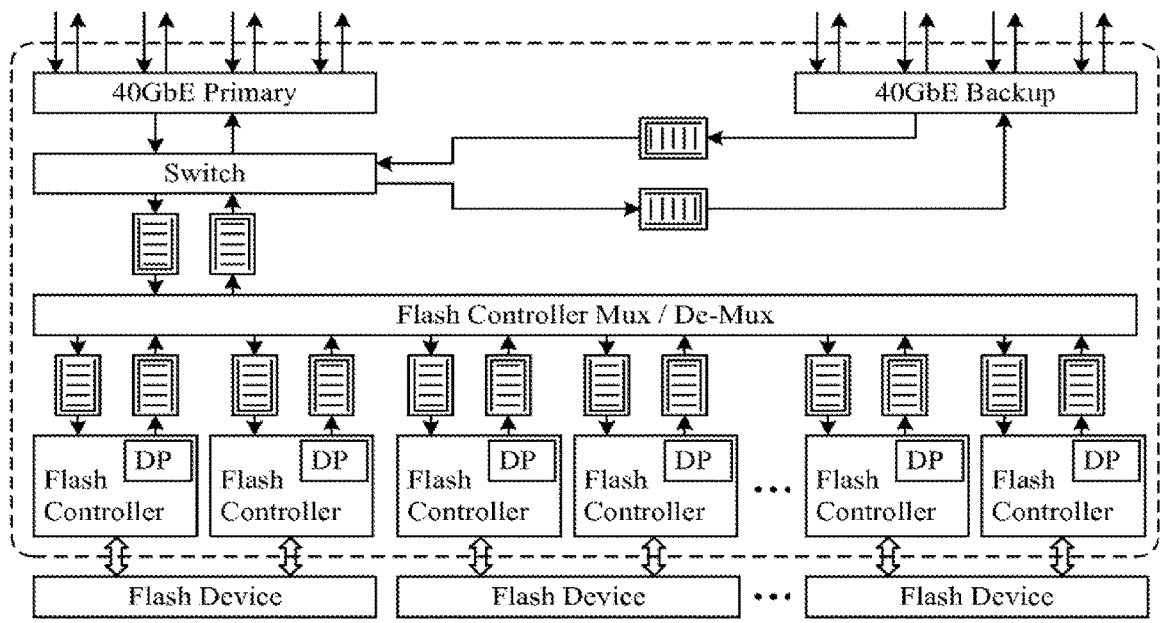
FIG. 37 illustrates a 40 Gb architecture utilized in accordance with an embodiment of the invention.
Figure 38:
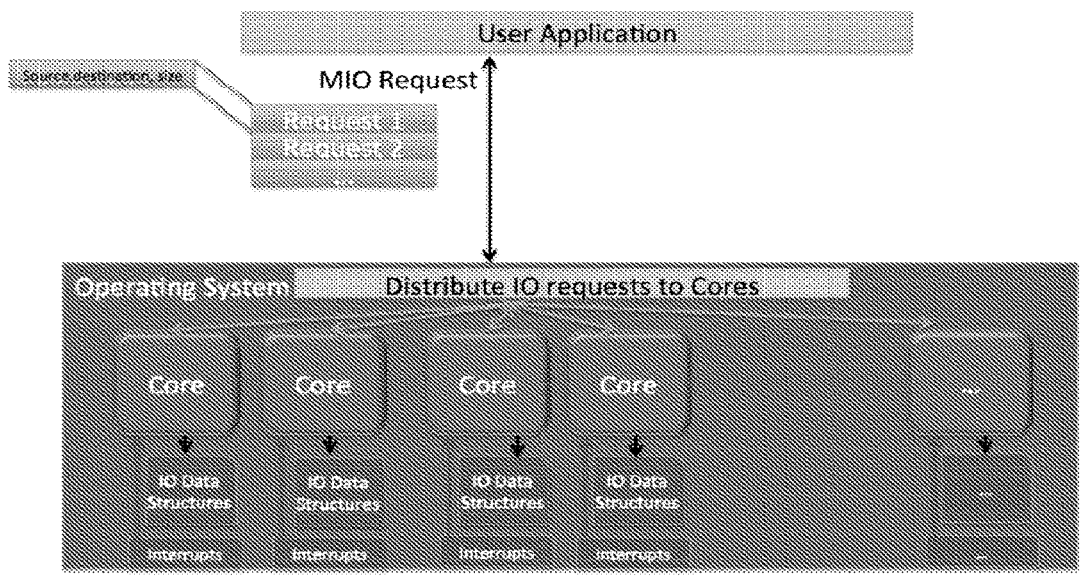
FIG. 38 illustrates parallel processing through per-core dedicated I/O structures and interrupt modules in accordance with an embodiment of the invention.

FIG. 37 shows a 40 GbE communications protocol provisioned to handle the volume from the independent FLASH controller resource. This allocation continues all the way up the stack as seen FIG. 38. FIG. 38 shows resources duplicated all the way through the originator of the requests to the CPU.

An embodiment includes the programmable devices and duplicated resources that enable software and end user applications to exploit parallelism. The primary result is massively parallel operation and performance improvements by doing IO in parallel. The secondary result is that this invention enables a system to perform the same on sequential operations and random operations. Since it does so much in parallel, it performs equally well processing sequential or random requests.

Certain computations, such as the previously discussed read-around, require a logical XOR operation on non-blocked data pages and parity from a stripe. The typical approach for this is to use the CPU, but this approach increases the DRAM requirements for the CPU, memory bus bandwidth usage, cache utilization, and CPU utilization. An embodiment of the invention uses non-CPU resources to buffer the data and parity pages and non-CPU resources to perform the logical XOR. Once the page is reconstructed, the CPU can read it directly without further work.

Figure 39:
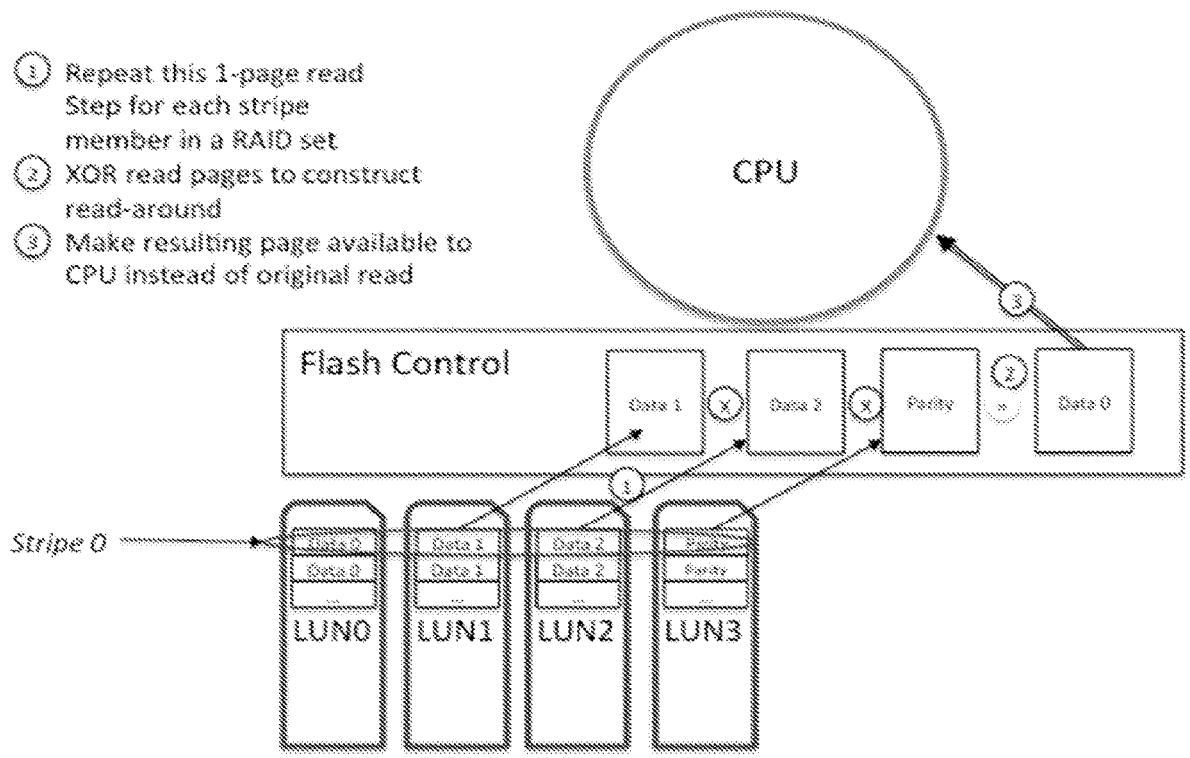
FIG. 39 illustrates off-CPU stripe processing performed by a flash controller in accordance with an embodiment of the invention.
Figure 40:
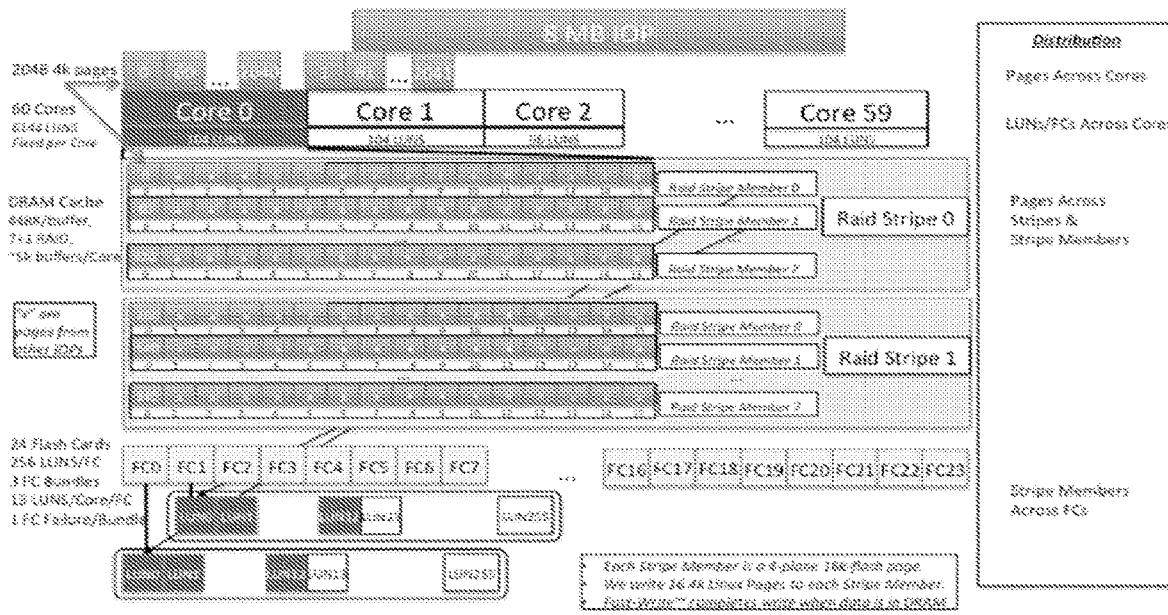
FIG. 40 illustrates a DRAM fast-write buffer utilized in accordance with an embodiment of the invention.

FIG. 39 illustrates an embodiment in which a flash controller is an off-CPU resource. Strip 0 Is a one page read from a RAID set. After reading the values, a logic XOR operation is performed by the flash controller. The resulting page is then made available to the CPU.

A problem arises in a computer system when there is a need to write to a device that is slow. It is desirable to complete the write transaction so that the application can continue and not wait for the slow device. An approach to solve this problem is to copy the data to a CPU-specific buffer on another resource, such as an FPGA, a main memory buffer or some other external buffer. By coupling this with the previous inventions that do write distribution, one can complete a write in the time it takes to do a memory copy and one can avoid CPU time by using the IO processor.

FIG. 40 illustrates an embodiment of the invention where the system employs write distribution with a DRAM fast-write buffer. Normally, a system would hold onto a copy of the data in the original 8 MB IOP until the data is durably written on non-volatile storage. The application doing the original IOP expects the data to safely make it to storage and its only copy may be the one in the IOP. If the IO fails, data would be lost unless the original buffer is retained. In this invention we quickly (more than 2 orders of magnitude more quickly) store that data in a DRAM buffer and signal the application that the IOP is complete. If the IOP subsequently fails, the system retries it using the data in the DRAM buffer.

In order to guard against power failures this system must include an uninterruptable power supply. In the event of a power failure, uninterrupted power is available to allow time for the data to drain to non-volatile storage from the temporary DRAM buffer copy. This mechanism does not protect against other types of failures, for example, operating system failures or "crashes," unless the DRAM is also non-volatile memory. Even with non-volatile DRAM buffers, protection against all failure types is not possible.

Fast writes refers to moving data in an application's write buffer to a safe place while it is being stored. Consequently, the application can consider the write complete and therefore continue more quickly. It may be that there is no place to store this data in the storage hardware. This mechanism stores it in the host's DRAM until the data is confirmed on non-volatile storage.

This embodiment uses the DRAM on the CPU running the original application and uses the original IOP to store the data in a DRAM buffer. The data from the original buffer is copied to the DRAM buffer either using CPU commands or using an IO device capable of Direct Memory Access (DMA) to the original buffers and to the copy buffers.

Traditional operating systems usually have a number of ways to do IO or read from a file. The most common mechanism is a blocking read. That is, the application calls the operating system and requests from a device or file, a single set of data, of a single size, which it wants to be stored in a single destination, and it waits until the operating system completes the operation. This is often referred to as synchronous IO.

A second mechanism is often called asynchronous IO. To use this mechanism, the application sends a list of requests to the operating system. Each request has unique sources, destinations and sizes. The application does not wait for a result, hence the name asynchronous. Operating systems provide various mechanisms for applications to check on the status of the requests. The application reports completed requests until all requests are accounted for. FIG. 41 depicts this mechanism in various implementations of the Linux Operating System.

In most operating systems, the overhead associated with managing this list is large and can cause the speed of one 8 MB blocking request, as compared to 2048 4 KB asynchronous requests, to be much faster. This speed is due to two factors. The first factor is the cost of managing the asynchronous requests. The second factor is the inability of the operating system to take advantage of devices capable of massively parallel processing. In addition, if the application tried to submit 2048 4 KB blocking requests, the overhead of making those individual requests to the operating system would slow the cumulative IO operations even further.

An embodiment of the invention is a mechanism for handling multiple simultaneous synchronous IO requests like the asynchronous mechanism, but with the efficiency of the individual blocking read. This requires a device capable of massively parallel IO and an operating system with per core data structures to avoid locks—both of which are previously disclosed. This feature is called Multi-IO or MIO. FIG. 42 depicts one architecture. Each core 4200 has a dedicated IO structure 4202 and interrupt path 4204.

In the case where the read to write ratio is 3:1 or better for sequential writes in an N+1 data protection layer and there is a write on one of the Data Protection stripe members, one can reconstruct the read faster by reading the stripe members than by waiting for the write. This invention is particularly appropriate for systems where writes are very slow compared to reads and reads can be done in parallel. This invention also includes the use of a prorated scale down to a 0:1 read to write ratio in order to increase the parallelism of writing data protection stripe member data out when there are not enough reads to use "read-around."

Figure 43:
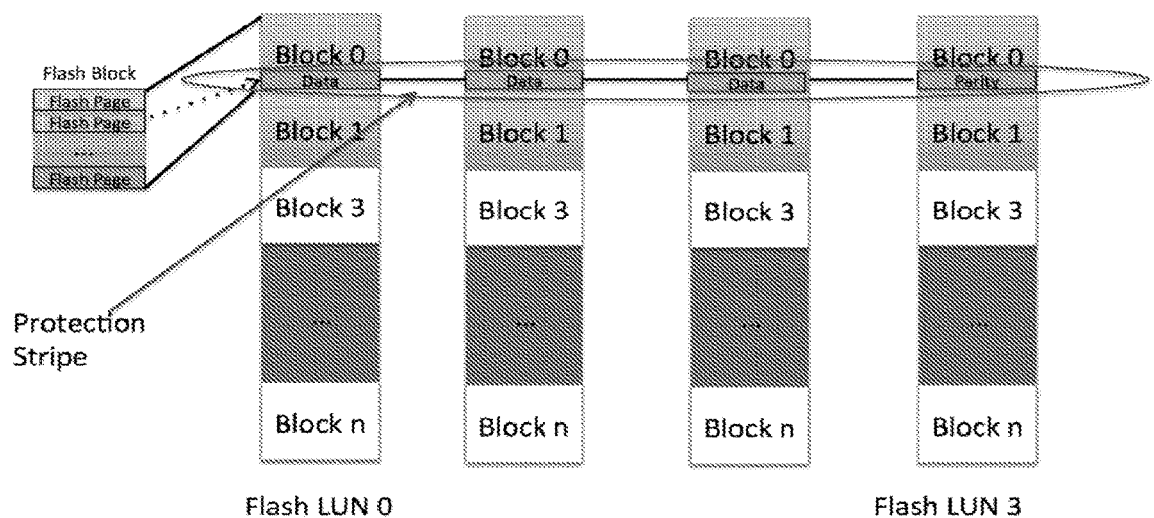
FIG. 43 illustrates a data protection technique utilized in accordance with an embodiment of the invention.
Figure 44:
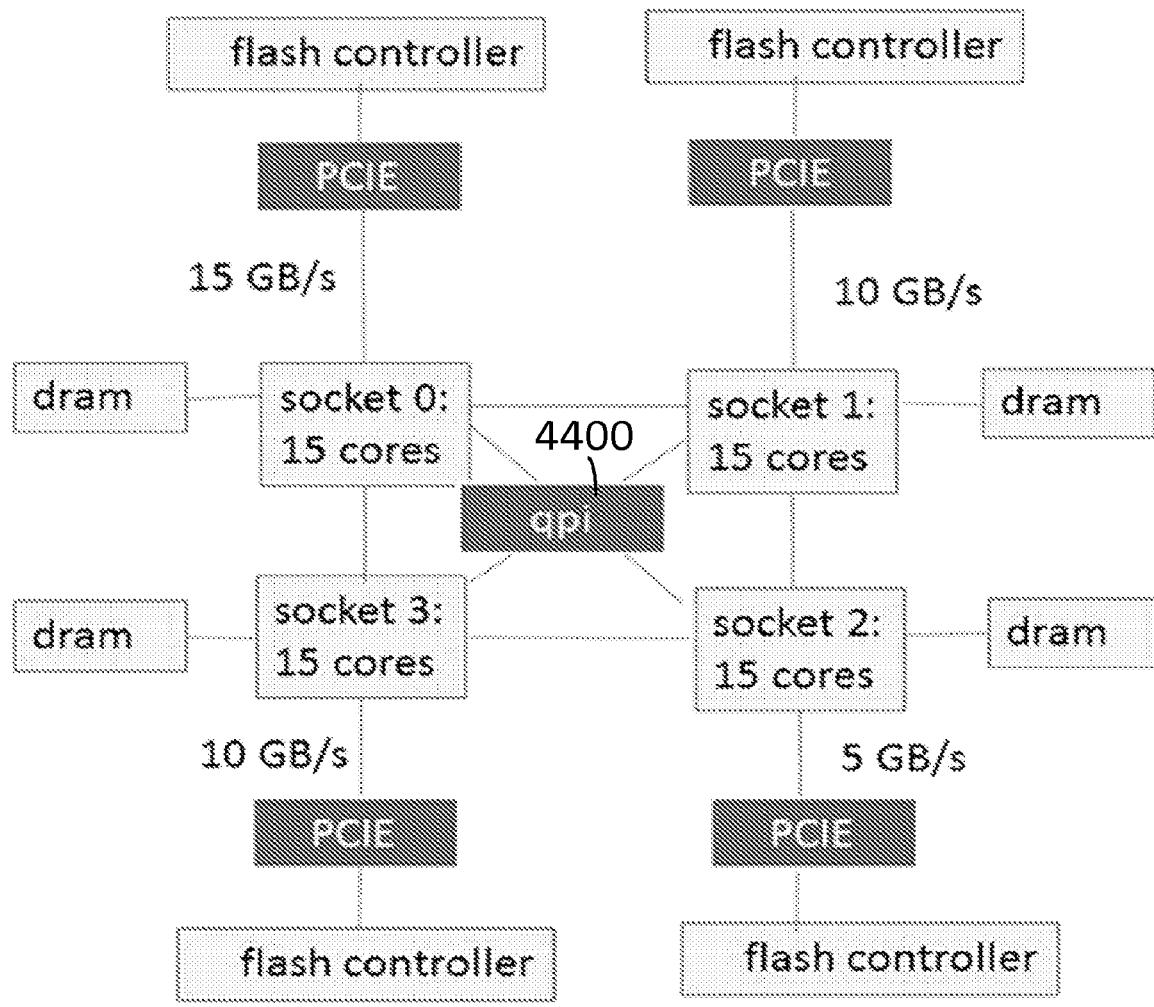
FIG. 44 illustrates a load balancing architecture utilized in accordance with an embodiment of the invention.

FIG. 43 illustrates one embodiment of a data protection system for flash. If one tries to read from a page on flash in Block1 on LUN 0 while the system is also doing a write to LUN 0, the read must wait until the write is complete. Earlier in this disclosure there was a disclosure to re-create a page from the RAS system rather than wait for the write to complete. This is plausible because in many devices you can a) read a page many times faster than write a page and b) you can do reads from multiple LUNs in parallel. Referring to FIG. 43, one can read from LUNs 1-3 very quickly, and XOR the result to get the desired page. This operation is much faster than waiting for the write. This technique is called "read-around."

However, for read-around to be effective, LUNs 1-3 must be available. In particular, since they are part of a data protection stripe with LUN 0, the system is often ready to write LUNs 0-3 simultaneously (a little sequencing is required for parity but writes take so long it is likely even LUN 3 can overlap the writes in the other LUNs if they are issued as quickly as possible).

One solution is to sequence the writes within a stripe. In other words if you are ready to write the data for LUNs 0-3, you could only allow one of them to be busy at a time. This ensures that you do read-around and not be blocked by another write. However, this is inefficient and restricts write-bandwidth significantly (in this case it would be ¼ of its potential).

An adaptive scheme is used that takes into account a number of factors to determine where to sequence writes in a data protection stripe or not. In one embodiment the factors include the read-to-write ratio and IO utilization across the system over recent history (e.g., 10 ms). If the read to write ratio is 3 to 1 or greater, then one is more likely to have reads blocked by writes and it is important to have this feature. If IO utilization is up (say greater than 80%) one might want to restrict read-around because it increases overall 10 bandwidth utilization since it reads 3 pages for every read performed during read-around. This embodiment also includes some pro-ration of what percentage of writes are serialized to support read-around when the read-to-write ratio is less than 3 to 1 and greater than 0 to 1 and the IO utilization is less than 80%.

With N+1 Data Protection one can recreate data to satisfy a read request if the unit holding the data is busy by reading around the busy unit (reading N−1 data pages and one parity page). If 1/(N+1) units or less are currently busy one can ensure all data can be read around by distributing the writes evenly. To satisfy write loads that require greater than 1/(N+1) units are busy, assign one write to each PG, then assign a total of N+1 writes to enough units to satisfy the write load thereby leaving as many PGs as possible with only one write. This maximizes that amount of read around possible.

In a system where the number of Peripheral Component Interconnect Express (PCIe) lanes is not the same across all sockets, the PCIe cards in different sockets should not handle the same size load. Otherwise, the total system bandwidth is throttled by the PCIe bandwidth available in the socket with the least number of PCIe lanes. This mechanism schedules IOs on flash controllers based on available PCIe bandwidth, and uses the QPI to transfer data that arrived on the PCIe bus to the socket where the user buffer resides. The system in FIG. 44 exhibits a PCIe bandwidth imbalance.

There are 4 sockets in this system, each attached to a varying number of PCIe lanes, so that socket 1 and socket 3 have 10 GB/s of PCIe bandwidth, while socket 0 has 15 GB/s, and socket 2 has 5 GB/s. Each PCIe bus has a number of flash controllers attached, which are capable of initiating DMA operations over the PCIe bus. Assume there are pending operations that consist of a CPU-intensive portion, and an IO-intensive portion that transfers data over the PCIe bus. It would be desirable to schedule the same number of operations on all 4 sockets for a number of reasons. First, there might be a generic system wide scheduling algorithm that load balances the cores. Second, each socket has the same number of cores; so to balance the CPU-intensive portion of the work amongst the cores it would make sense to assign the same number of operations to each core. Otherwise a CPU bottleneck may result while there may still be CPU resources left. However, balancing out the CPU-intensive portion of the operations conflicts with the IO-intensive portion of the operations since the PCIe bandwidth is not balanced across the sockets.

If the IOs are scheduled evenly across the 4 sockets and if each core gets assigned the same number of operations to complete, then the whole system can only complete 5×4=20 GB/s of IO while the entire system is capable of (15+10+10+5)=40 GB/s. One way to get around this issue is to have each core handle equal amounts of CPU-intensive portions of the operation, but initiate the IO-intensive portions of the operations on a flash controller that is on a remote socket to the core, such that the full bandwidth of each PCIe bus can be used. The IOs on a remote socket need to move to the socket local to the CPU initiating the IO operation via the QPI bus, but this balances out both the CPU-intensive portion of the operations as well as the IO intensive portion of the work. In this specific example, cores handling operations in sockets 1 and 3 don't need to initiate any IOs from remote sockets since they have 10 bandwidth that is exactly the average bandwidth required per socket. When an operation comes to socket 2, however, it needs to initiate 50% of the IO requests on the flash module on socket 0, since socket 2's PCIe bus is 50% under-provisioned versus the average required per socket (5 GB/s vs. 10 GB/s), while socket 0 is 50% over-provisioned versus the average (15 GB/s vs. 10 GB/s). The end result is that 5 GB/s gets transferred over the QPI bus 4400 from socket 0 to socket 2, but all 40 GB/s of the PCIe bandwidth for the system can be used, and all the CPU cores will be load balanced and handling the same amount of CPU-intensive portion of the operations.

In a system allowing multiple versions of a page to appear in the store (e.g., flash), sequence numbers record the order in which versions are created. Hence, the latest copy will have the highest sequence number. In large systems the management of these sequence numbers can be overly burdensome. For example, a 70 TB device divided into 4 KB pages requires 150 GB of memory to hold the sequence numbers of all its pages. If the device utilizes erasure codes to form stripes of 7 data symbols (blocks) and a single parity symbol (block), referred to as a 7+1 encoding, the memory required by the sequence numbers for 4-plane 16 KB flash pages can share the sequence number for the whole stripe, and reduce the size of the required memory to ~1.3 GB.

Figure 45:
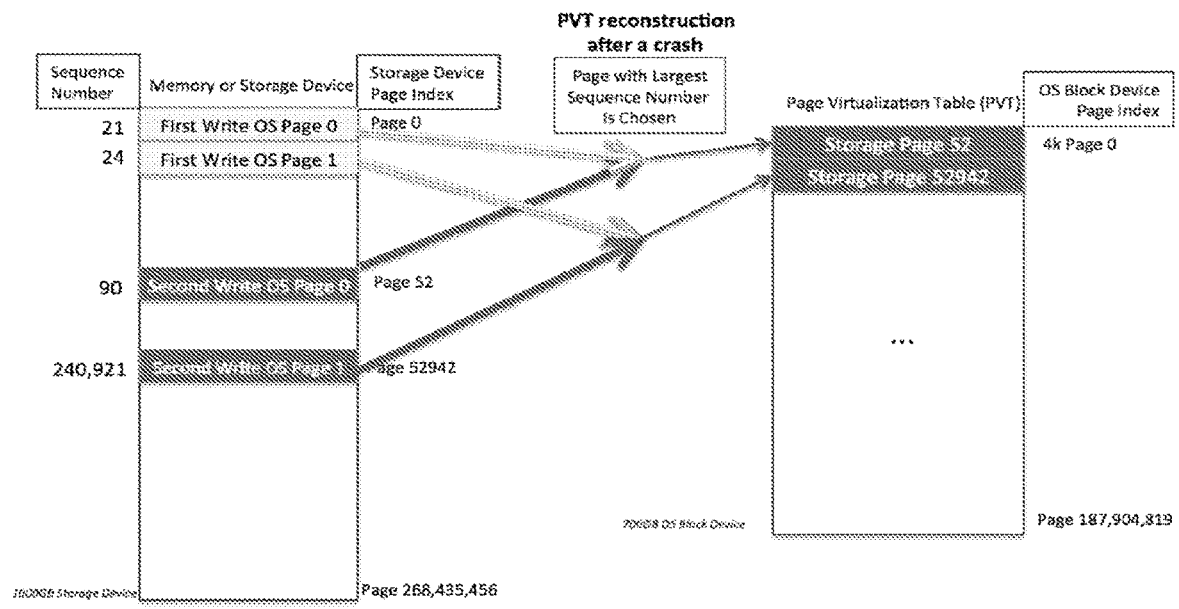
FIG. 45 illustrates sequence number processing in accordance with an embodiment of the invention.

FIG. 45 illustrates how sequence numbers are used in general. The sequence numbers are used to recreate the Page Virtualization Table (PVT) upon a system crash. The PVT maps the OS page index to a page index on the device. Since the pages on devices made up of solid-state memory like FLASH can move due to updates or subsequent garbage collection, the location stored in the PVT will change over time. At the time of a crash, multiple copies of a page may exist on the device. The OS picks the last version written as the actual data. It does this by comparing sequence numbers. In this embodiment, the sequence numbers are unique across the system. They are incremented in an atomic fashion upon access. Consequently, each use is unique, thereby guaranteeing that written pages are accurately marked with sequence numbers that identify which page was written first, even if multiple copies were written very close to each other in time.

Figure 46:
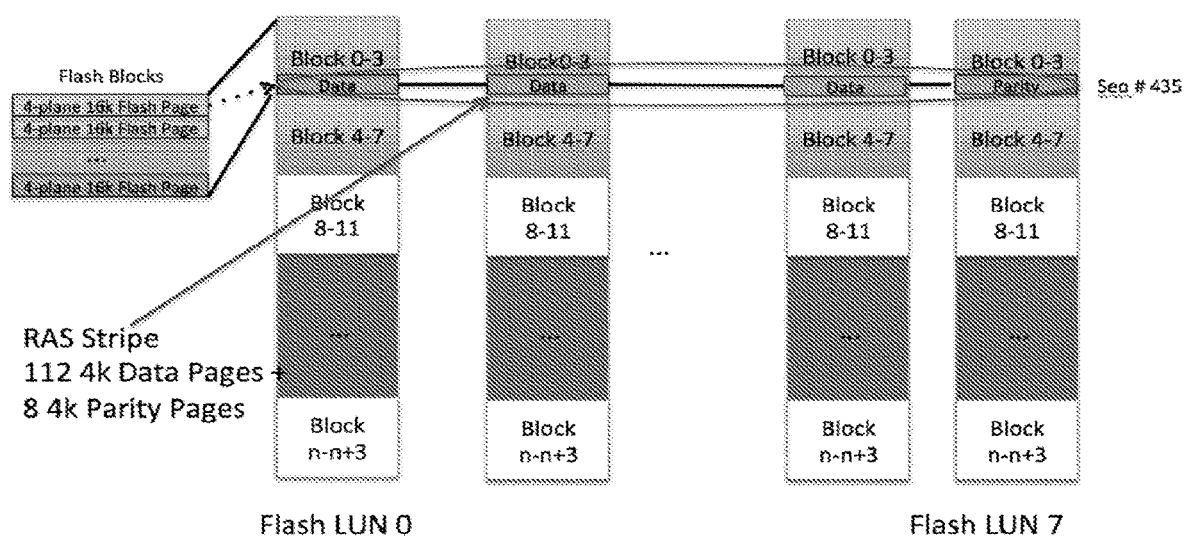
FIG. 46 illustrates RAS stripe processing utilized in accordance with an embodiment of the invention.

This invention just uses one sequence number for each data protection stripe. Since the whole stripe is written at once, only one number is needed to represent the sequence number. FIG. 46 shows a RAS stripe. In this embodiment, a member of the stripe is the size of the largest item that can be written to a FLASH LUN at one time: 64 KB, which is 16 4 k OS pages. Thus, the whole stripe represents 112 OS pages for which one sequence number is used. Hence, the total savings is over 2 orders of magnitude. This invention requires that writes to the same device page that happen very close in time must be written to stripes with different sequence numbers. Since this does not happen very often, one embodiment of this mechanism can serialize writes that happen very close in time to the same page, in order to ensure they have increasing sequence numbers.

The recoverability needs of devices including flash devices change over time. The devices require less data protection at the beginning of their use because they fail less often. Consequently, a 7+1 RAID-like data protection scheme suffices in the beginning and a 10+2 or 3+1 data protection scheme will be required at, for example, 75% of life.

Figure 47:
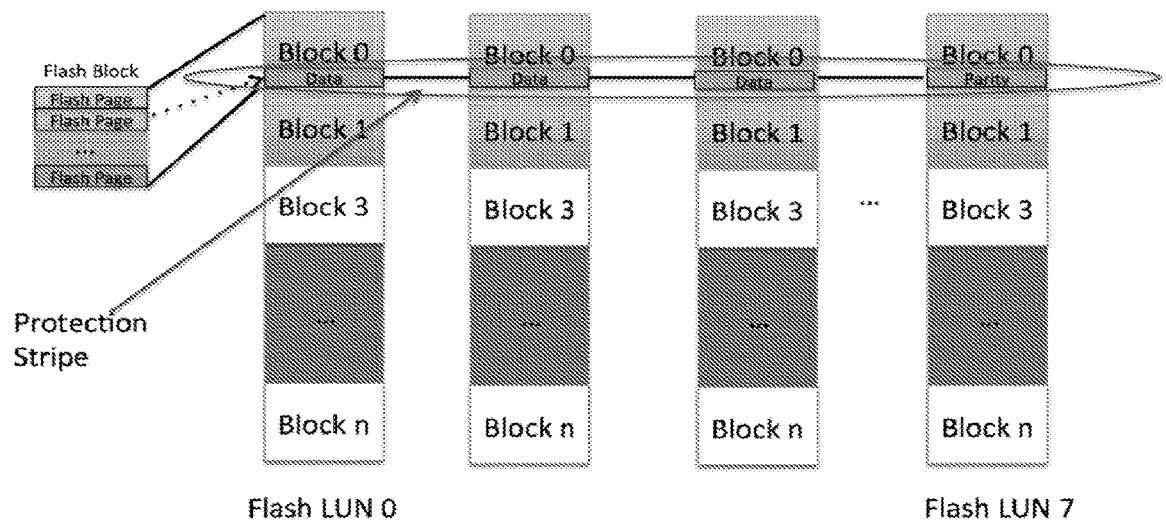
FIG. 47 illustrates parity page processing performed in accordance with an embodiment of the invention.

In one embodiment of a data protection system, the system supports RAIDS-like data protection with 7+1 (7 data and one parity member per stripe). This scheme uses a simple erasure code computed using XOR across all the data pages thereby creating a single parity page. FIG. 47 shows such a scheme.

Figure 48:
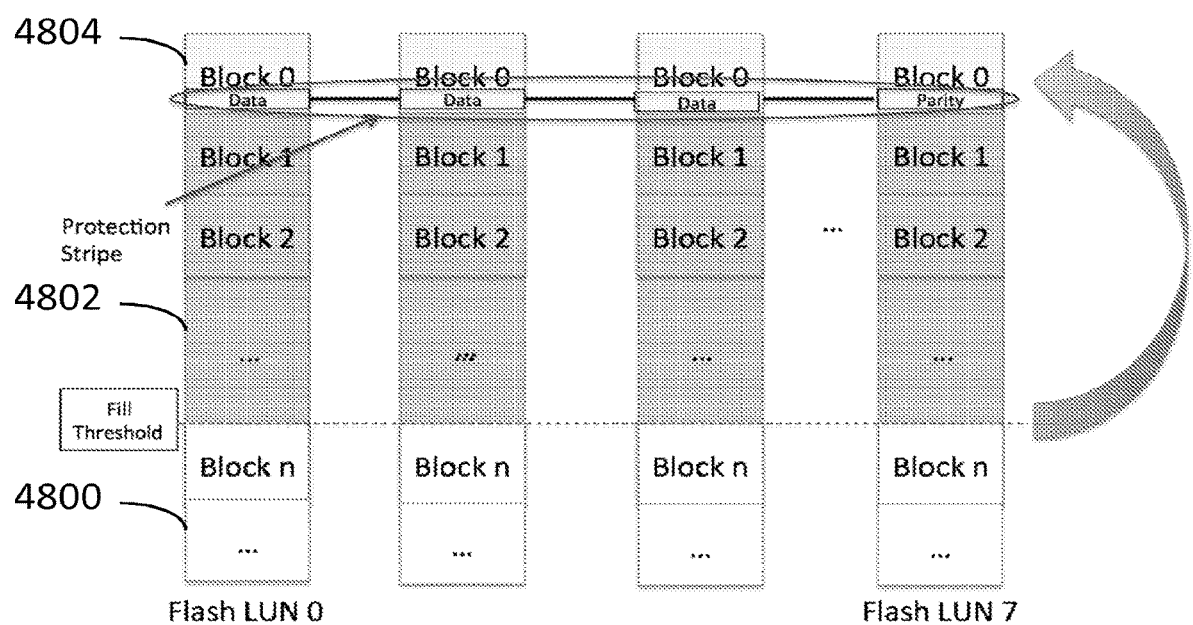
FIG. 48 illustrates integrated garbage collection and data protection utilized in accordance with an embodiment of the invention.

FIG. 48 illustrates integrated garbage collection and data protection. Garbage is collected from multiple LUNs at the same time. Live pages are written to new data protection stripes. Each LUN is treated like a circular list of data. Writes are to recently erased blocks 4800. Data is retrieved from written blocks 4802 and garbage is collected and erased from the oldest written blocks 4804.

At the point in time that a more conservative data protection scheme like a 3+1 is required, blocks are marked as participating in a 3+1 scheme. FIG. 49 depicts the transition between schemes and the identification of blocks by scheme. This embodiment makes things easy by having the more conservative scheme (3+1) be a factor of the less conservative scheme (7+1). This invention also supports more complex combinations.

In traditional systems that incorporate Data Protection on flash controllers (or other media requiring garbage collection), the Data Protection is often built on top of the flash system but is independent. When the system has to do garbage collection, the garbage collected live data (data that must be moved in preparation for a FLASH erase) must go all the way up to the Data Protection driver to maintain correct parity or you must maintain dead pages (pages that were overwritten by the user) to maintain a stripe longer than desired.

This problem is further complicated when systems contain flash that is most efficient writing multi-plane flash pages that are bigger than the system's natural page size (as dictated by the CPU). When the Data Protection system writes a stripe member, it has to write, for example 16 CPU sized pages for each member. In a RAIDS-like 7+1, that would be 484 KB of data+64K of parity per stripe (see FIG. 29).

FLASH works by erasing whole blocks of flash pages before those pages can be written again. If a page is written in a block and it is necessary to write that page again, it has to be written somewhere else in flash. The pages that have been overwritten are called "dead" and the pages that have not been overwritten are called "live". At some point the flash device will be full of blocks containing pages of live and dead data with no or few unwritten blocks. The dead pages are wasted space and must be collected. Collection is performed by writing the live pages from a block to a new location and erasing the enclosing block, thereby making it writeable again.

One approach is to use the blocks in a round-robin fashion. When the number of unwritten blocks is small, used blocks are reclaimed so they are ready to write again. With data protection applied, the system must also recreate parity as seen in FIG. 48 where blocks 4804 are being reclaimed (garbage collected).

An embodiment entails integration of the recreation of the data protection parity and striping into the garbage collection process and optimization of the hardware usage. FIG. 26 shows how pages are moved simultaneously to build up new raid stripes during garbage collection. Because we know how to read live pages simultaneously from different LUNs, we can actually garbage collect from multiple blocks simultaneously and then with knowledge of how simultaneous writes work, we build up enough live pages to do multi-plane 16 k page writes to the new location.

We also make sure that we do not unduly use the CPU to do this work by provisioning hardware close to FLASH that can execute the aforementioned commands and buffer the data as seen in FIG. 28. This combination of commands and hardware more tightly integrates garbage collection and data protection than in other systems and provides a level of performance improvement that is unique.

As described above, systems with FLASH-like memory require garbage collection in order to reuse memory. This invention is a mechanism for continuous garbage collection utilizing a combination of adequate provisioning and adaptive balancing of garbage collection operations and user initiated operations. Other systems often have garbage collection cycles and exhibit performance issues during those cycles. This invention facilitates uniform maximum performance.

FIG. 50 illustrates a system that is provisioned for garbage collection in order to enable it to occur during standard operations. In particular, in this embodiment two sets of resources are combined to ensure the adequate handling of significant peeks. This system can process 70 GB/s of writes. The write performance is limited by the network bandwidth from the server box 5000 to the flash box 5002 at a bidirectional 120 GB/s. If we assume a worst case of 80 GB/s of writes by the garbage collector (2 garbage collection writes per user write), then user writes would be limited to 40 GB/s. This embodiment also has DRAM buffering on the controller card to buffer peek writes. The buffering brings the instantaneous limit up to 70 GB/s. This embodiment uses a combination of system IO capacity and overflow handling to process a write-only workload.

The same embodiment also handles a combination of reads and writes where the software stack on the CPU adapts to favor reads. To get the maximum bandwidth from the system, software on the CPU will schedule reads and writes to maximize the bandwidth.

FIG. 51 illustrates one embodiment. In this embodiment, the user application 5100 makes read and write requests that are processed through separate queues; namely, a read queue 5102 and a write queue 5104. The system generates the reads, writes and erases necessary for garbage collection and puts them in queue 5106. The more items in queue 5104, the more items are needed in queue 5106. The system can balance and schedule requests from all three queues to make sure that reads complete as quickly as possible without starving writes (and consequent garbage collection operations). The fuller the write and garbage collection queues become, the more priority they receive. This exhibits one embodiment of the adaptive handling of garbage collection on a continuous basis.

Flash Memory suffers from a significant rise in the bit error rate (BER) when many reads or writes take place in cells adjacent to a particular cell. These "read disturb" or "write disturb" induced errors can be reduced by transforming the original data in such a way as to minimize the occurrence of strings of ones or strings of zeros that will be written. One way to accomplish this transformation is by using a suitable pseudo-random generator to transform the data.

This invention uses multiple pseudo-random sequences per flash page (each at a different offset). This allows individual data sectors to be read without the need to read the whole flash page. Existing implementations read the whole flash page through the de-scrambler. This technique allows us to only read the portion of the data we need and thus allows a smaller transfer and thus improved read times.

Figure 52:
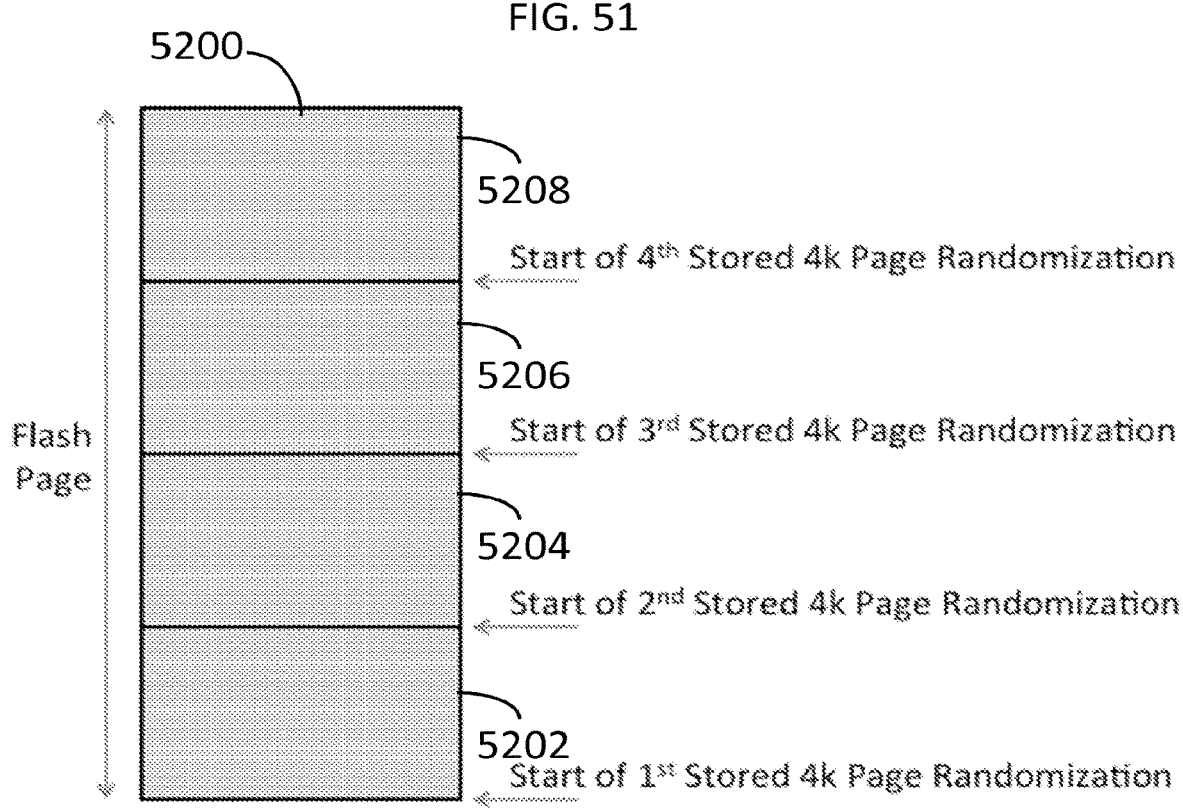
FIG. 52 illustrates a page randomization technique utilized in accordance with an embodiment of the invention.

An embodiment utilizes multiple (parallel) randomization streams per stored flash page (or other accessible data unit). A seed value may be used to generate a pseudo-random stream of bytes from a whole 16 k flash page. In one embodiment a known key seeds a pseudo-random number generator that produces a random stream of bytes on a sub-page data unit, in one embodiment, a 4 k part of the flash page. FIG. 52 illustrates a flash page 5200 with different segments 5202, 5204, 5206 and 5208. Each segment has unique page randomization.

Another embodiment is an interface to flash memory devices that provides the required interfaces to the memory controller and its interconnection protocols. It has two main interfaces. At the input, there are READ, WRITE and ERASE commands. At the output there are actual Flash Device signals.

The mechanism that connects the input to the output is an engine that processes sub-commands that are the constituent parts of the input commands: Start-RD, Start-WR, Get-STATUS, etc. The Flash Controller has two layers (1) a state-machine per LUN to convert input commands into sub-commands and (2) a state-machine with an embedded micro-coded machine to convert sub-commands into Flash Device signals.

Figures 53, 54:
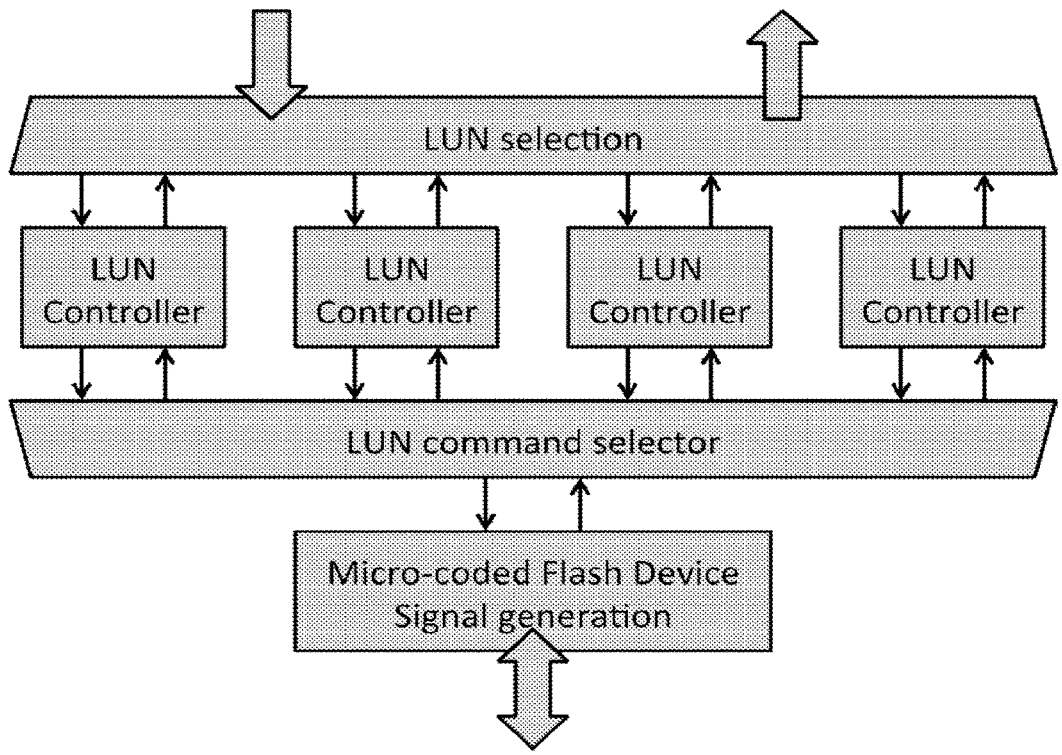
FIG. 53 illustrates a LUN architecture utilized in accordance with an embodiment of the invention.
FIG. 54 illustrates commands processed in accordance with an embodiment of the invention.
Figures 55, 56:
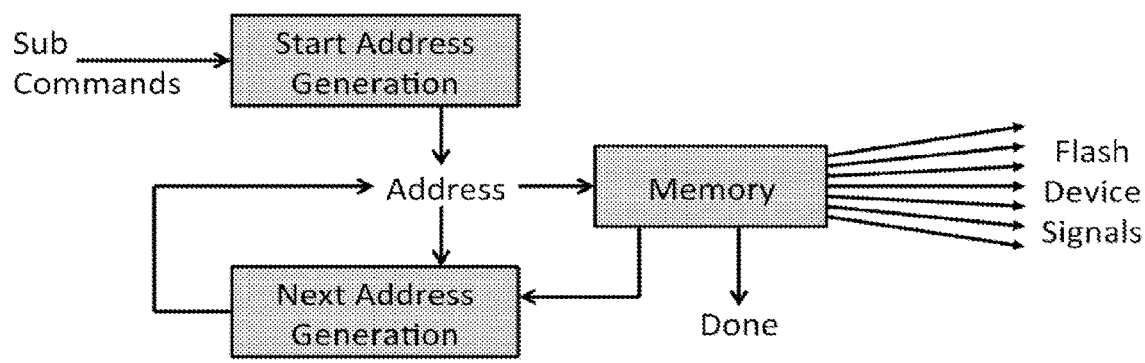
FIG. 55 illustrates commands processed in accordance with an embodiment of the invention.
FIG. 56 illustrates a microcode engine configured in accordance with an embodiment of the invention.

The input commands to the LUN controllers come from the computing appliance CPUs, for example Intel® Xeon® processors, via the memory roots or memory controllers. In one embodiment, the input commands are:
1. ERASE-2: Erase blocks on 2-planes at once
2. WRITE-1: Write a single 8 k (or 16 k) page
3. WRITE-2: Write 2 pages, one on each of 2-planes
4. READ: Read a 4 k section of a flash-page Each input command is broken into sub-commands as shown in FIG. 54. In this mechanism, a Wait for READY is a loop around Get STATUS, in pseudo-code:
Repeat
 Get STATUS
Until READY bit is set In one embodiment of this invention there are 7 Sub-Commands. The last two are only used for system initialization.
1. Start ERASE
2. Get STATUS
3. Start WRITE
4. Start READ
5. Finish READ
6. RESET
7. Set FEATURES Each sub-command is in turn composed of flash device commands particular to the flash device chosen. FIG. 55 provides examples.

In the case of one particular flash device there are 6 Flash Commands. (The last two are rarely used.)
1. CMD
2. ADDR
3. Din
4. Dout
5. Idle
6. Standby In one embodiment, the micro-code engine that processes these commands has the structure shown in FIG. 56. This micro-code engine processes Flash Commands one at a time, in the order received. Each sub-command provides a "start" address for a memory-based program that drives the flash command interface to the flash device. The Flash Commands are generated from the sequence of instructions, and are clocked out of memory until completed. The engine has four basic control functions:
1. Controls sequence of Flash Device commands
2. Controls selection of input bytes to data input of the Flash Device, i.e. which address bytes to select at what time
3. Controls the Flash timing, in steps based on Micro-controllers main clock (200 MHz)
4. Controls repeat commands, i.e. 4 k Din cycles Often IO controllers use a proprietary or hierarchical IO oriented communications mechanism to communicate between the CPU and a slower device. The problem with this is that a) it is often not flexible or b) scalable. Instead, this invention uses a standard communications network to connect a CPU to devices. FIG. 50 illustrates one embodiment of the invention. In this embodiment we convert from PCIe to 40 GbE. Once we are in the 40 GbE network any component can talk to any component. There are a number of benefits associated with this approach. In a system with a large number of devices, one can distribute work and data broadly thereby insuring parallel operations. If more devices are added, the network is expanded. It is easy to have fail-over communication paths.

In order to provide a high level of fault tolerance, redundant components and interconnection paths are often utilized. This invention provides an improved redundant data transfer path. In some embodiments, the main traffic path on the flash cards uses two Ethernets, each connected to an FPGA. Rather than just provide a second Ethernet link from the FPGA to the switch, which would require a total of 4 Ethernet connections, we connect the FPGAs together and provide a second, backup path over the link to the other FPGA, as shown in FIG. 57. Utilizing this secondary link will cause the system to operate with a degraded traffic capacity, but will provide a redundant path without the need for a second Ethernet Interface. Rather than connect Flash Controller FPGA to two Ethernet ports, as shown in block 5700, the "other" FPGAs Ethernet port is connected as a redundant path, as shown in block 5702. This saves system and board resources and provides the same level of redundancy.

An embodiment of the present invention relates to a computer storage product with a non-transitory computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media, optical media, magneto-optical media and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. A system, comprising:
a collection of central processing units, wherein a first central processing unit is connected to at least a second central processing unit via a memory-speed interface and a first path into flash memory resources,
wherein the second central processing unit of the collection of central processing units is connected to at least the first central processing unit of the collection of central processing units and a second path into flash memory resources independent of the first path into flash memory resources,
wherein the flash memory resources including a plurality of branches and leaves is connected to a respective one of the collection of central processing units via a memory controller controlling the plurality of branches and leaves,
wherein the first and the second central processing units each supports a mapping from a data address space, to a flash memory virtual address space, to a flash memory virtual page number to a flash memory physical address space, the flash memory virtual address space comprising a plurality of virtual blocks varying in size, the flash memory physical address space comprising a plurality of physical blocks varying in size, wherein the mapping is performed using virtual page tables, wherein the virtual page tables include a set of shared page virtualization table entries associated with a plurality of pages, wherein the set of shared page virtualization table entries include a base quantity operative as an index to a flash memory location indicative of a position of a foremost page in the plurality of pages,
wherein the system is configured to support lockless queues for transmitting commands and command completion acknowledgements between central processing units, and wherein the lockless queues further comprise a circular queue of time bucket accumulators, each time bucket accumulator representing a time period N, the first central processing unit incrementing a respective time bucket accumulator for the time period N without locks, the second central processing unit updating a global accumulator and a time bucket index based on adding and subtracting values from each time bucket accumulator.

2. The system of claim 1, further comprising:
an execution queue;
a completion queue;
a first central processing unit configured to write tail values to the execution queue and consume head values from the completion queue; and
a second central processing unit configured to write tail value to the completion queue and consume head values from the execution queue.

3. The system of claim 2, further comprising a bit table accessible to the first central processing unit and the second central processing unit, the bit table including entries specifying completed tasks, wherein the second central processing unit allocates one of the entries on the completion queue indicating the completed tasks upon completion.

4. A system of claim 1 wherein a core of a central processing unit has an individual input/output data structure supported by an operating system, individual interrupt path within the operating system and dedicated hardware resource to facilitate parallel processing.

5. The system of claim 1 configured to periodically defer reads during garbage collection.

6. The system of claim 1 configured to store ranges of trim information to reduce logging requirements, wherein trim information characterizes expired pages of data.

7. The system of claim 1 configured to reconstruct data in response to the identification of a busy memory resource.

8. The system of claim 1 configured to adaptively implement a more conservative data protection protocol as a function of operational time of the system.

9. The system of claim 1 configured to randomize flash page contents to minimize read and write disturbances.

10. The system of claim 1 wherein a central processing unit is configured to store write data in DRAM until the write data is committed to flash memory.

11. The system of claim 1 configured to utilize a single sequence number for each data protection stripe.

12. The system of claim 1 configured for adaptive garbage collection utilizing a read queue, a write queue and a garbage collection queue to selectively load jobs from the read queue and the write queue.

* * * * *